US012694076B2

(12) United States Patent　　　(10) Patent No.:　US 12,694,076 B2
Ishii　　　　　　　　　　　　　　(45) Date of Patent:　　　Jul. 28, 2026

(54) AUTHORSHIP DETERMINING METHOD, COMPUTER, AND PROGRAM

(71) Applicant: Wacom Co., Ltd., Saitama (JP)

(72) Inventor: Ryoji Ishii, Saitama (JP)

(73) Assignee: Wacom Co., Ltd., Saitama (JP)

( * ) Notice: Subject to any disclaimer, the term of this patent is extended or adjusted under 35 U.S.C. 154(b) by 70 days.

(21) Appl. No.: 18/785,946

(22) Filed: Jul. 26, 2024

(65) Prior Publication Data

US 2024/0388452 A1　　　Nov. 21, 2024

Related U.S. Application Data

(63) Continuation of application No. PCT/JP2022/048397, filed on Dec. 27, 2022.

(30) Foreign Application Priority Data

Jan. 28, 2022　(JP) ................................. 2022-012455
Sep. 21, 2022　(JP) ................................. 2022-150728

(51) Int. Cl.
　　*G06F 21/10*　　　　(2013.01)
　　*G06F 21/16*　　　　(2013.01)
(52) U.S. Cl.
　　CPC .............. *G06F 21/10* (2013.01); *G06F 21/16*
　　　　　　　　　　　　　　　　　　(2013.01)
(58) Field of Classification Search
　　None
　　See application file for complete search history.

(56) References Cited

U.S. PATENT DOCUMENTS 7,228,437 B2 *　6/2007　Spagna ................... H04W 4/02
　　　　　　　　　　　　　　　　　　　713/193
7,552,342 B1 *　6/2009　Rennie ................... G06F 21/14
　　　　　　　　　　　　　　　　　　　713/188

(Continued)

FOREIGN PATENT DOCUMENTS

CN　　　110866289 A　*　3/2020　............. G06Q 50/18
JP　　2001-175606 A　　6/2001

(Continued)

OTHER PUBLICATIONS

English Translation of International Search Report for International Patent Application No. PCT/JP2022/048397, mailed Apr. 4, 2023. (2 pages).

*Primary Examiner* — Benjamin E Lanier
(74) *Attorney, Agent, or Firm* — Seed Intellectual Property Law Group LLP

(57)　　　　　　　ABSTRACT
An authorship determining method is provided for determining authorship of an artwork by using a computer. The computer calculates a first hash value, which is a hash value of first pre-integration data, which is pre-integration data of the artwork, and generates a first creation certificate including the first hash value. According to another aspect, a computer is provided including a processor used to determine authorship of an artwork. The processor is configured to calculate a hash value of pre-integration data of the artwork, and generate a creation certificate including the hash value. According to a further aspect, a program is provided which causes a computer to execute processing of certifying authorship of an artwork. The program causes the computer to execute a step of calculating a hash value of pre-integration data of the artwork; and a step of generating a creation certificate including the hash value.

17 Claims, 39 Drawing Sheets

(56) References Cited

U.S. PATENT DOCUMENTS

| | | | |
|---|---|---|---|
| 2003/0046238 A1 | 3/2003 | Nonaka et al. | |
| 2003/0196086 A1* | 10/2003 | Murakami | H04N 1/32122 |
| | | | 713/176 |
| 2004/0151377 A1* | 8/2004 | Boose | G06V 30/422 |
| | | | 703/23 |
| 2005/0039022 A1* | 2/2005 | Venkatesan | H04N 21/2543 |
| | | | 348/E7.071 |
| 2009/0202071 A1* | 8/2009 | Kato | G11B 20/0021 |
| | | | 380/201 |
| 2016/0171186 A1* | 6/2016 | Marking | H04N 21/4627 |
| | | | 713/189 |
| 2021/0374734 A1 | 12/2021 | Giffary-Burley | |
| 2021/0390557 A1 | 12/2021 | Kumagai | |

FOREIGN PATENT DOCUMENTS

| | | | |
|---|---|---|---|
| JP | 2001357040 A | * | 12/2001 |
| JP | 2017-118447 A | | 6/2017 |
| JP | 6894033 B1 | | 6/2021 |
| JP | 2022-002130 A | | 1/2022 |

* cited by examiner

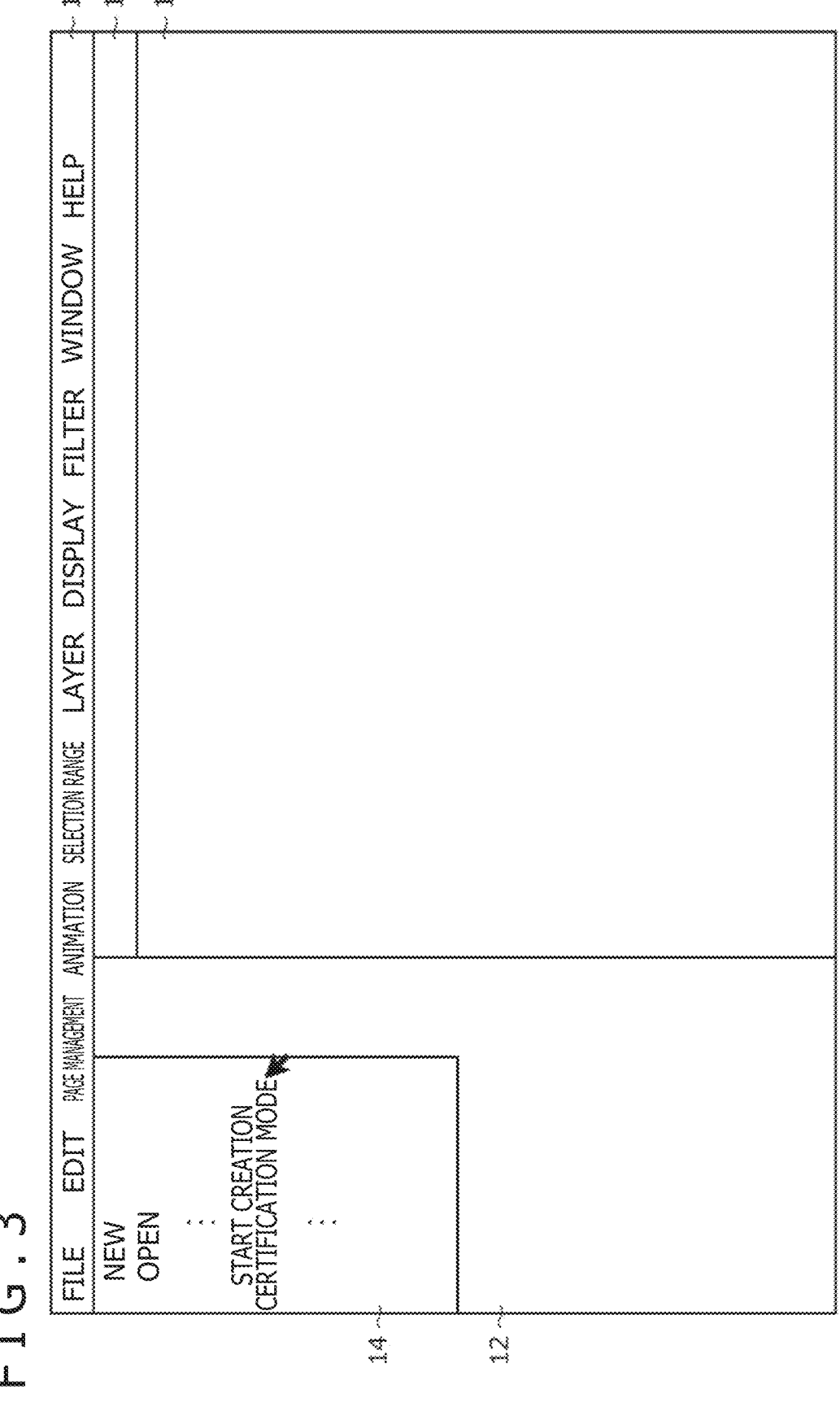
F I G . 3

F I G . 4
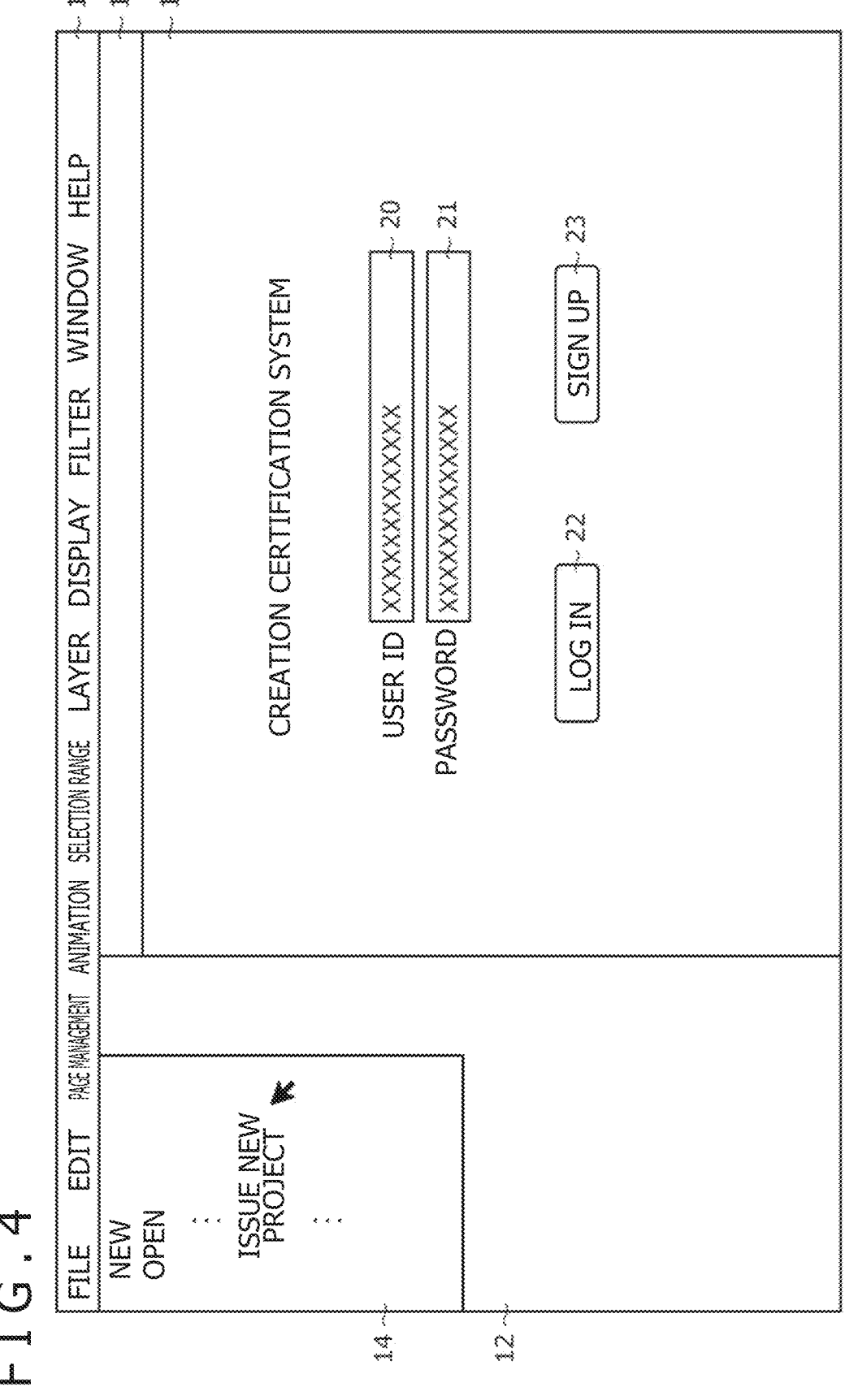

F I G . 6
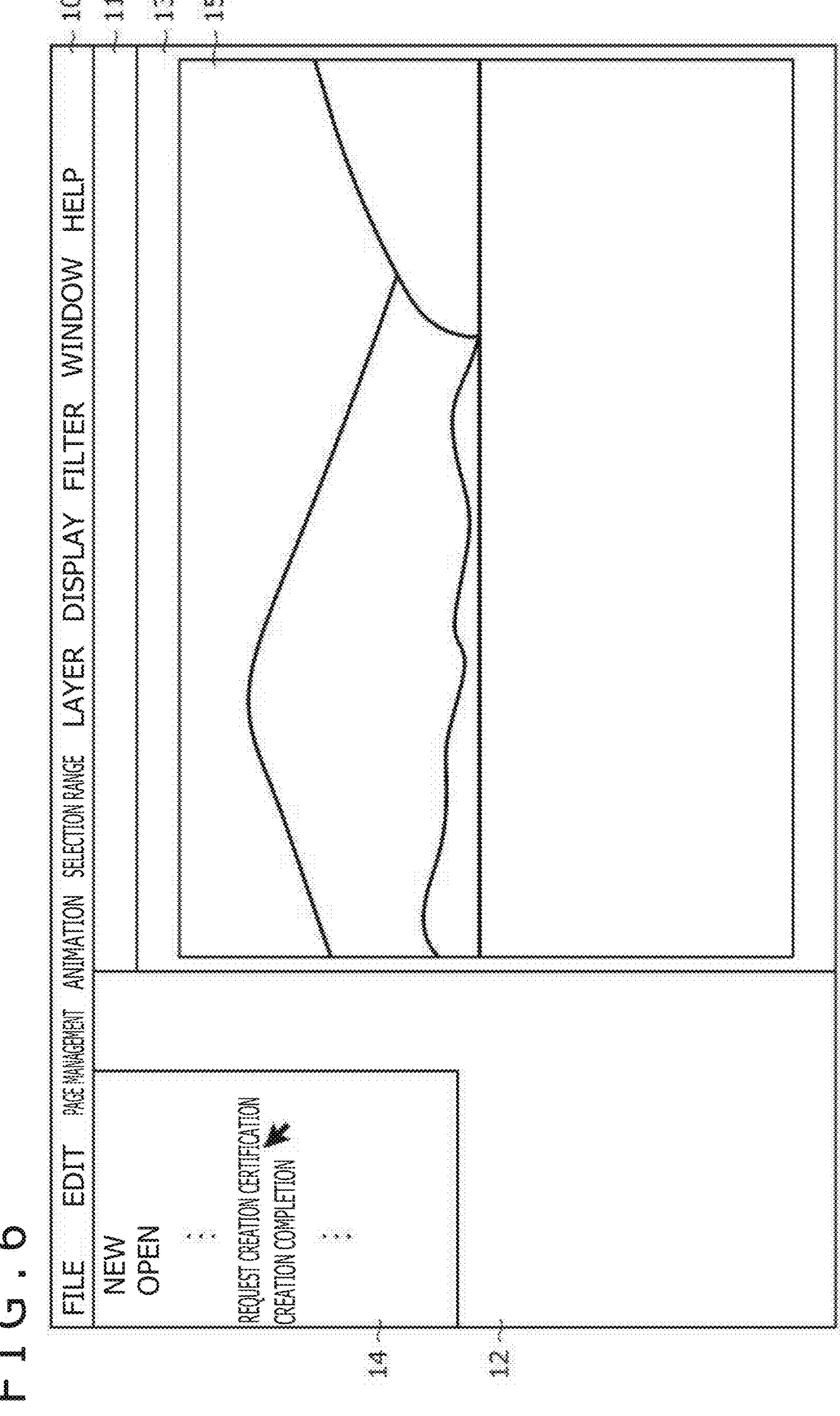

FIG.9

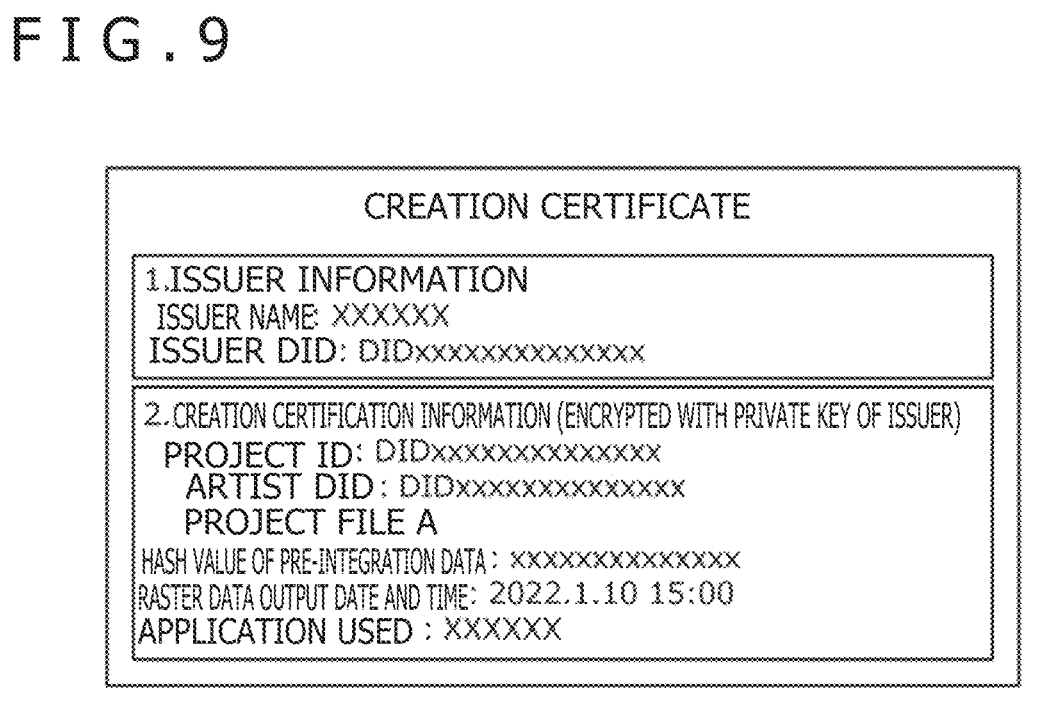

CREATION CERTIFICATE

1.ISSUER INFORMATION
 ISSUER NAME: XXXXXX
 ISSUER DID: DIDxxxxxxxxxxxxxx

2.CREATION CERTIFICATION INFORMATION (ENCRYPTED WITH PRIVATE KEY OF ISSUER)
  PROJECT ID: DIDxxxxxxxxxxxxx
   ARTIST DID: DIDxxxxxxxxxxxxx
   PROJECT FILE A
 HASH VALUE OF PRE-INTEGRATION DATA: xxxxxxxxxxxxxx
 RASTER DATA OUTPUT DATE AND TIME: 2022.1.10 15:00
 APPLICATION USED: XXXXXX F I G . 1 0
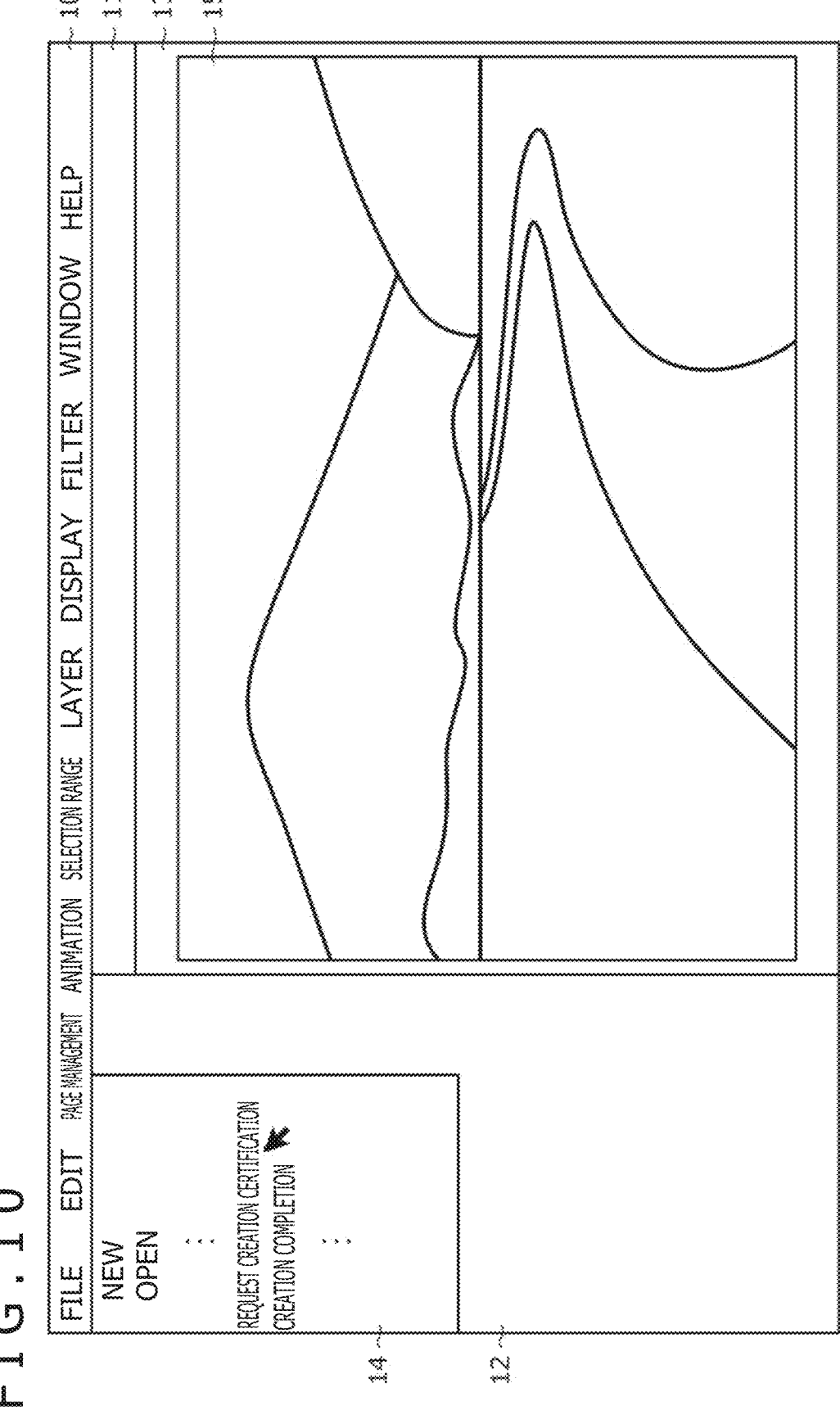

FIG. 11

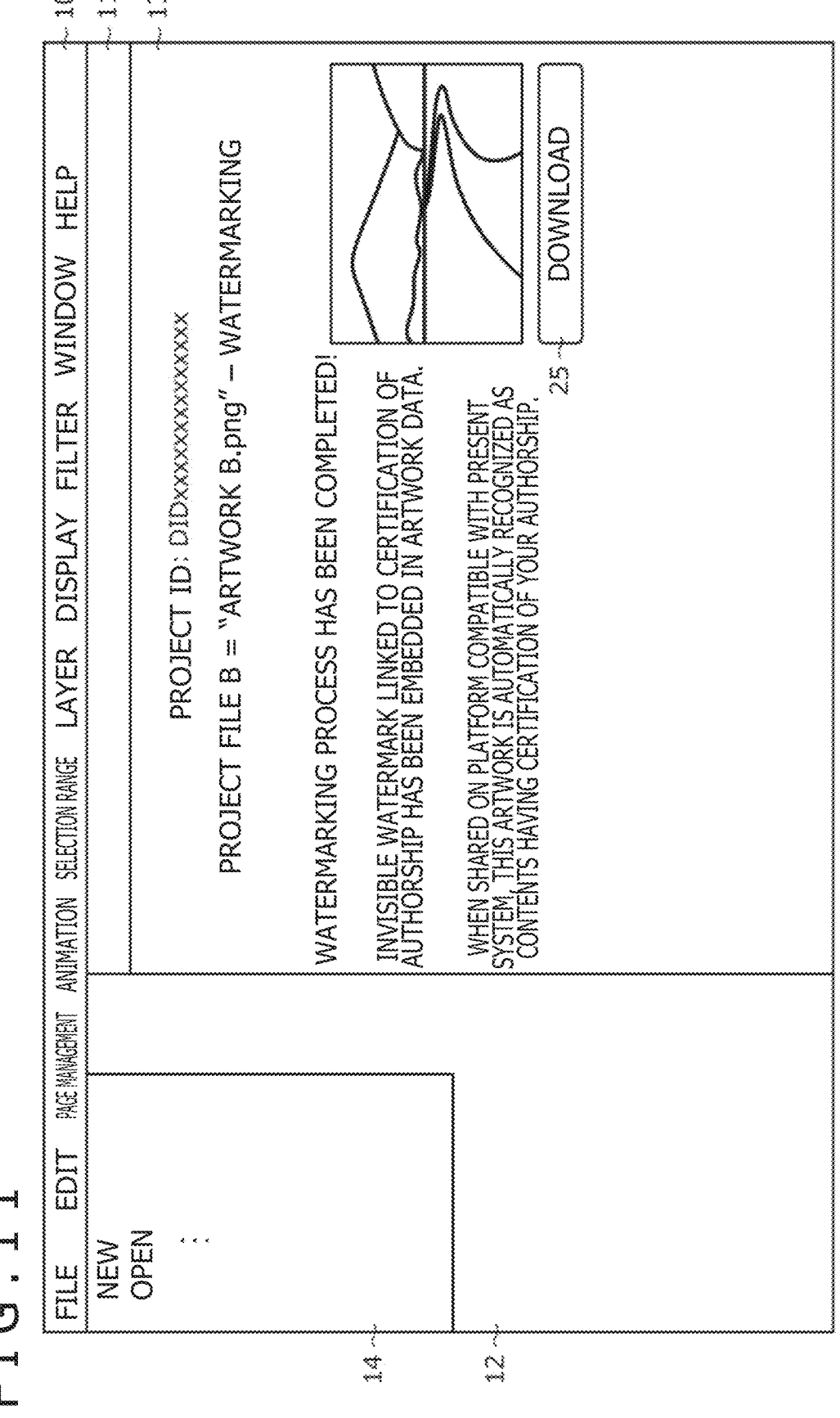

FILE  EDIT  PAGE MANAGEMENT  ANIMATION  SELECTION RANGE  LAYER  DISPLAY  FILTER  WINDOW  HELP

NEW
OPEN
⋮

PROJECT ID: DIDxxxxxxxxxxx

PROJECT FILE B = "ARTWORK B.png" – WATERMARKING

WATERMARKING PROCESS HAS BEEN COMPLETED!

INVISIBLE WATERMARK LINKED TO CERTIFICATION OF
AUTHORSHIP HAS BEEN EMBEDDED IN ARTWORK DATA.

WHEN SHARED ON PLATFORM COMPATIBLE WITH PRESENT
SYSTEM, THIS ARTWORK IS AUTOMATICALLY RECOGNIZED AS
CONTENTS HAVING CERTIFICATION OF YOUR AUTHORSHIP.

DOWNLOAD

F I G. 1 4
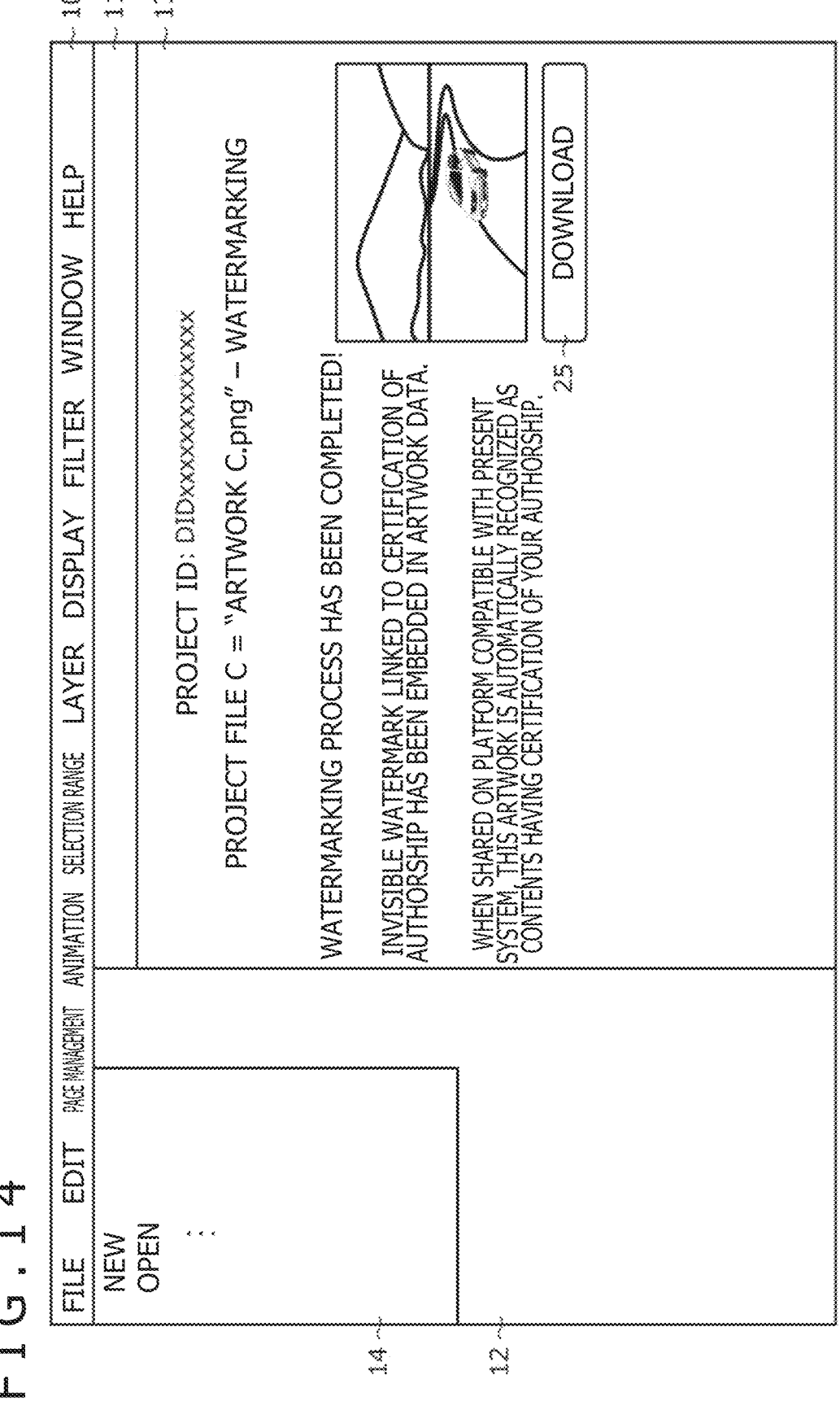

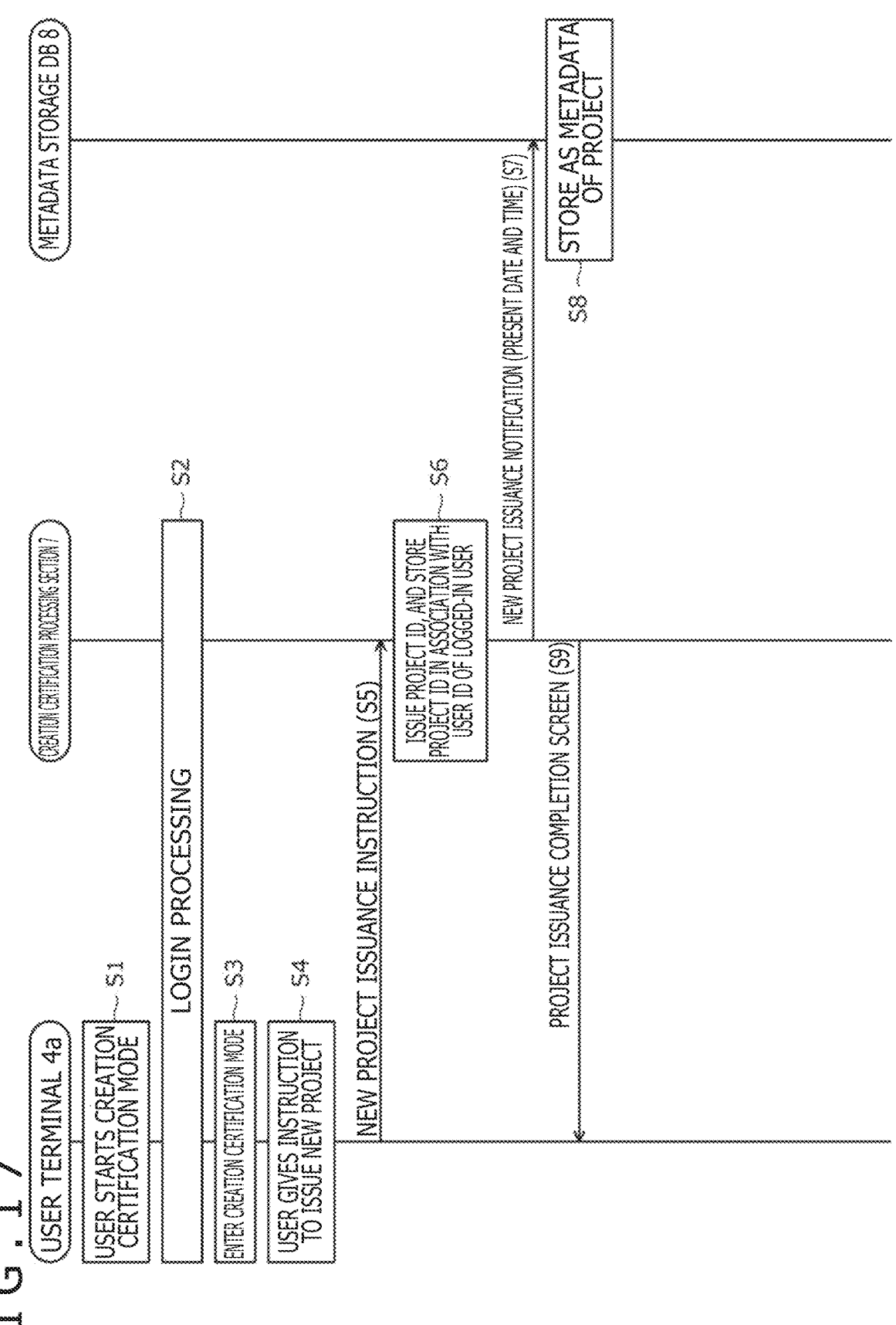
F I G . 1 7

F I G . 1 8
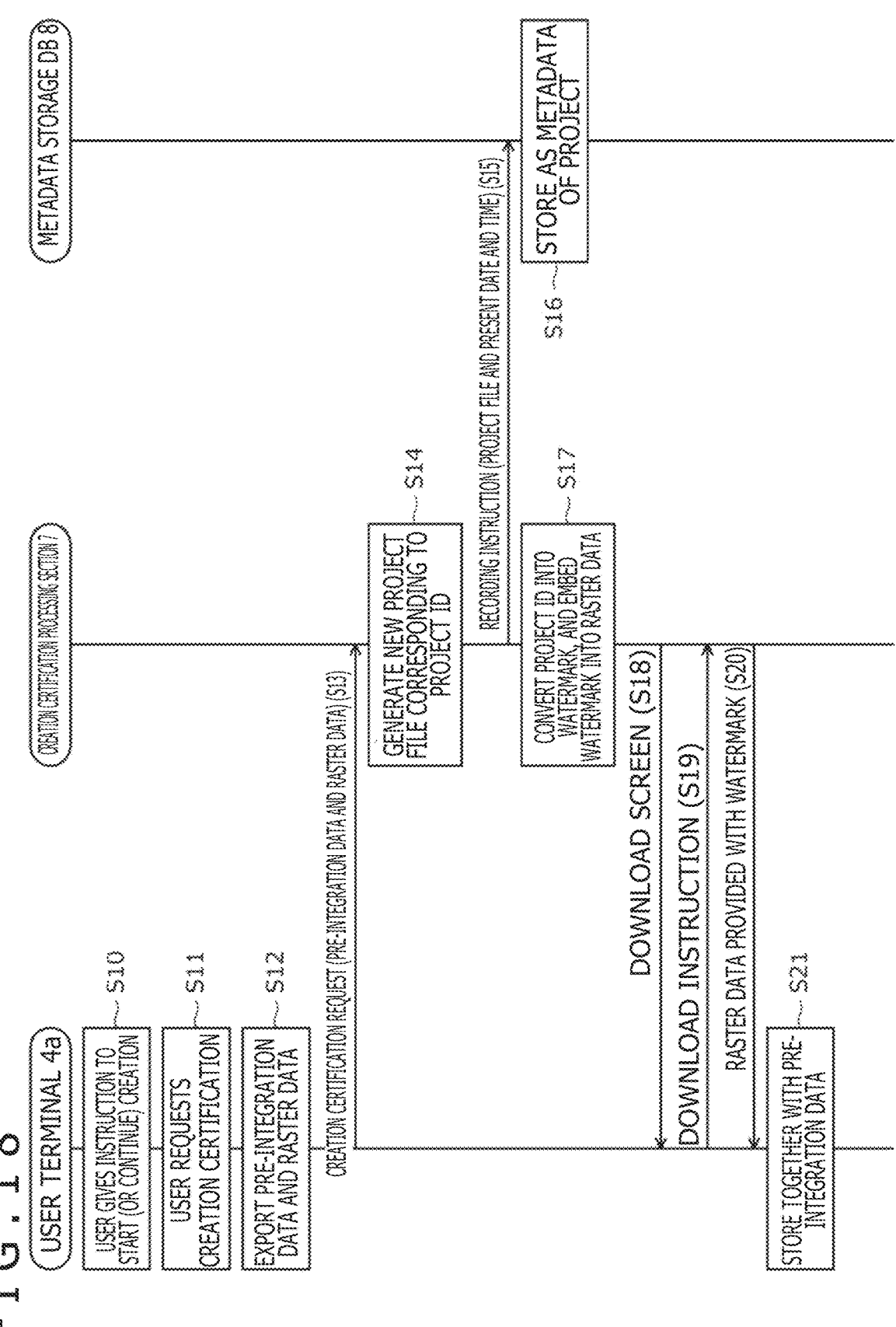

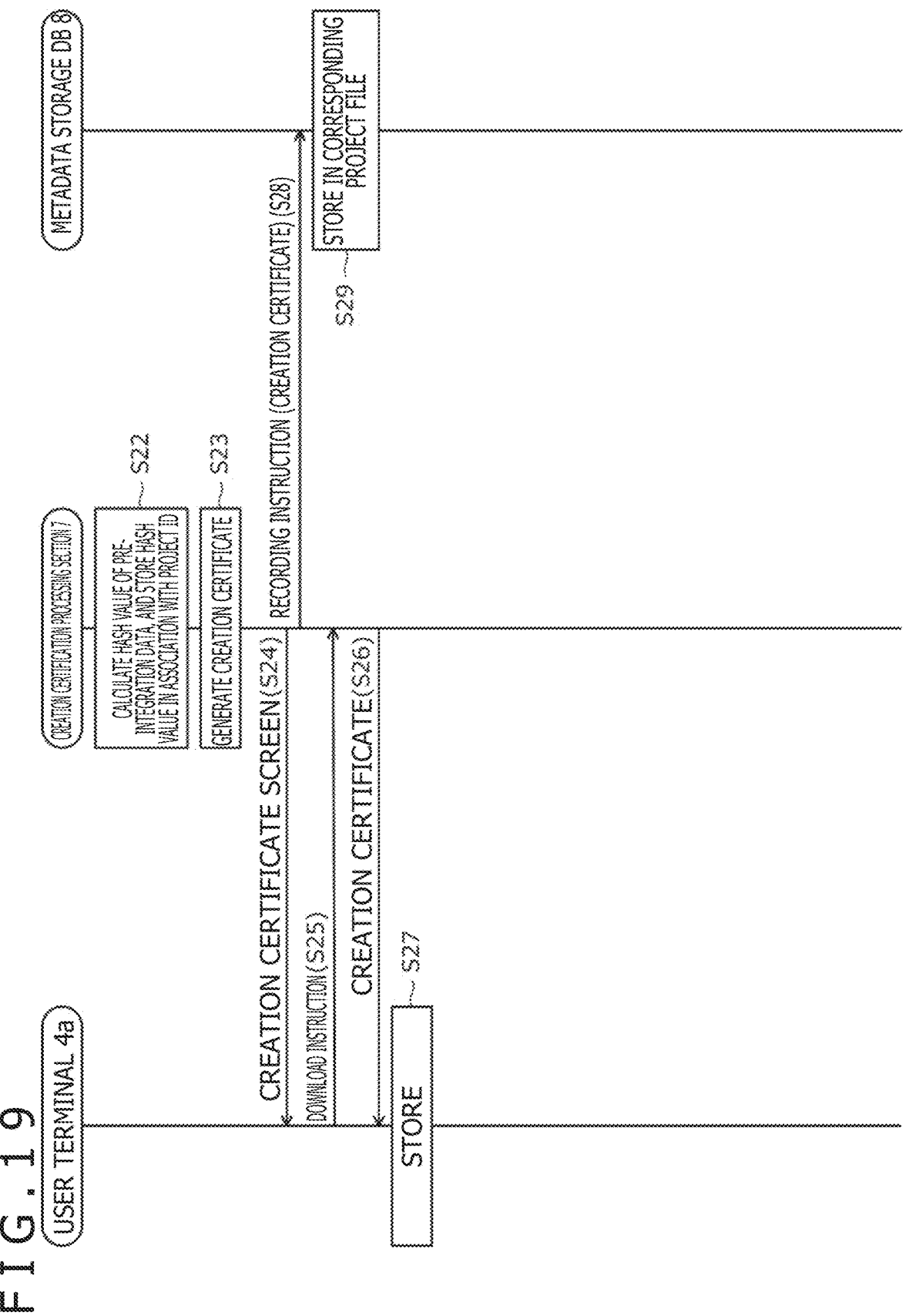
F I G . 1 9

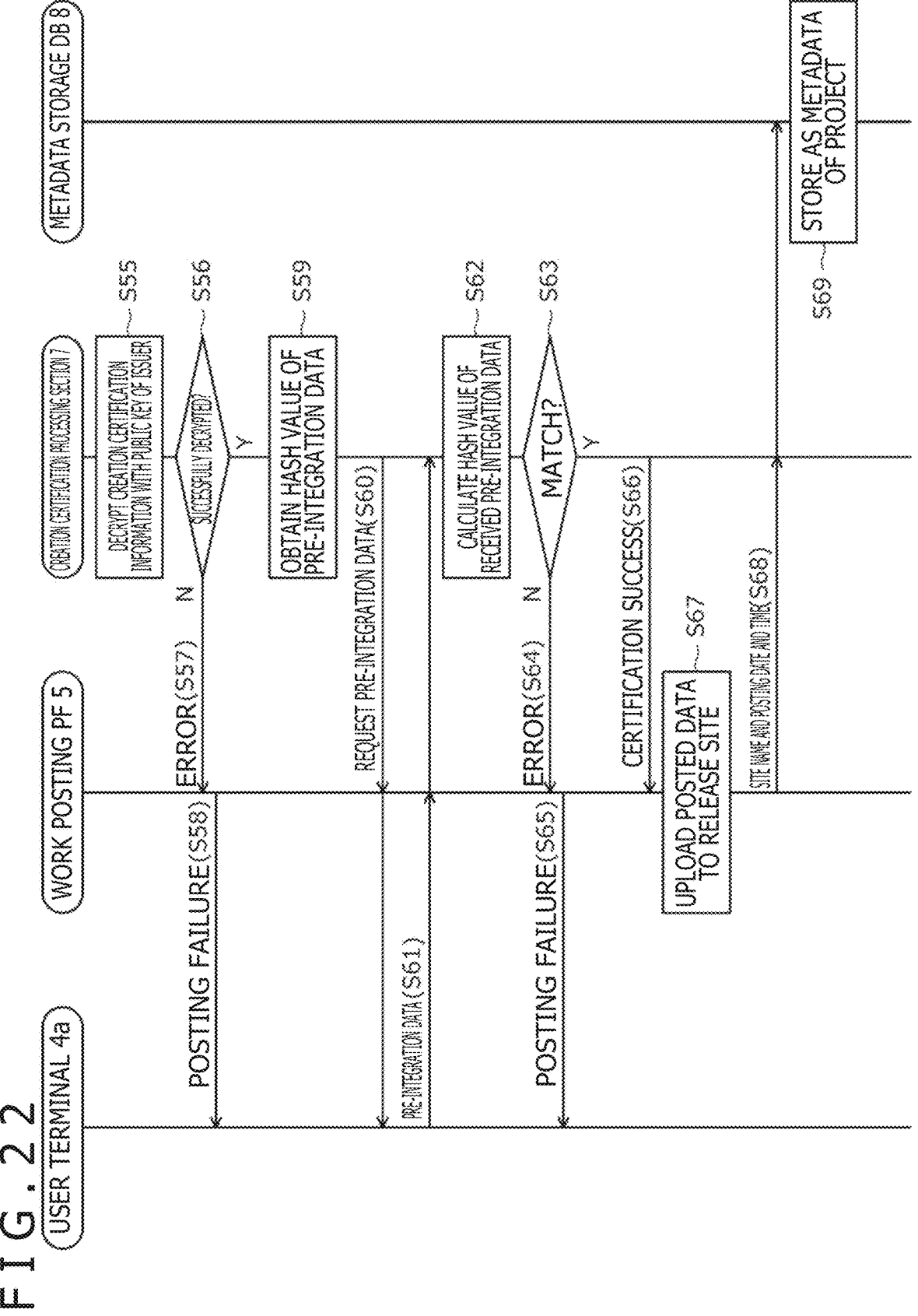
F I G . 2 2

F I G . 2 3
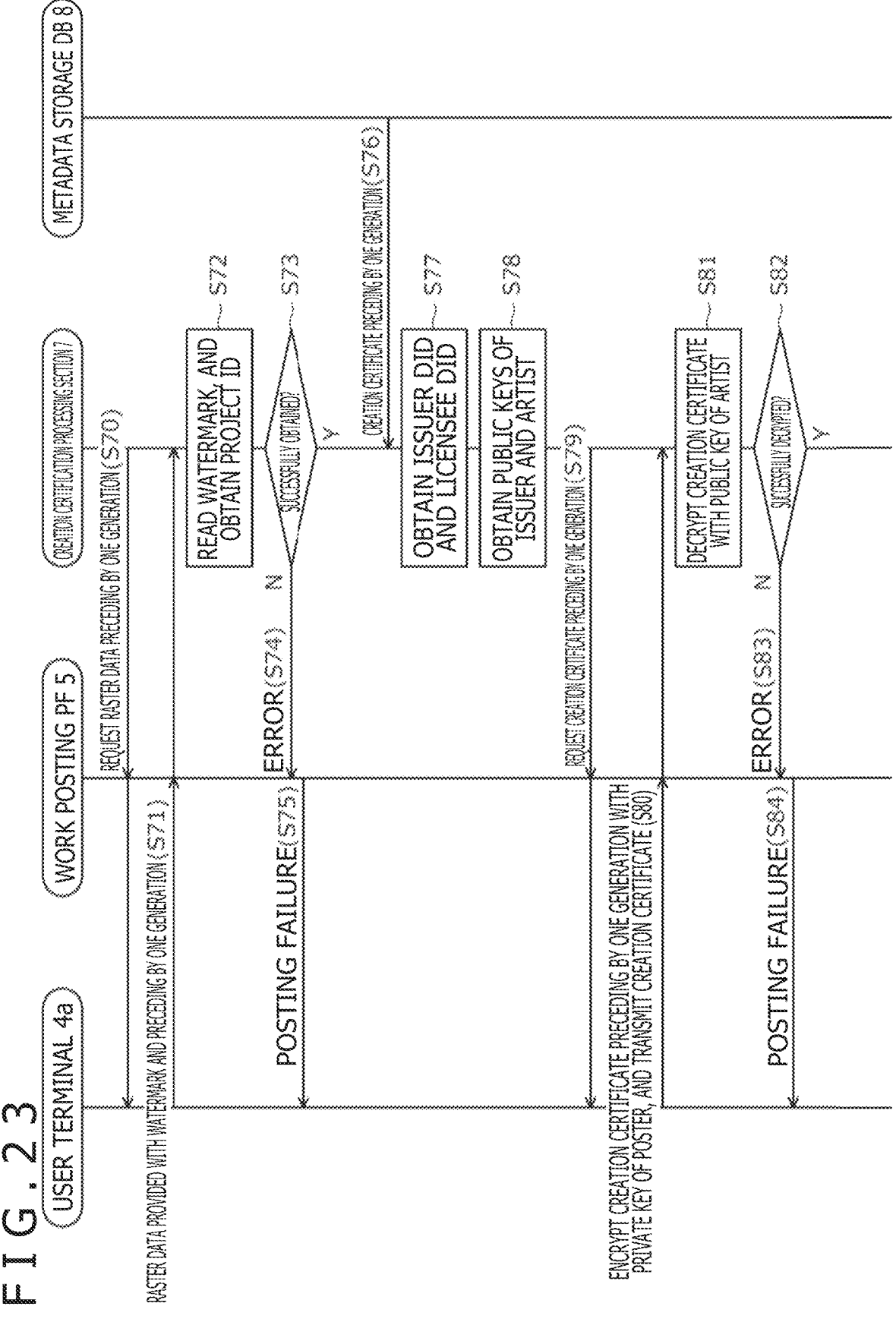

F I G . 2 4
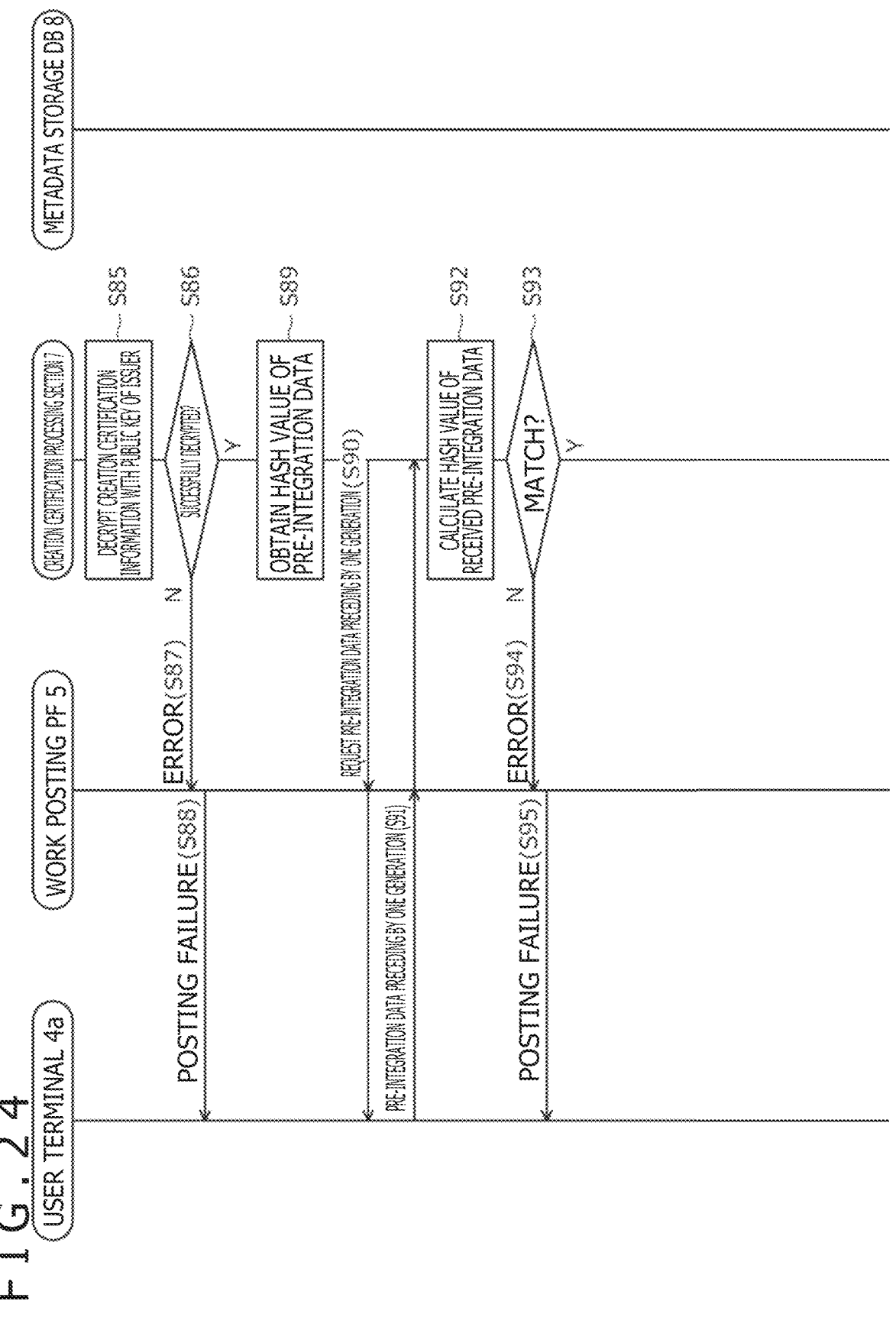

F I G . 2 5
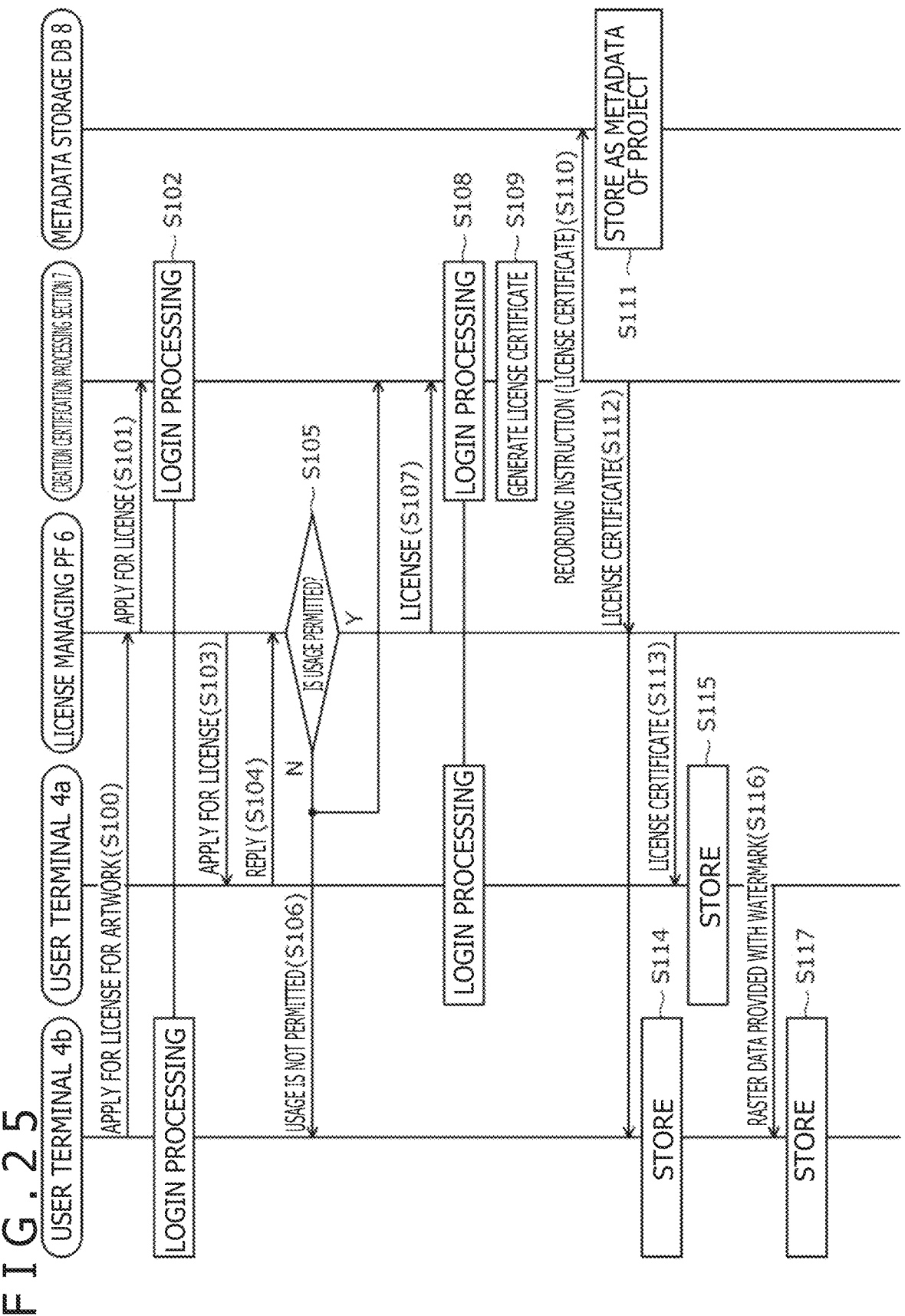

FIG.26

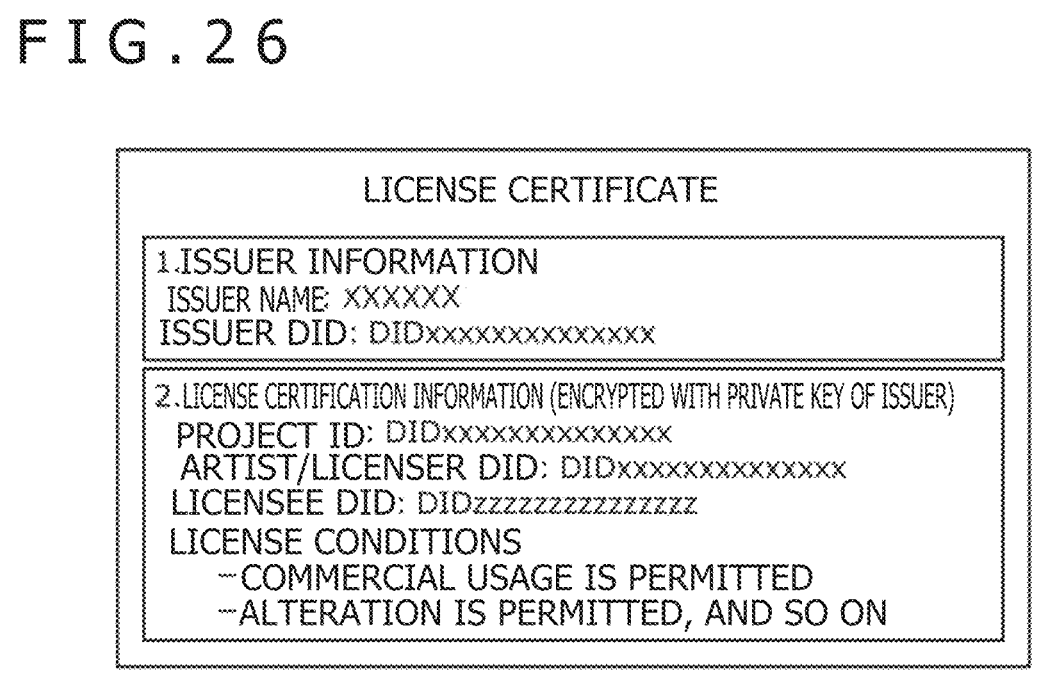

LICENSE CERTIFICATE

1.ISSUER INFORMATION
 ISSUER NAME: XXXXXX
ISSUER DID: DIDxxxxxxxxxxxxxx

2.LICENSE CERTIFICATION INFORMATION (ENCRYPTED WITH PRIVATE KEY OF ISSUER)
  PROJECT ID: DIDxxxxxxxxxxxxxx
  ARTIST/LICENSER DID: DIDxxxxxxxxxxxxxx
LICENSEE DID: DIDzzzzzzzzzzzzzzz
LICENSE CONDITIONS
    –COMMERCIAL USAGE IS PERMITTED
    –ALTERATION IS PERMITTED, AND SO ON F I G . 2 7
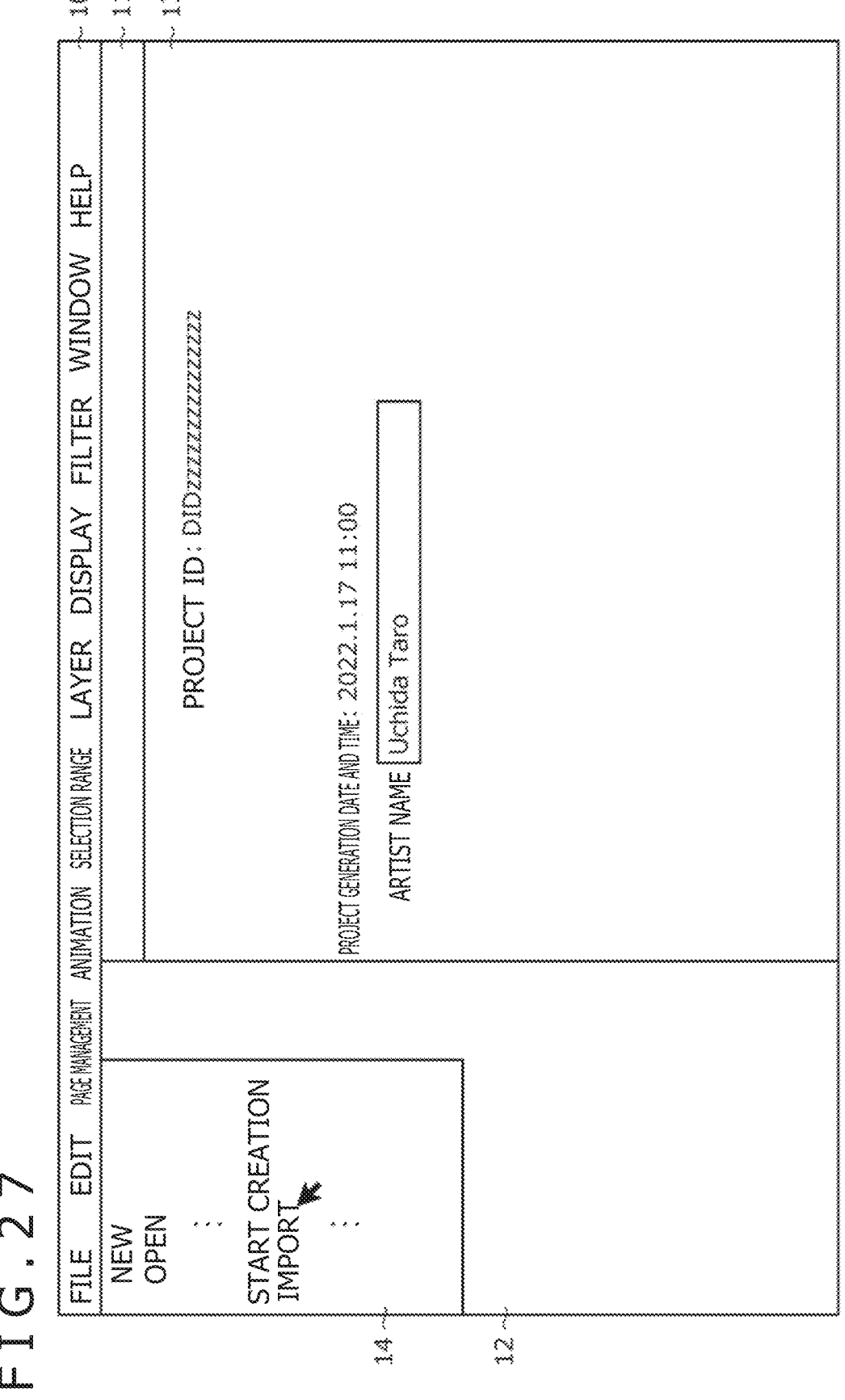

F I G . 2 8

FILE   EDIT   PAGE MANAGEMENT   ANIMATION   SELECTION RANGE   LAYER   DISPLAY   FILTER   WINDOW   HELP

NEW
OPEN
⋮
START CREATION
IMPORT
⋮

PROJECT ID: DIDzzzzzzzzzzzzzz

Artwork_wate
rmarked.png

FILE NAME

OPEN    .png

CANCEL

F I G . 3 1
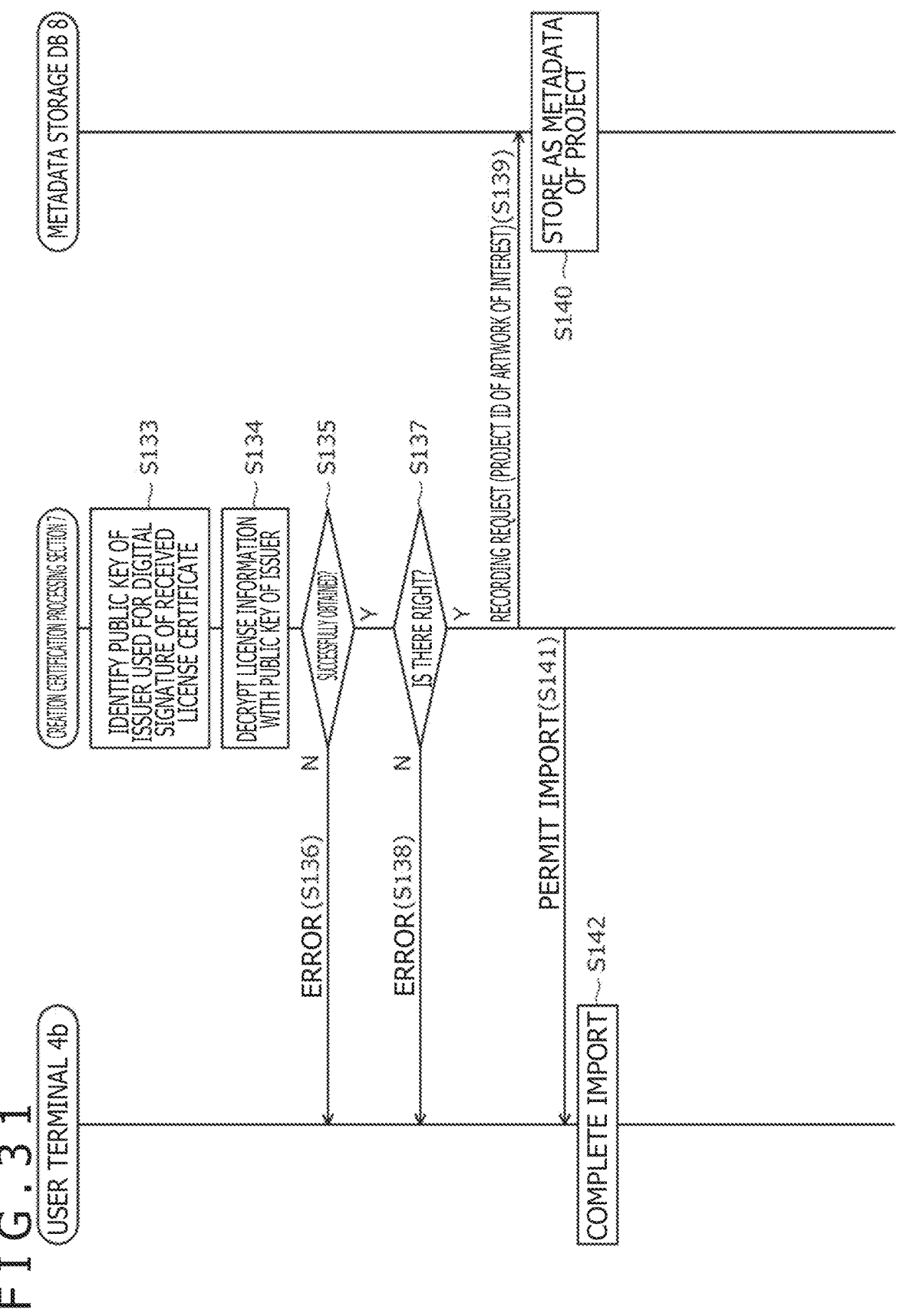

F I G . 3 3
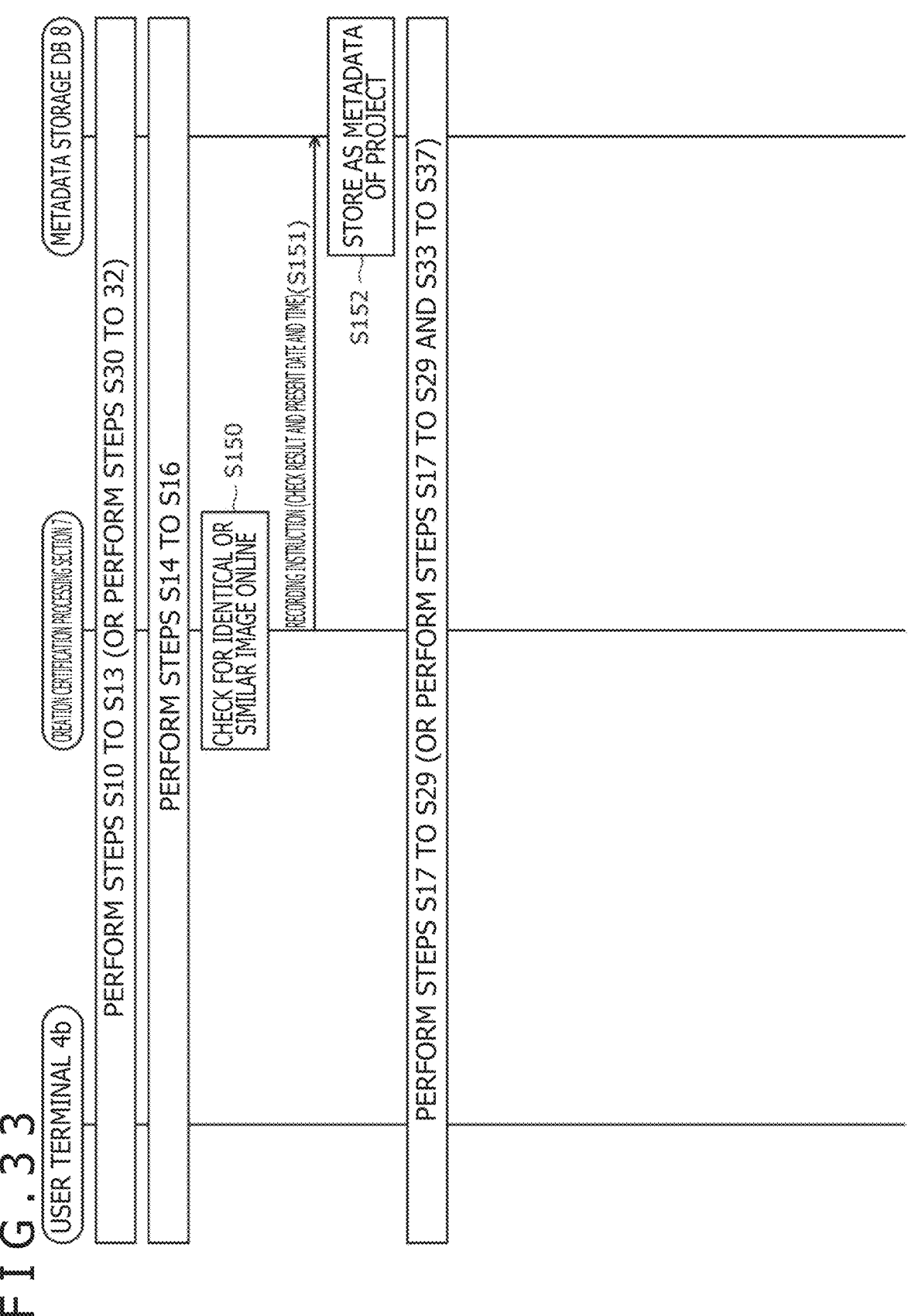

FIG.35

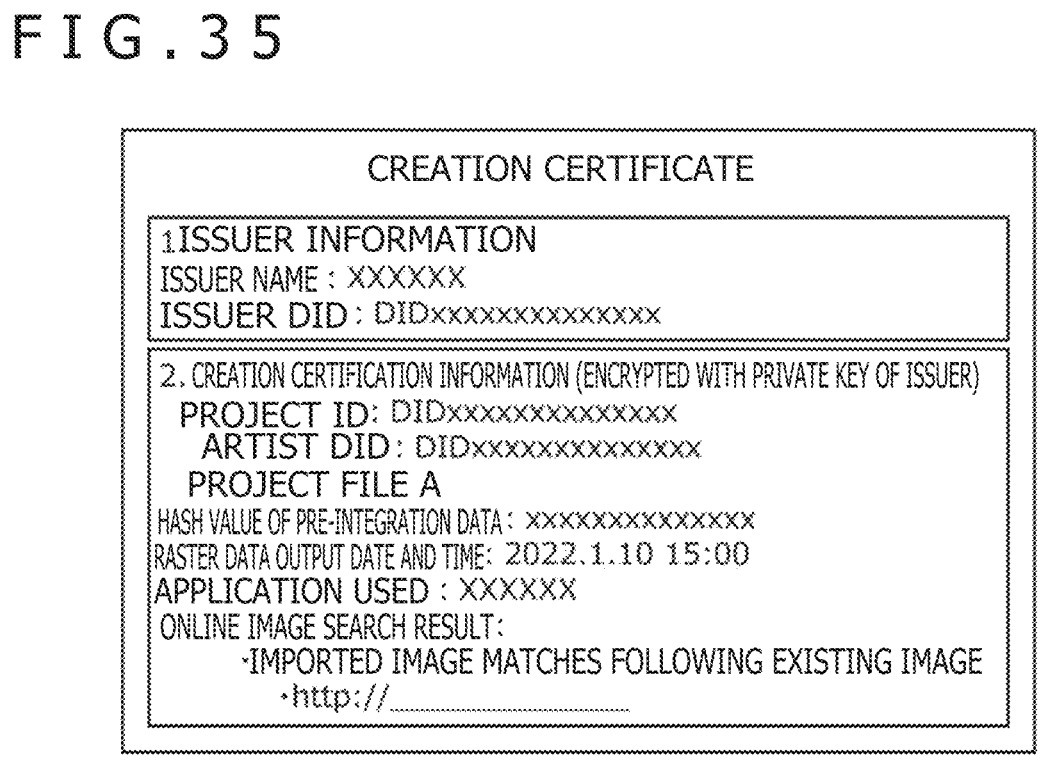

CREATION CERTIFICATE

1.ISSUER INFORMATION
ISSUER NAME : XXXXXX
ISSUER DID : DIDxxxxxxxxxxxxxx

2. CREATION CERTIFICATION INFORMATION (ENCRYPTED WITH PRIVATE KEY OF ISSUER)
   PROJECT ID: DIDxxxxxxxxxxxxxx
    ARTIST DID : DIDxxxxxxxxxxxxx
   PROJECT FILE A
HASH VALUE OF PRE-INTEGRATION DATA : xxxxxxxxxxxxxx
RASTER DATA OUTPUT DATE AND TIME: 2022.1.10 15:00
APPLICATION USED : XXXXXX
 ONLINE IMAGE SEARCH RESULT :
       ·IMPORTED IMAGE MATCHES FOLLOWING EXISTING IMAGE
         ·http://_____

F I G . 3 7
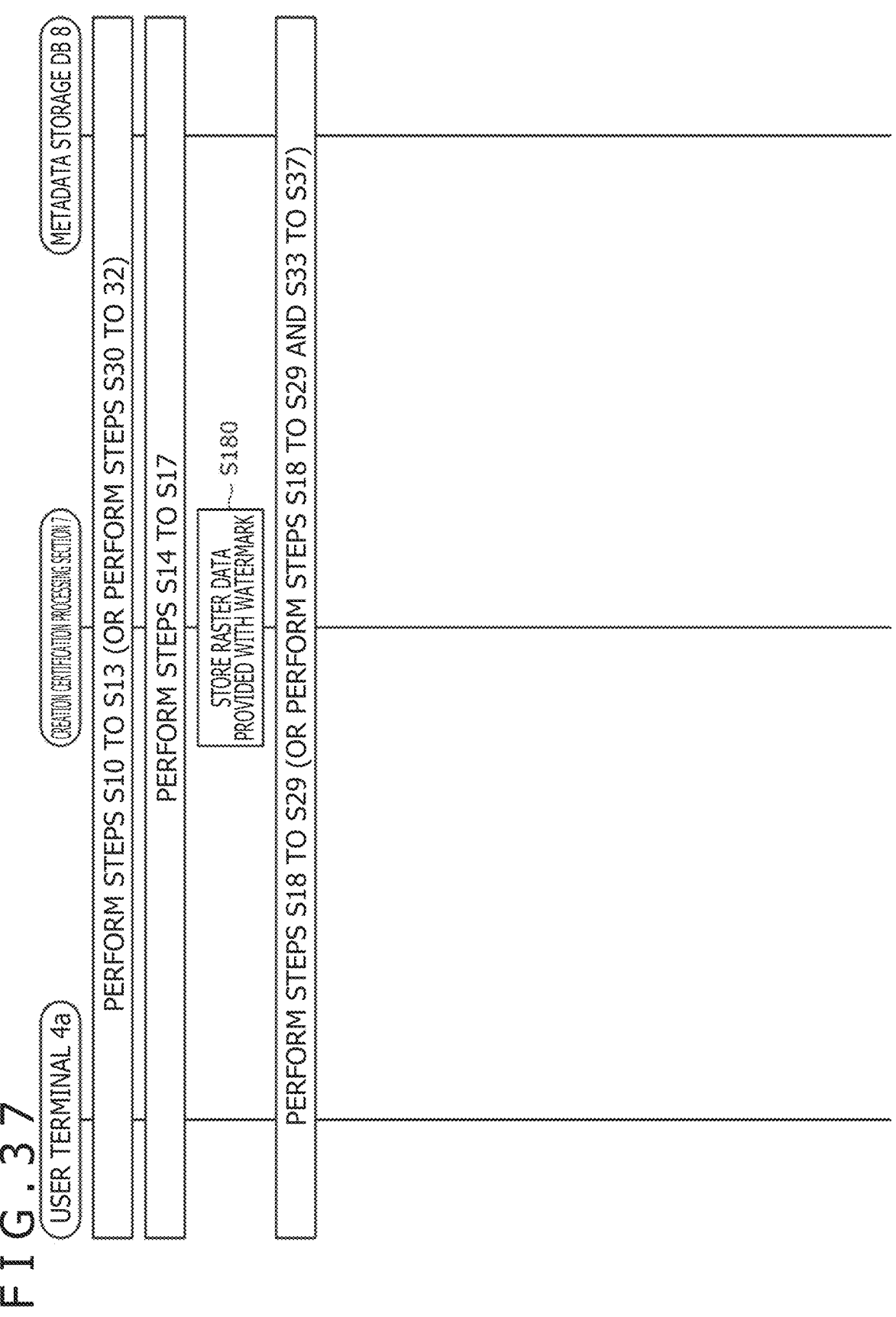

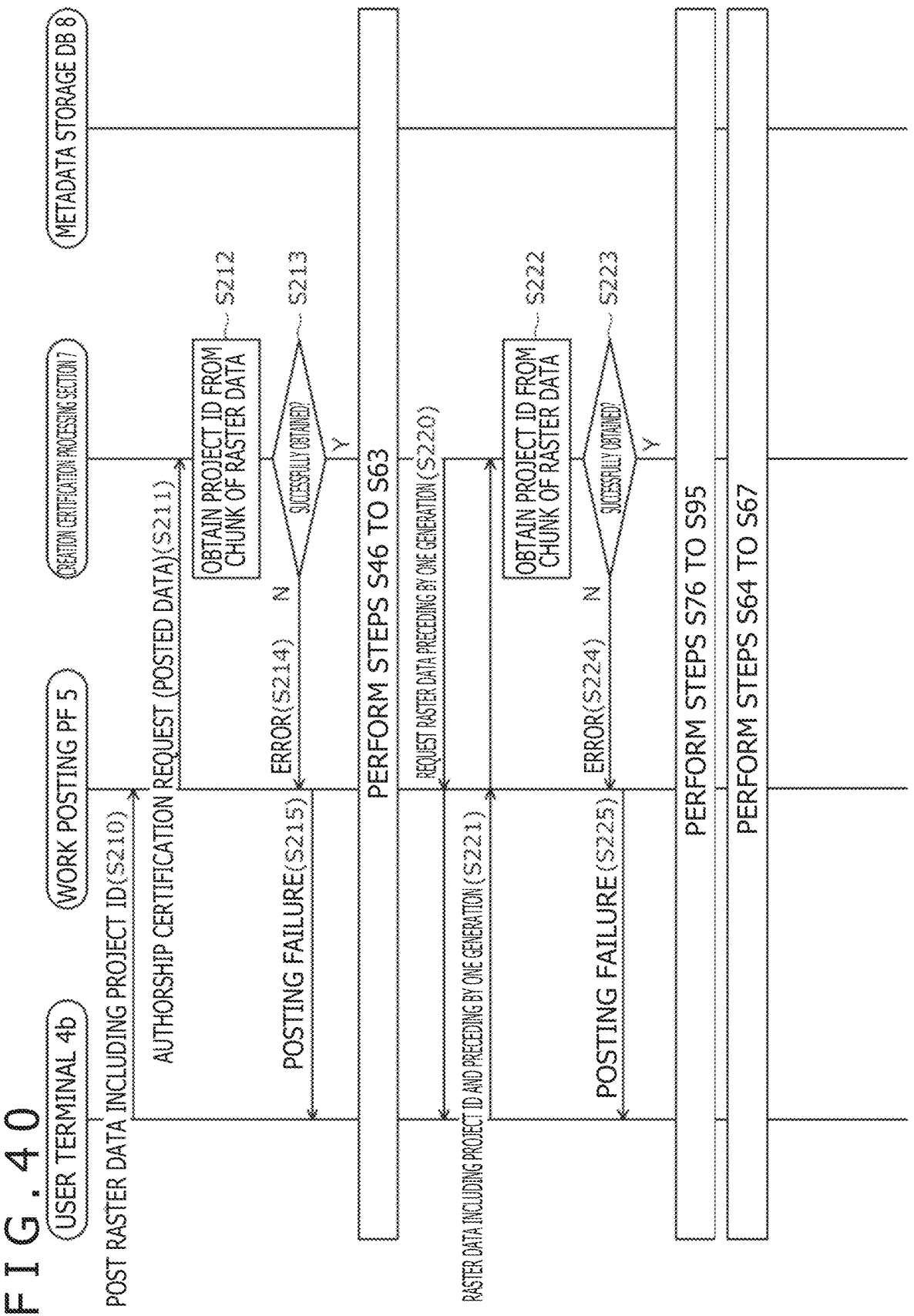
F I G . 4 0

AUTHORSHIP DETERMINING METHOD, COMPUTER, AND PROGRAM

TECHNICAL FIELD

The present disclosure relates to an authorship determining method, computer, and program.

BACKGROUND ART

Conventionally, it is a common practice to use a certificate of authenticity as a method for certifying authorship of a work of art. Patent Document 1 discloses a specific method for certifying that fine arts, crafts and the like are genuine articles by using certificates of authenticity.

PRIOR ART DOCUMENT

Patent Document

Patent Document 1: Japanese Patent No. 6894033

SUMMARY OF INVENTION

Technical Problem

However, in a case where works of art to be certified are ones digitally produced by pen input or the like (hereinafter referred to as "artworks"), any number of copies thereof can be made, and therefore authorship cannot be sufficiently certified by a conventional certificate of authenticity. On the other hand, converting the certificate of authenticity into an NFT (non-fungible token) has recently been considered. However, there are cases where a malicious person can also similarly make an NFT.

The present disclosure provides an authorship determining method, computer, and program that can certify the authorship of an artwork.

Technical Solution

An authorship determining method according to the present disclosure is an authorship determining method for determining authorship of an artwork by using a computer. The computer calculates a first hash value as a hash value of first pre-integration data as pre-integration data of the artwork, and generates a first creation certificate including the first hash value.

A computer according to the present disclosure is a computer including a processor, and used to determine authorship of an artwork, in which the processor is configured to calculate a hash value of pre-integration data of the artwork, and generate a creation certificate including the hash value.

A program according to the present disclosure is a program for causing a computer to execute processing of certifying authorship of an artwork, the program causing the computer to execute a step of calculating a hash value of pre-integration data of the artwork, and a step of generating a creation certificate including the hash value.

Advantageous Effect

According to the present disclosure, it is possible to certify the authorship of an artwork.

BRIEF DESCRIPTION OF DRAWINGS

FIG. 3 is a diagram illustrating an initial screen of a drawing application displayed on the user terminal 4a.

FIG. 4 is a diagram illustrating a login screen displayed immediately after a start of a creation certification mode.

FIG. 6 is a diagram illustrating a state of a canvas 15 in a stage in which the creation of an artwork by an artist has progressed halfway.

FIG. 9 is a diagram illustrating an example of a creation certificate generated by a creation certification processing section 7.

FIG. 10 is a diagram illustrating a state of the canvas 15 in a stage in which the creation of the artwork by the artist has further progressed.

FIG. 11 is a diagram illustrating a download screen displayed by the drawing application after a creation certification request is transmitted in response to a depression of "REQUEST CREATION CERTIFICATION" in FIG. 10.

FIG. 14 is a diagram illustrating a download screen displayed by the drawing application after a creation certification request is transmitted in response to a depression of "CREATION COMPLETION" in FIG. 13.

FIG. 17 is a flowchart illustrating processing from a start of the creation certification mode to the issuance of a new project.

FIG. 18 is a flowchart illustrating processing from a start (or continuation) of creation to the issuance of a creation certificate.

FIG. 19 is a flowchart illustrating the processing from the start (or continuation) of the creation to the issuance of the creation certificate.

FIG. 22 is a flowchart illustrating the processing performed to realize the posting of the artwork onto the release site by the artist.

FIG. 23 is a flowchart illustrating additional processing in a case where the certification of authorship is performed by using also raster data provided with a watermark and a creation certificate related to the artwork, which is one generation prior to a completed version of the artwork.

FIG. 24 is a flowchart illustrating the additional processing in the case where the certification of the authorship is performed by using also the raster data provided with a watermark and the creation certificate related to the artwork, which is one generation prior to the completed version of the artwork.

FIG. 25 is a flowchart illustrating processing related to a license for the artwork.

FIG. 26 is a diagram illustrating an example of a license certificate generated by the creation certification processing section 7.

FIG. 27 illustrates a project issuance completion screen displayed after completion of the issuance of a new project.

FIG. 28 is a diagram illustrating a screen state after a user presses a menu item "IMPORT" illustrated in FIG. 27.

FIG. 31 is a flowchart illustrating the processing for confirming whether or not the artwork user has the license to use the artwork of interest.

FIG. 33 is a flowchart illustrating processing from a start, continuation, and completion of creation to the issuance of a creation certificate, which processing is performed in an authorship certification system 1 according to a second embodiment of the present disclosure.

FIG. 35 is a diagram illustrating an example of a creation certificate generated by the creation certification processing section 7 according to the third embodiment of the present disclosure.

FIG. 37 is a flowchart illustrating processing from a start, continuation, and completion of creation to the issuance of a creation certificate, which processing is performed in an authorship certification system 1 according to a fourth embodiment of the present disclosure.

FIG. 40 is a flowchart illustrating processing performed in the authorship certification system 1 according to the fifth embodiment of the present disclosure in order to realize the posting of the artwork onto the release site by the artist.

DETAILED DESCRIPTION

Embodiments of the present disclosure will hereinafter be described in detail with reference to the accompanying drawings.

Figure 1:
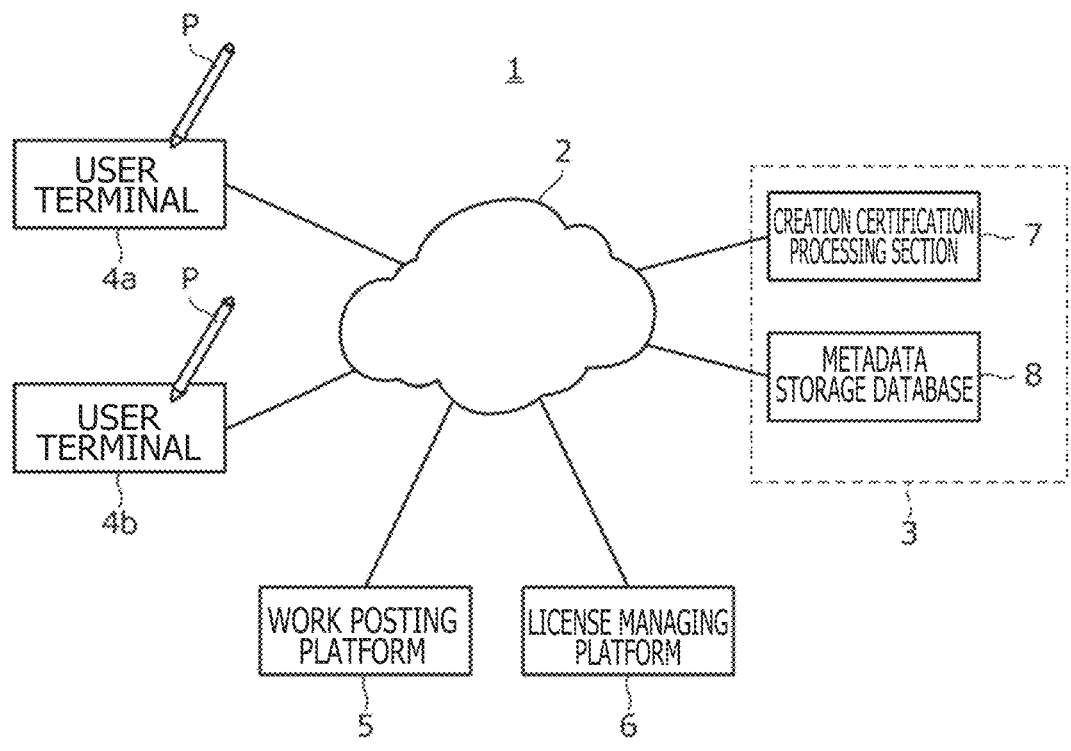
FIG. 1 is a diagram illustrating a configuration of an authorship certification system 1 according to a first embodiment of the present disclosure.

FIG. 1 is a diagram illustrating a configuration of an authorship certification system 1 according to a first embodiment of the present disclosure. As illustrated in the figure, the authorship certification system 1 has a configuration in which a creation certification system 3, user terminals 4a and 4b, a work posting platform 5, and a license managing platform 6 are interconnected via a network 2.

Figure 2:
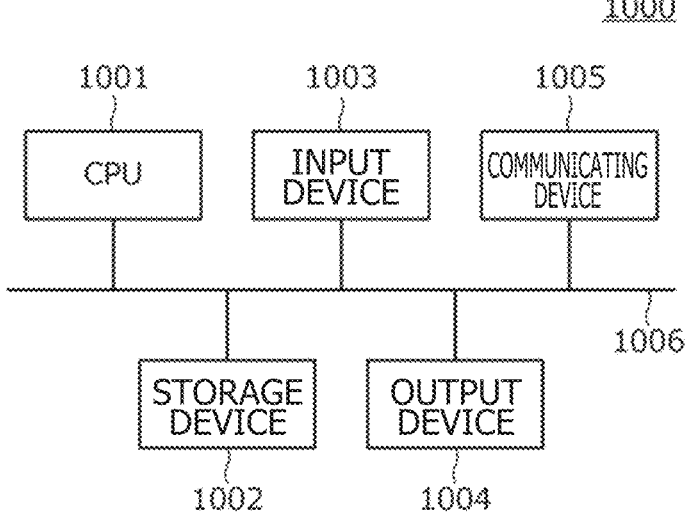
FIG. 2 is a diagram illustrating an example of a hardware configuration of a creation certification system 3, user terminals 4a and 4b, a work posting platform 5, and a license managing platform 6.

FIG. 2 is a diagram illustrating an example of a hardware configuration of the creation certification system 3, the user terminals 4a and 4b, the work posting platform 5, and the license managing platform 6. Each of the creation certification system 3, the user terminals 4a and 4b, the work posting platform 5, and the license managing platform 6 can be constituted by a computer 1000 having the illustrated configuration. Incidentally, each of the creation certification system 3, the work posting platform 5, and the license managing platform 6 may be constituted by a combination of a plurality of computers 1000.

As illustrated in FIG. 2, the computer 1000 has a configuration in which a CPU (Central Processing Unit) 1001, a storage device 1002, an input device 1003, an output device 1004, and a communicating device 1005 are interconnected via a bus 1006.

The CPU 1001 is a device (processor) that controls various parts of the computer 1000, and reads and executes various kinds of programs stored in the storage device 1002. Various processing to be described with reference to the following FIGS. 3 to 32 is implemented by the execution of the programs stored in the storage device 1002 by the CPU 1001 of each of the creation certification system 3, the user terminals 4a and 4b, the work posting platform 5, and the license managing platform 6.

The storage device 1002 includes a main storage device such as a DRAM (Dynamic Random Access Memory) and an auxiliary storage device such as a hard disk. The storage device 1002 plays a role of storing an operating system of the computer 1000, various kinds of programs for executing various kinds of applications, and data used by these programs. A metadata storage database 8 to be described later is implemented within the storage device 1002 of the creation certification system 3.

The input device 1003 is a device that receives an input operation of a user, and supplies the input operation to the CPU 1001. The input device 1003 includes, for example, a keyboard, a mouse, and a touch detecting device. Of these, the touch detecting device is a device including a touch sensor and a touch controller, and is used to detect a pen input or a touch input. Pens P illustrated in FIG. 1 are electronic pens used to perform pen input to the touch detecting devices of the user terminals 4a and 4b. The pen input of the pens P is implemented by an active capacitive system or an electromagnetic induction system, for example.

The output device 1004 is a device that outputs a processing result of the CPU 1001 to the user. The output device 1004 includes, for example, a display and a speaker. The communicating device 1005 is a device for communicating with an external device. The communicating device 1005 performs data transmission and reception according to instructions of the CPU 1001. Each of the creation certification system 3, the user terminals 4a and 4b, the work posting platform 5, and the license managing platform 6 performs communication with another device, a system, a network, or the like by using the communicating device 1005.

The description returns to FIG. 1. The user terminals 4a and 4b are computers used by artists. The user terminals 4a and 4b are used for creating an artwork, requesting creation certification of the artwork, posting the artwork on a release site, applying for a license for the artwork, and the like. FIG. 1 illustrates only two user terminals 4a and 4b. In practice, however, a large number of user terminals can be connected to the network 2. Any computers such as personal computers, tablet terminals, and smart phones can be used as concrete hardware of the user terminals 4a and 4b.

The user terminals 4a and 4b are configured to be able to execute a drawing application for creating an artwork by using a pen P. However, the artwork may be created by another drawing application.

The drawing application is generally configured to generate image data as a final artwork by performing rasterization processing that integrates each piece of partial data into the one artwork after inputting an artwork for each layer (such artwork will be hereinafter referred to as a "partial artwork"). In the following, data including a set of a plurality of partial artworks before the integration will be referred to as "pre-integration data" (Pre-synthesized data), and the image data obtained by the rasterization will be referred to as "raster data." Specific formats of the pre-integration data and the raster data are not particularly limited. BMP, JPEG, PNG, TIFF, and the like can be used as the format of the raster data.

The creation certification system 3 is a computer that issues a creation certificate (Creation Credential Data) for certifying the authorship of the artwork in response to a request of the artist. As illustrated in FIG. 1, the creation certification system 3 includes a creation certification processing section 7 and a metadata storage database 8. Artists perform user registration with the creation certification system 3 in advance, and thereafter use the creation certification system 3 through the user terminals 4a and 4b.

The creation certification processing section 7 is a functional section that performs processing including processing of issuing the creation certificate of the artwork in response to the reception of a request for the creation certification of the artwork from the user terminal 4a, processing of certifying the authorship of a poster in response to the reception of a request for the authorship certification of the posted artwork from the work posting platform 5, processing of issuing a license certificate (Artwork License Credential Data) of the artwork in response to the reception of an application for a license for the artwork from the license managing platform 6, and processing of certifying the license for the artwork in response to the reception of a request for the license certification of the artwork from the user terminal 4b. The creation certification processing section 7 also performs processing of generating a project related to the creation of the artwork, and embedding a watermark indicating a project identifier (ID) for identifying the project in the raster data. The artwork posted on the work posting platform 5 by the artist and the artwork used by the licensed user are the raster data thus embedded with the watermark.

The metadata storage database 8 is a database for storing various kinds of data (metadata) related to the project described above. Examples of the metadata include bibliographic items (a title, an artist name, and the like) of the artwork, various kinds of time stamps, the creation certificate, the license certificate, and the like.

The work posting platform 5 is a computer having a function of receiving a posting of the artwork by the artist, and uploading the posted artwork to the release site. The work posting platform 5 is configured to receive the posting after confirming that the poster of the artwork is the creator of the artwork (authorship) in cooperation with the creation certification system 3. The posting is not received when the confirmation cannot be made. Thus, posting by a person other than the artist is prohibited.

The license managing platform 6 is a computer having a function of receiving an application for a license for the artwork from a user who desires to use the artwork, and issuing a license certificate in cooperation with the creation certification system 3. The issuance of the license certificate is performed after a confirmation is obtained also from the artist.

FIGS. 3 to 8 and FIGS. 10 to 15 are diagrams illustrating screens of the drawing application displayed on the user terminal 4a. In the following, processing from a start of the creation of an artwork to the issuance of a creation certificate will be described with reference to these drawings.

First, in reference to FIG. 3 describing a basic configuration of a screen displayed by the drawing application, the drawing application includes a tab bar 10, a command bar 11, a palette region 12, and a canvas window 13. The tab bar 10 is a region that has a list of tabs such as "FILE" and "EDIT." When each tab is depressed (specifically, is clicked or tapped), a menu window 14 as illustrated in the figure is displayed. The menu window 14 illustrated in FIG. 3 and the following figures is the menu window 14 displayed when the "FILE" tab is depressed. A menu for starting various functions possessed by the drawing application is disposed within the menu window 14. When the user depresses each menu item, a corresponding function is started.

The command bar 11 is a region in which icons for starting the various functions possessed by the drawing application are arranged. When the user depresses each icon, a corresponding function is started. The palette region 12 is a region in which a palette for making various kinds of settings of the drawing application is arranged. The palette region 12 is configured to allow a plurality of palettes to be arranged therein. Examples of setting contents on the palette(s) include the line width or line color of a line drawn by the pen P, a display magnification within the canvas window 13, and the like. The canvas window 13 is a region in which a canvas 15 (see FIG. 6) for the user to draw a picture by using the pen P or the like is disposed, and the canvas window 13 is a region constituting various kinds of user interface screens as illustrated in FIG. 4 and the like.

FIG. 3 illustrates an initial screen displayed immediately after a start of the drawing application. As illustrated in the figure, the menu window 14 displayed when the "FILE" tab is depressed on the initial screen of the drawing application includes a menu item "START CREATION CERTIFICA-TION MODE" for starting the creation certification mode. When the artist depresses this menu item, the drawing application starts the creation certification mode. The creation certification mode is a mode in which a creation certificate is issued to certify, for a picture drawn on the canvas 15 by the artist while this mode is entered, that the picture is one created by the artist.

FIG. 4 illustrates a login screen displayed immediately after the start of the creation certification mode. This login screen is a screen for the artist to log in to the creation certification system 3. As illustrated in the figure, the login screen includes text boxes 20 and 21, a login button 22, and a sign-up button 23. The text box 20 is an object for inputting a user ID of the artist in the creation certification system 3. The text box 21 is an object for inputting a password corresponding to the user ID. When the user depresses the login button 22 after inputting the user ID and the password to the text boxes 20 and 21, predetermined login processing is performed between the drawing application and the creation certification processing section 7 of the creation certification system 3. When the login has succeeded, the drawing application enters the creation certification mode. When the login has failed, the drawing application returns to a state (normal mode) before the creation certification mode is started. The sign-up button 23 is a button for starting processing of making user registration with the creation certification system 3 in a case where the artist has not yet made the user registration with the creation certification system 3.

As illustrated in FIG. 4, the menu window 14 displayed when the "FILE" tab is depressed on the login screen includes a menu item "ISSUE NEW PROJECT" for issuing a new project. When the artist who has succeeded in the login depresses this menu item, a new project issuance instruction is transmitted from the drawing application to the creation certification processing section 7. Receiving this instruction, the creation certification processing section 7 generates a DID (Decentralized Identifier) document of the new project and registers the DID document in a distributed file system, records a DID including a hash value of the DID document (the hash value is an address within the distributed file system) on a blockchain, and thereby issues the new project. The thus issued project is one issued for each artwork, and is used to collectively manage various kinds of information (the creation certificate, the license certificate, the bibliographic items of the artwork, and the like) related to the corresponding artwork. The DID recorded on the blockchain is used as a project ID for thereafter identifying the project.

Here, the DID is a decentralized ID used in self-sovereign identity, and is permanently recorded on a blockchain network 7. The self-sovereign identity is a mechanism that solves various problems caused by centralized ID management by enabling a person himself/herself to retain and control an own identity (Identity; hereinafter referred to as an "ID") without the intervention of a management entity. The self-sovereign identity is generally referred to as SSI (Self-Sovereign Identity). The creation certificate and the license certificate used in the present embodiment may be verifiable certificate VCs (Verifiable Credentials) as certificates used in SSI.

Figure 5:
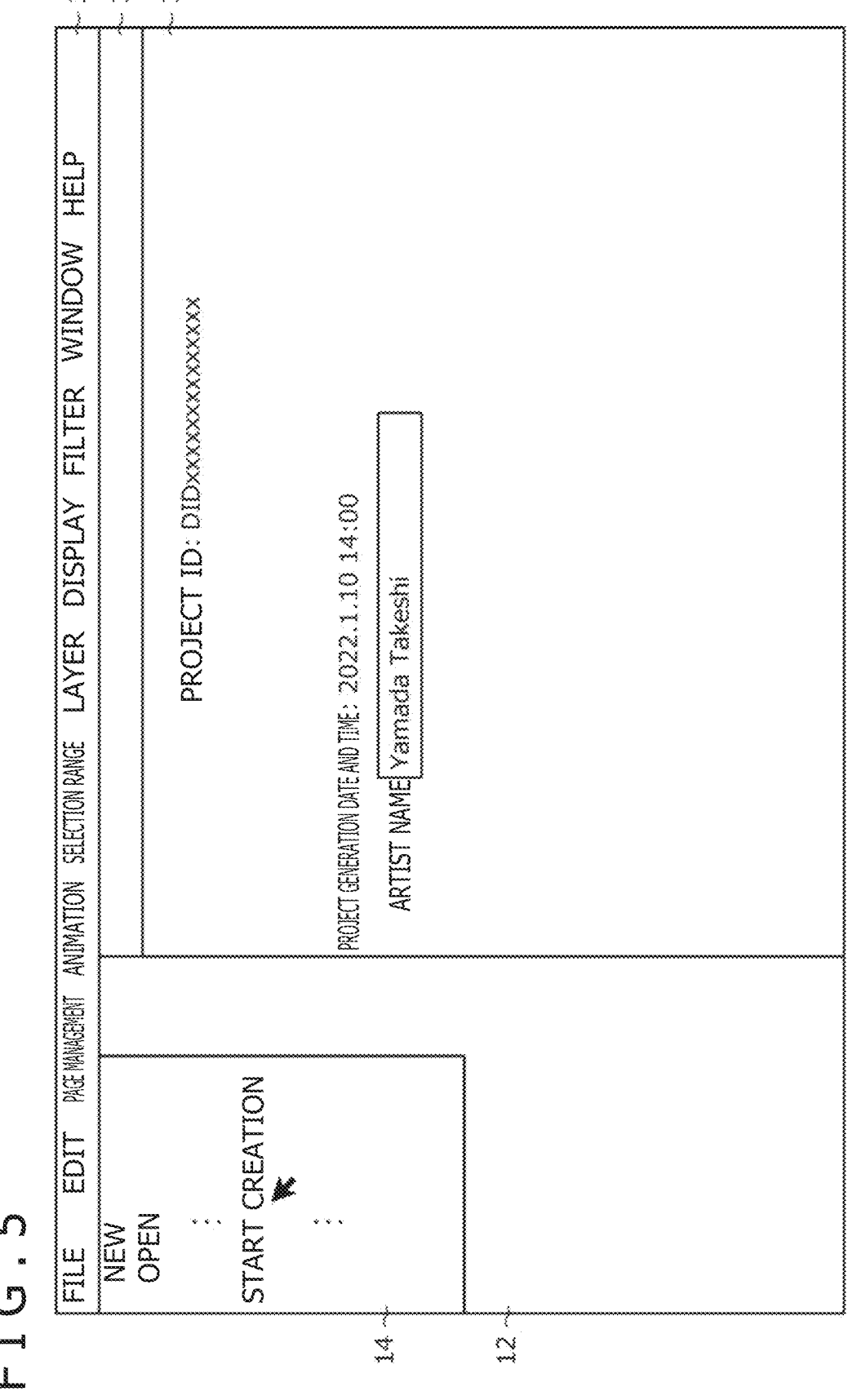
FIG. 5 is a diagram illustrating a project issuance completion screen displayed after the issuance of a new project is completed.

FIG. 5 illustrates a project issuance completion screen displayed after the issuance of the new project is completed. A project generation date and time and an artist name illustrated in the figure are data stored as metadata of the project in the metadata storage database 8 by the creation certification processing section 7. The project generation date and time is a time stamp indicating a date and time that the issuance of the project is completed. The artist name is configured to be able to be input by the artist on this screen.

When the issuance of the project is completed, a menu item "START CREATION" for starting creation is displayed within the menu window 14, as illustrated in FIG. 5. When the artist depresses this menu item, the drawing application displays a canvas 15 (see FIG. 6) within the canvas window 13. The artist creates an artwork by drawing a picture within the canvas 15 by using the pen P or the like.

FIG. 6 illustrates a state of the canvas 15 in a stage in which the creation of the artwork by the artist has progressed halfway. When the canvas 15 is displayed in the creation certification mode, the drawing application displays, within the menu window 14, a menu item "REQUEST CREATION CERTIFICATION" for requesting creation certification and "CREATION COMPLETION" for instructing a creation completion. Supposing here that the artist depresses "REQUEST CREATION CERTIFICATION," a creation certification request is transmitted from the drawing application to the creation certification processing section 7. This creation certification request includes pre-integration data and raster data in this stage.

Figure 7:
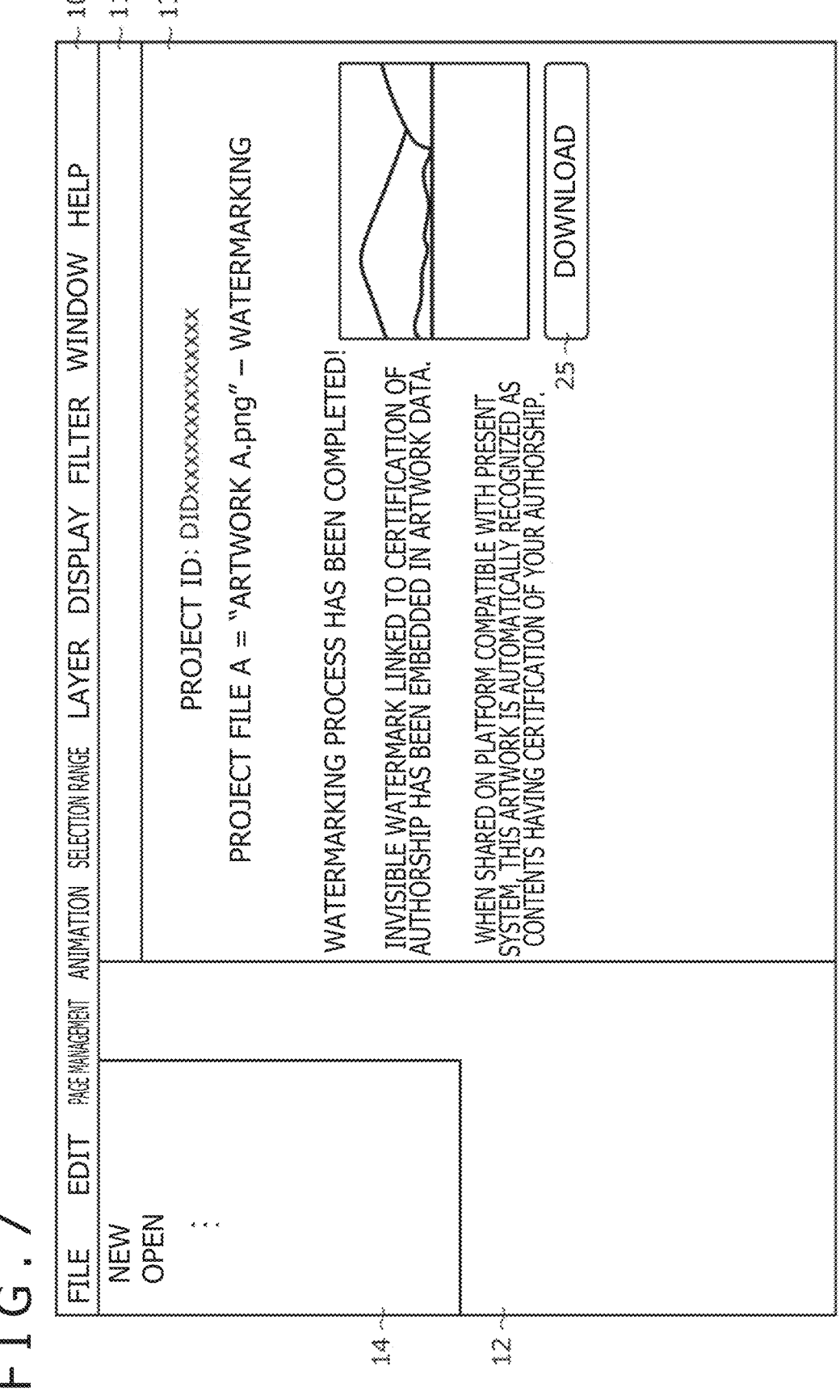
FIG. 7 is a diagram illustrating a download screen displayed by the drawing application after a creation certification request is transmitted in response to a depression of "REQUEST CREATION CERTIFICATION" in FIG. 6.

FIG. 7 illustrates a download screen displayed by the drawing application after the creation certification request is transmitted in response to the depression of "REQUEST CREATION CERTIFICATION" in FIG. 6. As illustrated in the figure, the download screen displays the project ID, a download button 25, a display of a "project file A," a display of a file name "artwork A.png" of a file to be downloaded by a depression of the download button 25, a descriptive sentence for the user, a thumbnail of the raster data transmitted by the creation certification request, and the like.

Here, the project file is a file generated for each creation certificate by the creation certification processing section 7, and is used to collectively manage the generated creation certificate and various kinds of data related to the creation certificate. A symbol "A" at the tail end of the project file denotes the order of generation of project files in which this file is generated in the project. The symbol is incremented to "B" and "C," for example, as the number of project files is increased. "A" in the "artwork A.png" is also provided for a similar purpose.

As is also indicated by the descriptive sentence within the screen, the creation certification processing section 7 that has received the creation certification request performs processing of embedding an invisible watermark linked to the certification of authorship in the raster data in the creation certification request. Specifically, the project ID is converted into a watermark, which is embedded into the raster data. A specific mode of the watermark and a method for embedding the watermark into the raster data are not particularly limited. However, as illustrated in Japanese Patent Laid-Open No. 2022-002130, for example, it suffices to use a method that uses a two-dimensional code indicating the project ID as the watermark, and embeds the watermark in one of three color channels constituting the raster data by using singular value decomposition.

When the artist depresses the download button 25 on the download screen of FIG. 7, the "artwork A.png" as the raster data provided with the watermark is downloaded to the user terminal 4a. The artist stores the thus downloaded raster data provided with the watermark in advance, and uses the raster data provided with the watermark as posting data at a time of posting the artwork to the work posting platform 5. Incidentally, when the download screen of FIG. 7 is displayed without the download button 25 being provided within the download screen of FIG. 7, the raster data provided with the watermark may be automatically downloaded to the user terminal 4a in a background.

Figure 8:
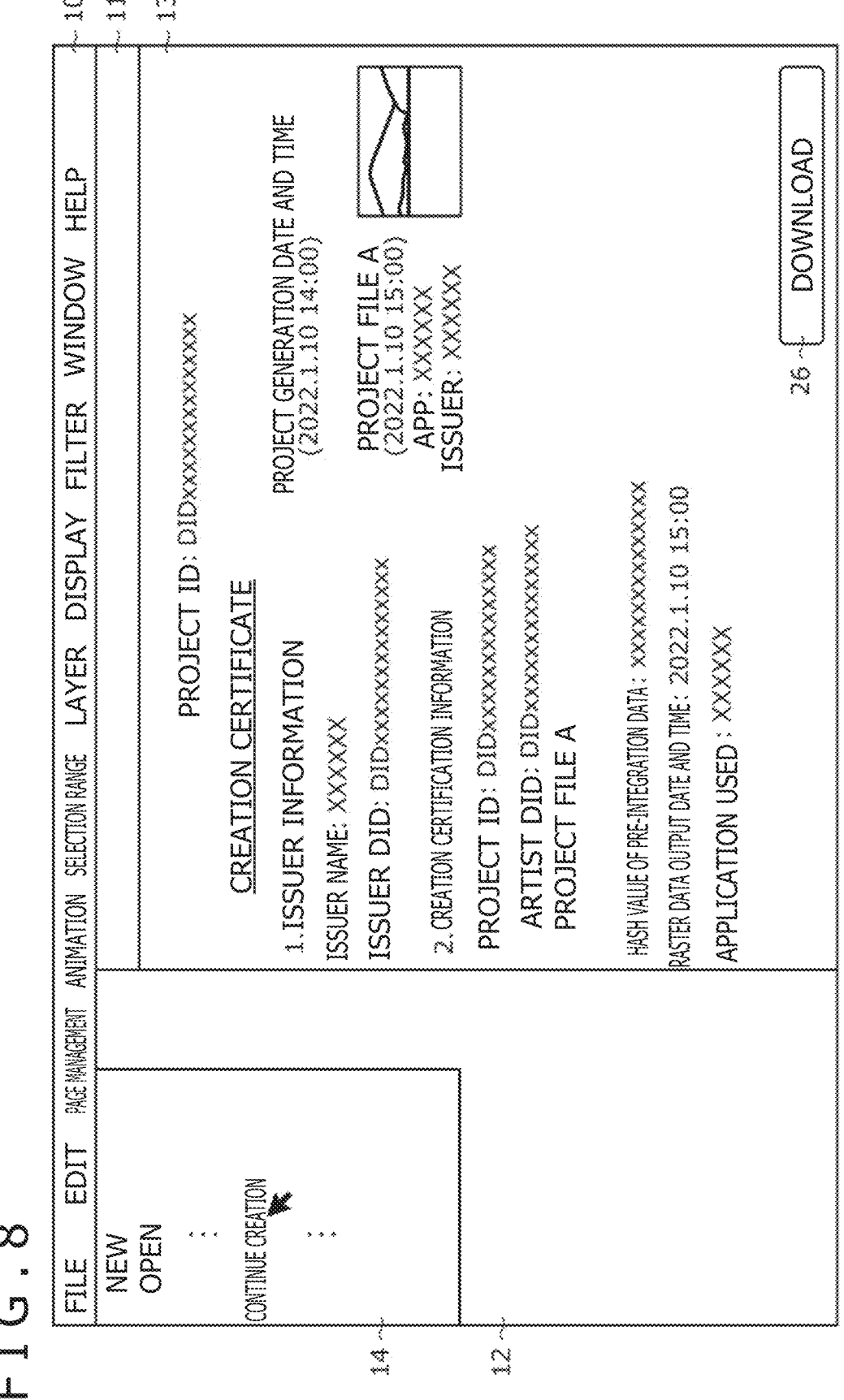
FIG. 8 is a diagram illustrating a creation certificate screen displayed by the drawing application after completion of the download of raster data provided with a watermark on the download screen of FIG. 7.

FIG. 8 illustrates a creation certificate screen displayed by the drawing application after completion of the download of the raster data provided with the watermark on the download screen of FIG. 7. The creation certification processing section 7 is configured to generate a creation certificate following the generation of the raster data provided with the watermark. The creation certificate screen of FIG. 8 illustrates the contents of the thus generated creation certificate.

FIG. 9 is a diagram illustrating an example of the creation certificate generated by the creation certification processing section 7. As illustrated in the figure, the creation certificate includes issuer information (Issuer Information) and creation certification information (Creation Proof Information). The issuer information is information indicating an issuer of this creation certificate. The issuer information includes an issuer name and an issuer DID. The issuer name is typically the name of a company that operates the creation certification system 3. The issuer DID is the DID of the issuer. A DID document corresponding to this DID includes the public key of the issuer.

The creation certification information includes the project ID, an artist DID, project file identifying information, the hash value of the pre-integration data, a raster data output date and time, and the application used. Of these, the artist DID is the DID of the artist. The creation certification system 3 is configured to obtain the artist DID from the artist in advance at the time of the user registration, and store the artist DID in association with the user ID of the artist. A DID document corresponding to the artist DID includes the public key of the artist. The project file identifying information is information that identifies the "project file" described above.

The hash value of the pre-integration data is a hash value obtained by plugging the pre-integration data within the creation certification request into a predetermined hash function. The raster data output date and time is a time stamp indicating a date and time that the raster data provided with the watermark is generated. The application used is information indicating the drawing application that transmitted the creation certification request (that is, the drawing application used by the artist to create the artwork).

The creation certification processing section 7 encrypts the creation certification information by the private key of the issuer (that is, performs a digital signature of the issuer on the creation certification information), and disposes the encrypted creation certification information in the creation certificate. Thus, a person who subsequently receives the creation certificate can confirm that the source of the creation certificate is the issuer by performing decryption using the public key of the issuer.

The description returns to FIG. 8. The creation certificate screen illustrated in FIG. 8 displays the project ID, information indicating a history of the project, and a download button 26 in addition to the contents of the creation certificate described with reference to FIG. 9. The information indicating the history of the project includes a project generation date and time and information indicating an outline of each project file included in the project (FIG. 8 shows only information about the project file A).

When the artist depresses the download button 26 on the creation certificate screen of FIG. 8, the creation certificate is downloaded to the user terminal 4a. The artist stores the thus downloaded creation certificate in advance, and uses the creation certificate to submit the creation certificate according to a request to submit the creation certificate of the artwork when the request is made from the creation certification system 3.

While displaying the creation certificate screen, the drawing application displays a menu item "CONTINUE CREATION" within the menu window 14, as illustrated in FIG. 8. When the artist depresses this "CONTINUE CRE- ATION," the drawing application displays the canvas 15 within the canvas window 13 again.

FIG. 10 illustrates a state of the canvas 15 in a stage in which the creation of the artwork by the artist has further progressed. When the artist depresses "REQUEST CREATION CERTIFICATION" within the menu window 14 on the screen again, a creation certification request including the pre-integration data and the raster data in this stage is transmitted from the drawing application to the creation certification processing section 7, as in the case of FIG. 6.

FIG. 11 illustrates a download screen displayed by the drawing application after the creation certification request is transmitted in response to the depression of "REQUEST CREATION CERTIFICATION" in FIG. 10. The contents of the screen illustrated in FIG. 11 are similar to those of FIG. 7 except that the "project file A" and the "artwork A.png" are respectively changed to a "project file B" and an "artwork B.Png." Also in this case, the raster data provided with a watermark is generated by processing similar to the processing described with reference to FIG. 7, and is downloaded to the user terminal 4a.

Figure 12:
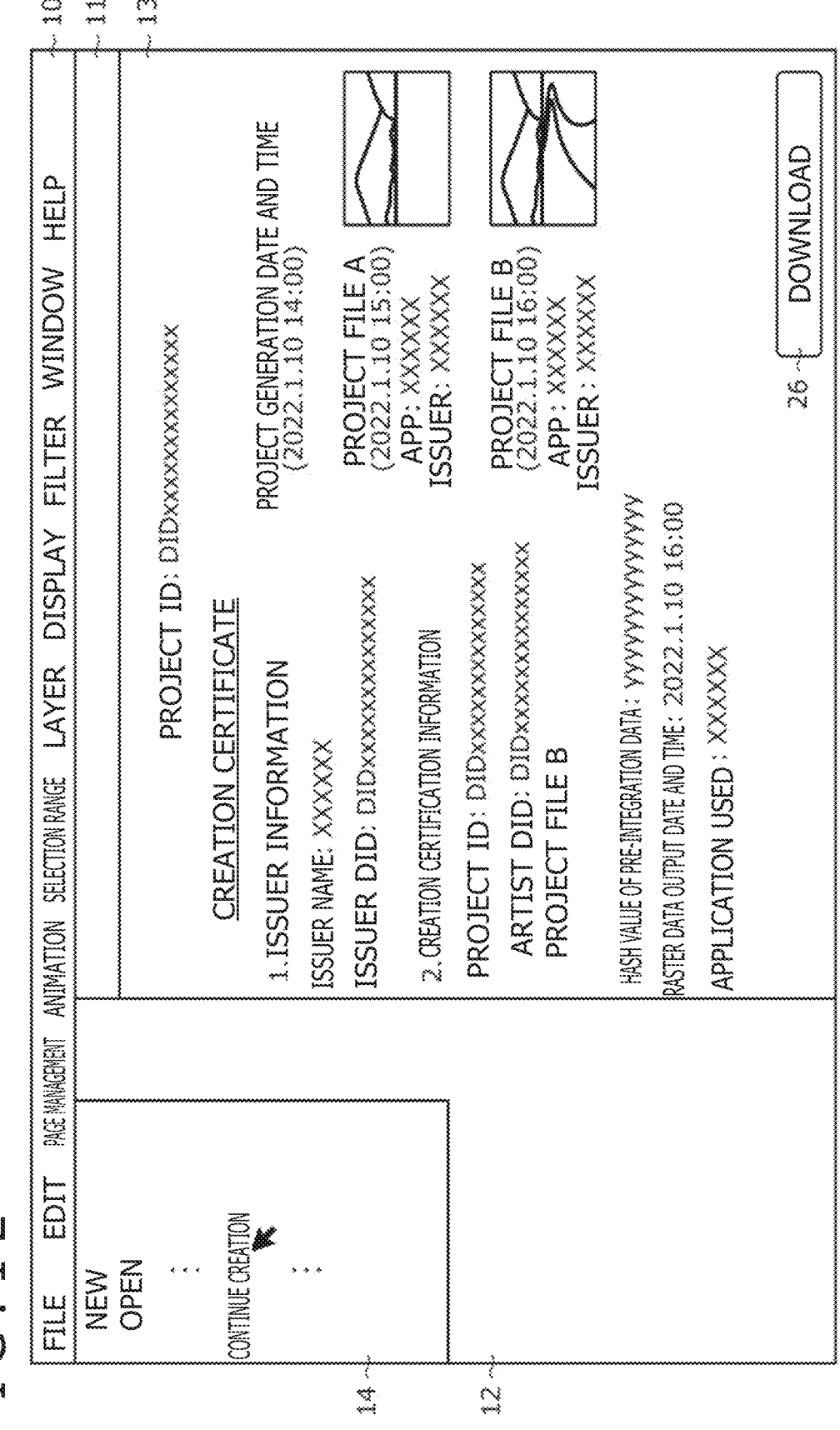
FIG. 12 is a diagram illustrating a screen displayed by the drawing application after completion of the download of raster data provided with a watermark on the download screen of FIG. 11.

FIG. 12 illustrates a screen displayed by the drawing application after completion of the download of the raster data provided with the watermark on the download screen of FIG. 11. The contents of the screen illustrated in FIG. 12 are similar to those of FIG. 8 except that the contents of the screen illustrated in FIG. 12 are different in that the creation certification information is information about the project file B and in that the information about the project file B is added to the information indicating the history of the project. Also in this case, a creation certificate is generated by processing similar to the processing described with reference to FIG. 8, and is downloaded to the user terminal 4a. The screen illustrated in FIG. 12 is similar to that of FIG. 8 also in that the menu item "CONTINUE CREATION" is displayed within the menu window 14. Supposing here that the artist depresses "CONTINUE CREATION" again, the drawing application displays the canvas 15 within the canvas window 13 again.

Figure 13:
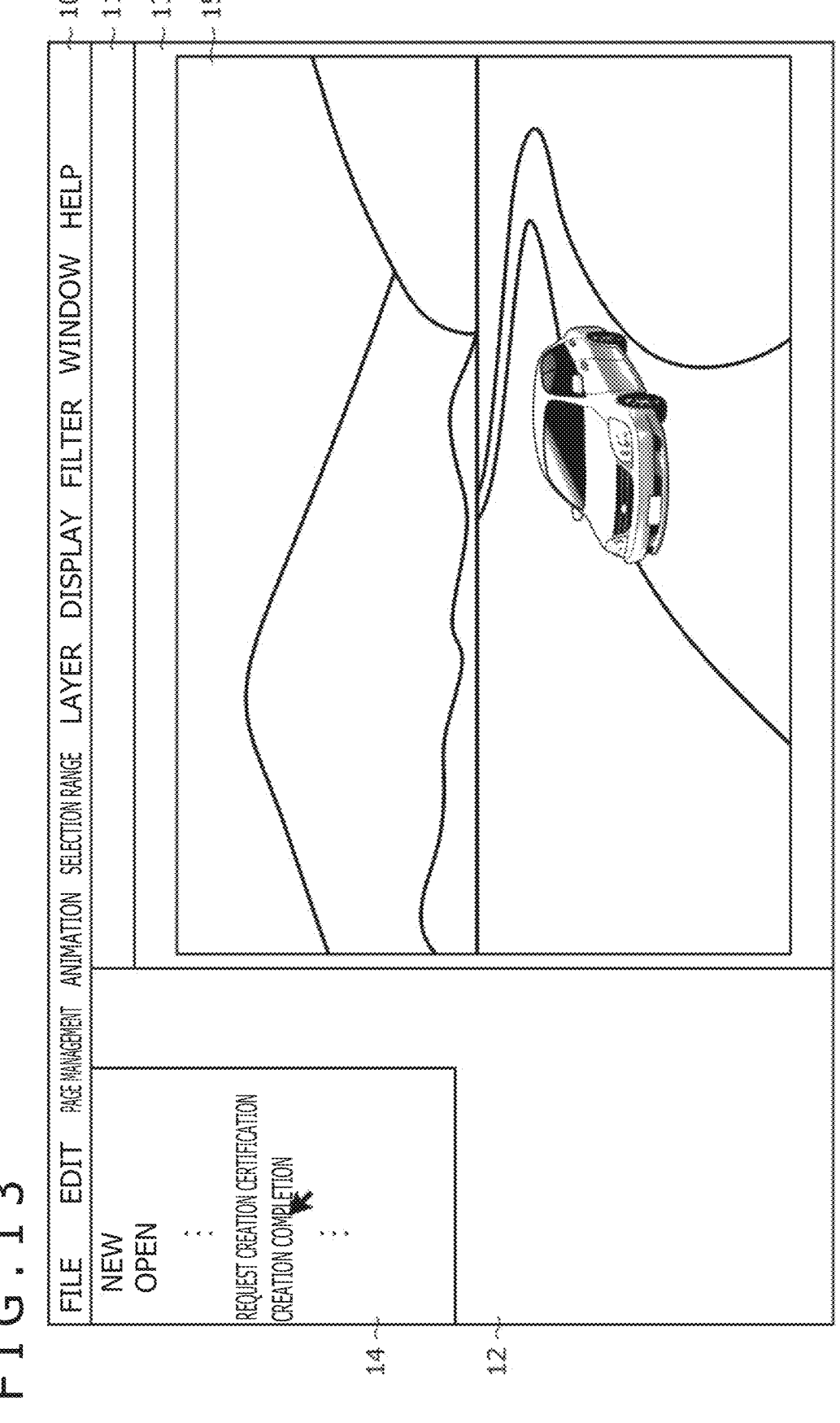
FIG. 13 is a diagram illustrating a state of the canvas 15 in a stage in which the creation of the artwork by the artist has further progressed.

FIG. 13 illustrates a state of the canvas 15 in a stage in which the creation of the artwork by the artist has further progressed. In the present embodiment, supposing that the artwork in this state is a final completed version of the artwork, the artist depresses a menu item "CREATION COMPLETION" within the menu window 14. Then, as in the case where the artist depresses "REQUEST CREATION CERTIFICATION" in FIG. 6 or FIG. 10, a creation certification request including the pre-integration data and the raster data in this stage is transmitted from the drawing application to the creation certification processing section 7.

FIG. 14 illustrates a download screen displayed by the drawing application after the creation certification request is transmitted in response to the depression of "CREATION COMPLETION" in FIG. 13. The contents of the screen illustrated in FIG. 14 are similar to those of FIG. 7 except that the "project file A" and the "artwork A.Png" are respectively changed to a "project file C" and an "artwork C.png." Also in this case, the raster data provided with a watermark is generated by processing similar to the processing described with reference to FIG. 7, and is downloaded to the user terminal 4a.

Figure 15:
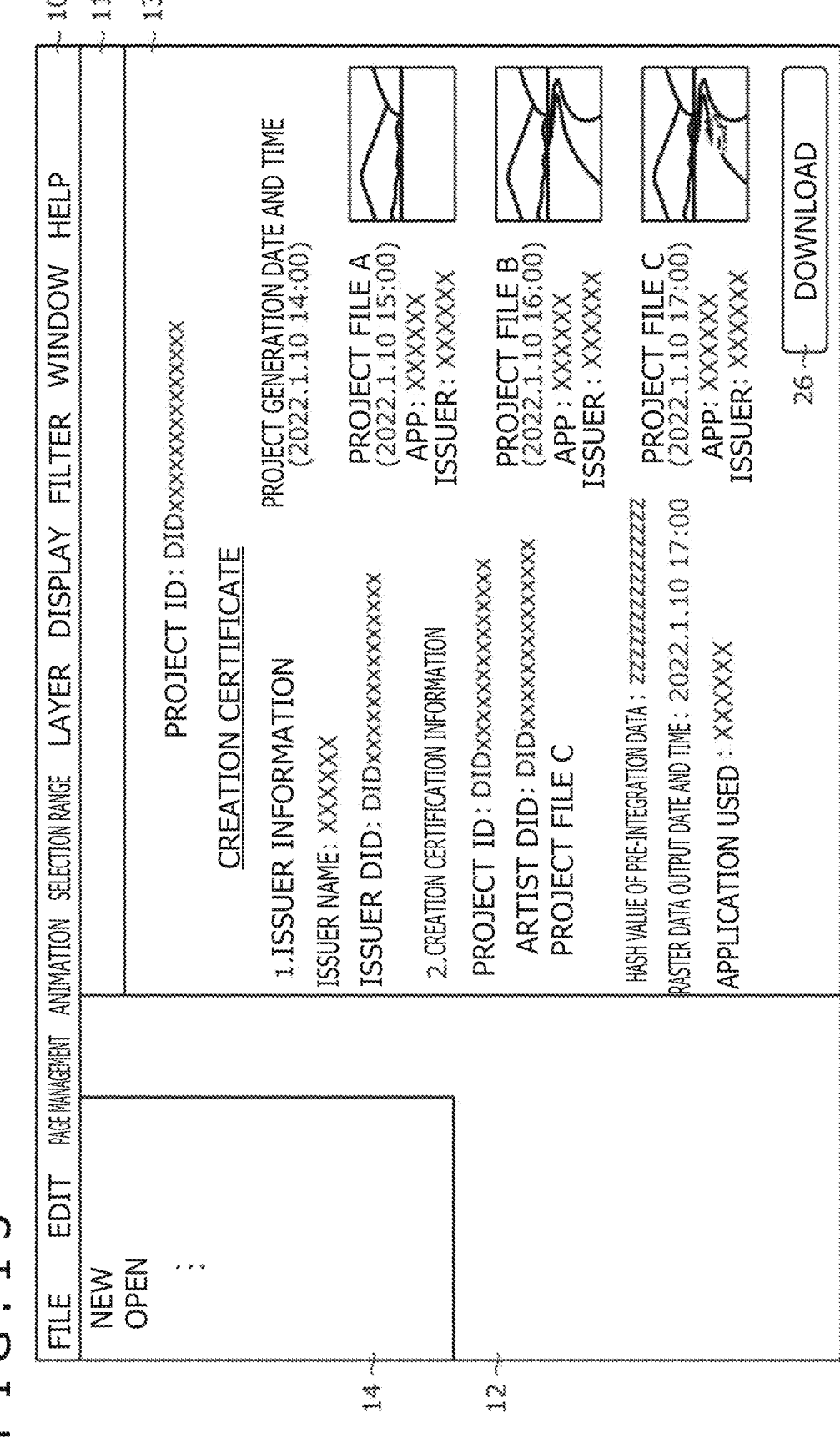
FIG. 15 is a diagram illustrating a screen displayed by the drawing application after completion of the download of raster data provided with a watermark on the download screen of FIG. 14.

FIG. 15 illustrates a screen displayed by the drawing application after completion of the download of the raster data provided with the watermark on the download screen of FIG. 14. The contents of the screen illustrated in FIG. 15 are similar to those of FIG. 12 except that the contents of the screen illustrated in FIG. 15 are different in that the creation certification information is information about the project file C and in that the information about the project file C is further added to the information indicating the history of the project. Also in this case, a creation certificate is generated by processing similar to the processing described with reference to FIG. 8, and is downloaded to the user terminal 4*a*. Incidentally, the menu item "CONTINUE CREATION" illustrated in FIG. 8 and FIG. 12 is not displayed in the menu window 14 illustrated in FIG. 15.

Figure 16:
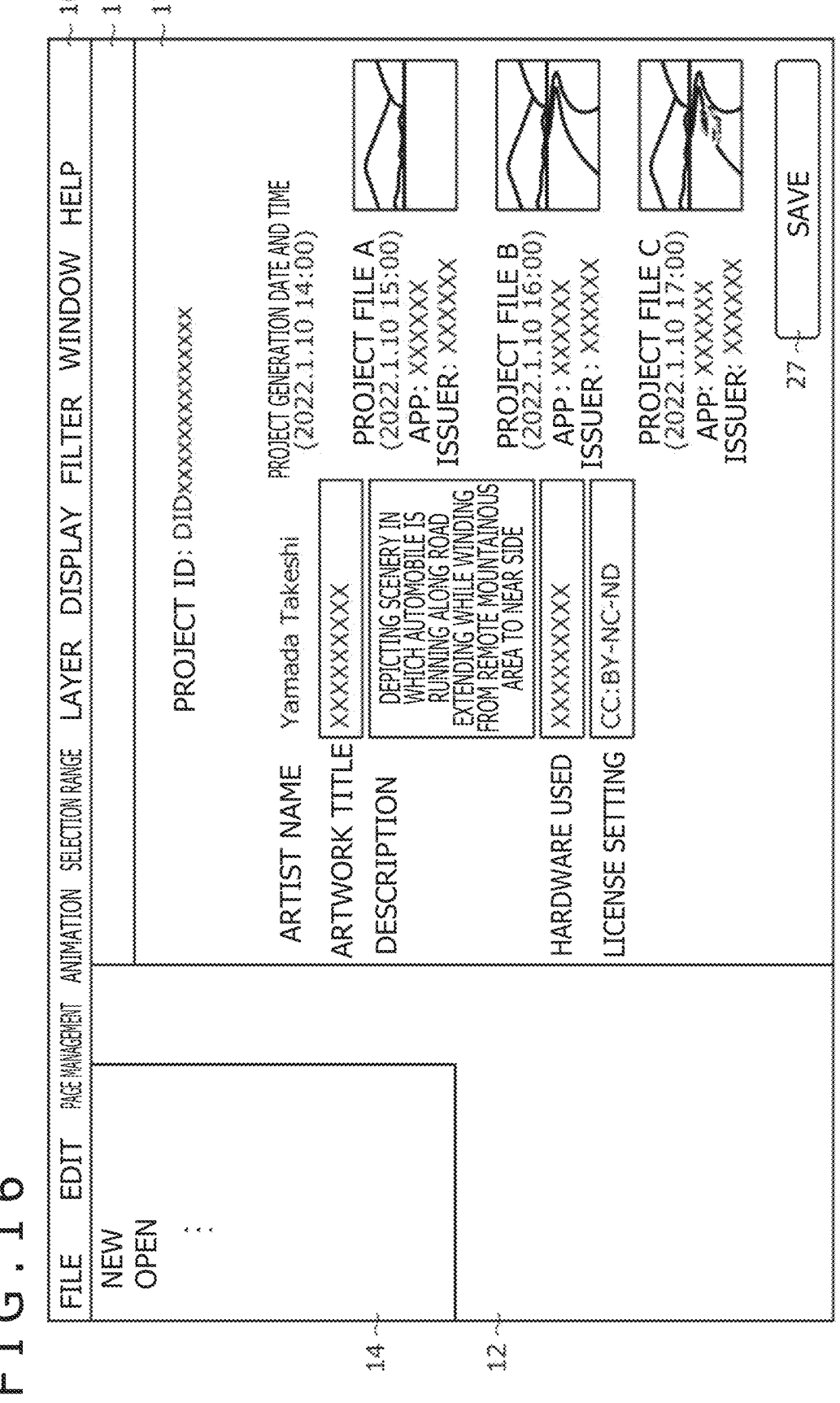
FIG. 16 illustrates a bibliographic item input screen displayed by the drawing application after completion of the download of a creation certificate on the creation certificate screen of FIG. 15.

FIG. 16 illustrates a bibliographic item input screen displayed by the drawing application after completion of the download of the creation certificate on the creation certificate screen of FIG. 15. The artist inputs, on this bibliographic item input screen, bibliographic items of the artwork which has been created. Concrete examples of the bibliographic items of the artwork input here include a title, a description, hardware used, a license setting, and the like. When the artist inputs various items on the bibliographic item input screen, and then depresses a save button 27, the creation certification processing section 7 stores the input bibliographic items as metadata of the project in the metadata storage database 8.

FIGS. 17 to 20 are a flowchart illustrating the processing described with reference to FIGS. 3 to 16 (processing performed by the user terminal 4*a* and the creation certification system 3). In the following, processing related to the generation of raster data provided with a watermark and a creation certificate will be described in more detail with reference to these drawings.

FIG. 17 illustrates processing from a start of the creation certification mode to the issuance of a new project. This processing is started by the user by starting the creation certification mode in the drawing application which is executed on the user terminal 4*a* (step S1; see FIG. 3). When the creation certification mode is started, the drawing application connects to the creation certification system 3, and makes the artist log in to the creation certification system 3 (step S2; see FIG. 4). Supposing here that the login has succeeded, the drawing application enters the creation certification mode (step S3).

Next, when the user gives an instruction to issue a new project on the drawing application (step S4; see FIG. 4), the drawing application transmits a new project issuance instruction to the creation certification processing section 7 (step S5). Receiving this issuance instruction, the creation certification processing section 7 issues a new project ID, and stores the new project ID in association with the user ID of the logged-in user (=the artist) (step S6). Then, the creation certification processing section 7 notifies the metadata storage database 8 that the new project has been issued, together with present date and time information (step S7). Receiving this notification, the metadata storage database 8 stores the notified present date and time information as one piece of metadata of the project in association with the project ID (step S8). The creation certification processing section 7 also transmits the project issuance completion screen illustrated in FIG. 5 to the drawing application (step S9). Though not illustrated in FIG. 17, in a case where the user inputs the artist name in FIG. 5, the input artist name is transmitted to the metadata storage database 8 via the creation certification processing section 7, and is stored as one piece of metadata of the project.

FIG. 18 and FIG. 19 illustrate processing from a start (or continuation) of creation to the issuance of a creation certificate. Referring first to FIG. 18, this processing is started by the user by giving an instruction to start creation (see FIG. 5) or continue creation (see FIG. 8 or FIG. 12) in the drawing application which is executed on the user terminal 4*a* (step S10). When the user performing the creation of the artwork thereafter requests creation certification (step S11; see FIG. 6 and FIG. 10), the drawing application exports pre-integration data and raster data in that stage (step S12), and transmits a creation certification request including each piece of exported data to the creation certification processing section 7 (step S13).

Receiving the creation certification request, the creation certification processing section 7 generates a new project file corresponding to the project ID (step S14), and transmits a recording instruction including the generated project file and present date and time information to the metadata storage database 8 (step S15). Receiving this recording instruction, the metadata storage database 8 stores the received project file and the received present date and time information as one piece of metadata of the project in association with the project ID (step S16).

The creation certification processing section 7 also performs processing of converting the project ID into a watermark, and embedding the watermark into the received raster data (step S17). Details of this processing are as described above. Next, the creation certification processing section 7 transmits a download screen for downloading the raster data provided with the watermark to the drawing application (step S18; see FIG. 7 and FIG. 11). When the user viewing this download screen depresses the download button 25, a download instruction is transmitted from the drawing application to the creation certification processing section 7 (step S19). Next, the raster data provided with the watermark is transmitted from the creation certification processing section 7 to the user terminal 4*a* (step S20). The user terminal 4*a* stores the thus downloaded raster data provided with the watermark within the recording device 1002 (see FIG. 2) or a storage in the cloud together with the pre-integration data in the present stage (step S21).

Referring next to FIG. 19, the creation certification processing section 7 calculates the hash value of the received pre-integration data, and stores the hash value in association with the project ID (step S22). Then, a creation certificate including the stored hash value is generated (step S23), and a creation certificate screen for downloading the creation certificate is transmitted to the drawing application (step S24; see FIG. 8 and FIG. 12). The contents of the creation certification and the creation certificate screen are as described with reference to FIG. 8 and FIG. 9.

When the user viewing the creation certificate screen depresses the download button 26 (see FIG. 8 and FIG. 12), a download instruction is transmitted from the drawing application to the creation certification processing section 7 (step S25). Next, the creation certificate is transmitted from the creation certification processing section 7 to the user terminal 4*a* (step S26). The user terminal 4*a* stores the thus downloaded creation certificate within the recording device 1002 (see FIG. 2) or a storage in the cloud (step S27).

The creation certification processing section 7 after generating the creation certificate in step S23 also performs processing of transmitting a recording instruction including the creation certificate to the metadata storage database 8 (step S28). Receiving this recording instruction, the metadata storage database 8 stores the received creation certificate within the corresponding project file (step S29).

Figure 20:
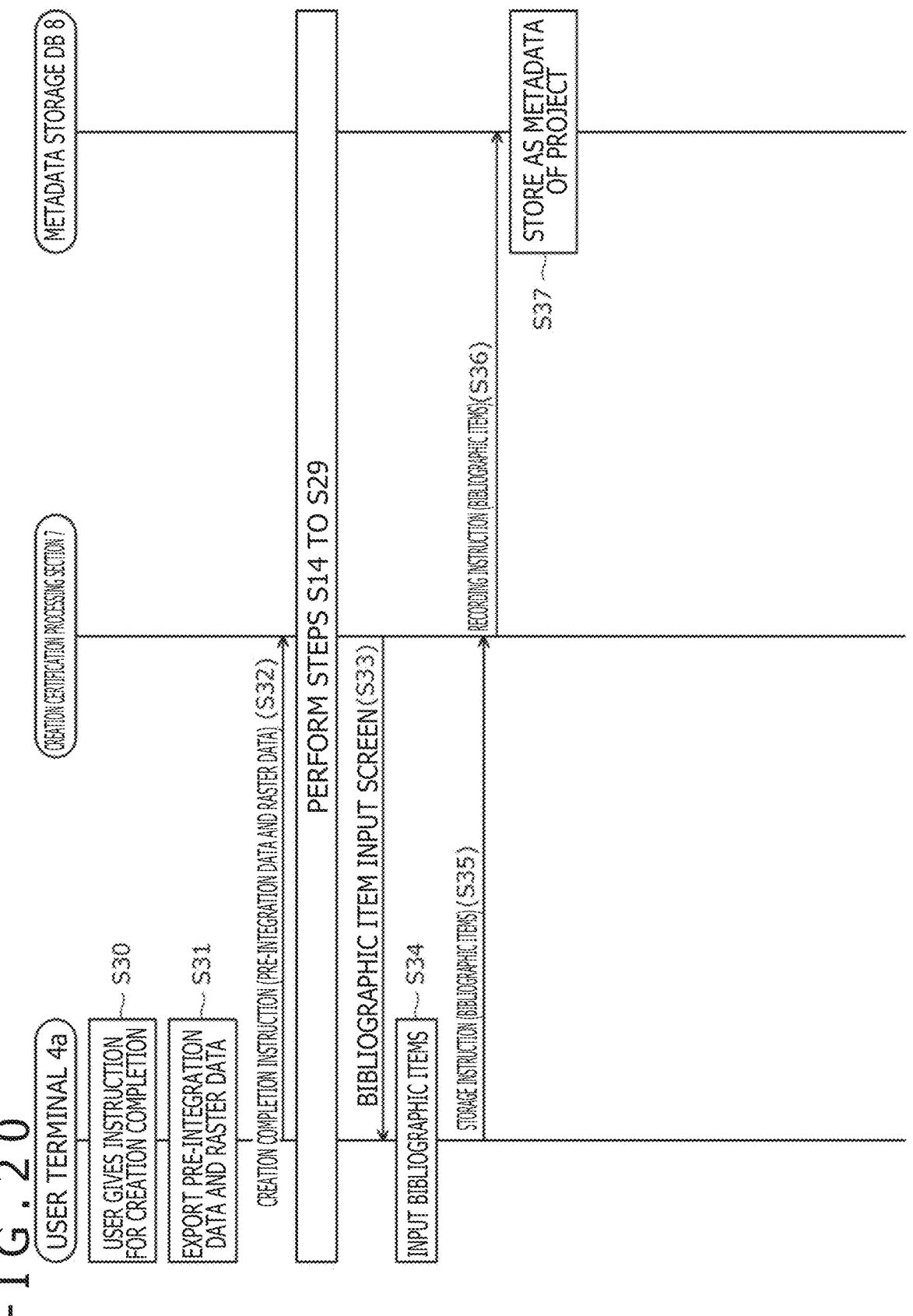
FIG. 20 is a flowchart illustrating processing from creation completion to the recording of bibliographic items.

FIG. 20 illustrates processing from creation completion to the recording of bibliographic items. When the user gives an instruction for completion of the creation (step S30; see FIG. 13), the drawing application exports the pre-integration data and the raster data in that stage (completed version of the raster data) (step S31), and transmits a creation completion instruction including each piece of exported data to the creation certification processing section 7 (step S32). Thereafter, processing similar to the processing of steps S14 to S29 described with reference to FIG. 18 and FIG. 19 is performed between the user terminal 4a, the creation certification processing section 7, and the metadata storage database 8, and the artwork provided with the watermark and a creation certificate are issued.

After completion of step S26, a bibliographic item input screen for inputting bibliographic items of the artwork is transmitted from the creation certification processing section 7 to the drawing application (step S33; see FIG. 16). When the user viewing this bibliographic item input screen inputs the bibliographic items (step S34), and depresses the save button 27 (see FIG. 16), the drawing application transmits a save instruction including the input bibliographic items to the creation certification processing section 7 (step S35). Receiving this save instruction, the creation certification processing section 7 transmits a recording instruction including the bibliographic items, which was included in the save instruction, to the metadata storage database 8 (step S36). Receiving this recording instruction, the metadata storage database 8 stores the received bibliographic items as one piece of metadata of the project in association with the project ID (step S37). As a result of the processing thus far, the creation of the artwork by the artist and the generation of one or more pieces of raster data provided with a watermark and one or more creation certificates involved in the creation of the artwork are completed. The artist can thereafter release the own artwork on the release site by posting the raster data provided with the watermark corresponding to the completed version of the artwork onto the work posting platform 5.

Figure 21:
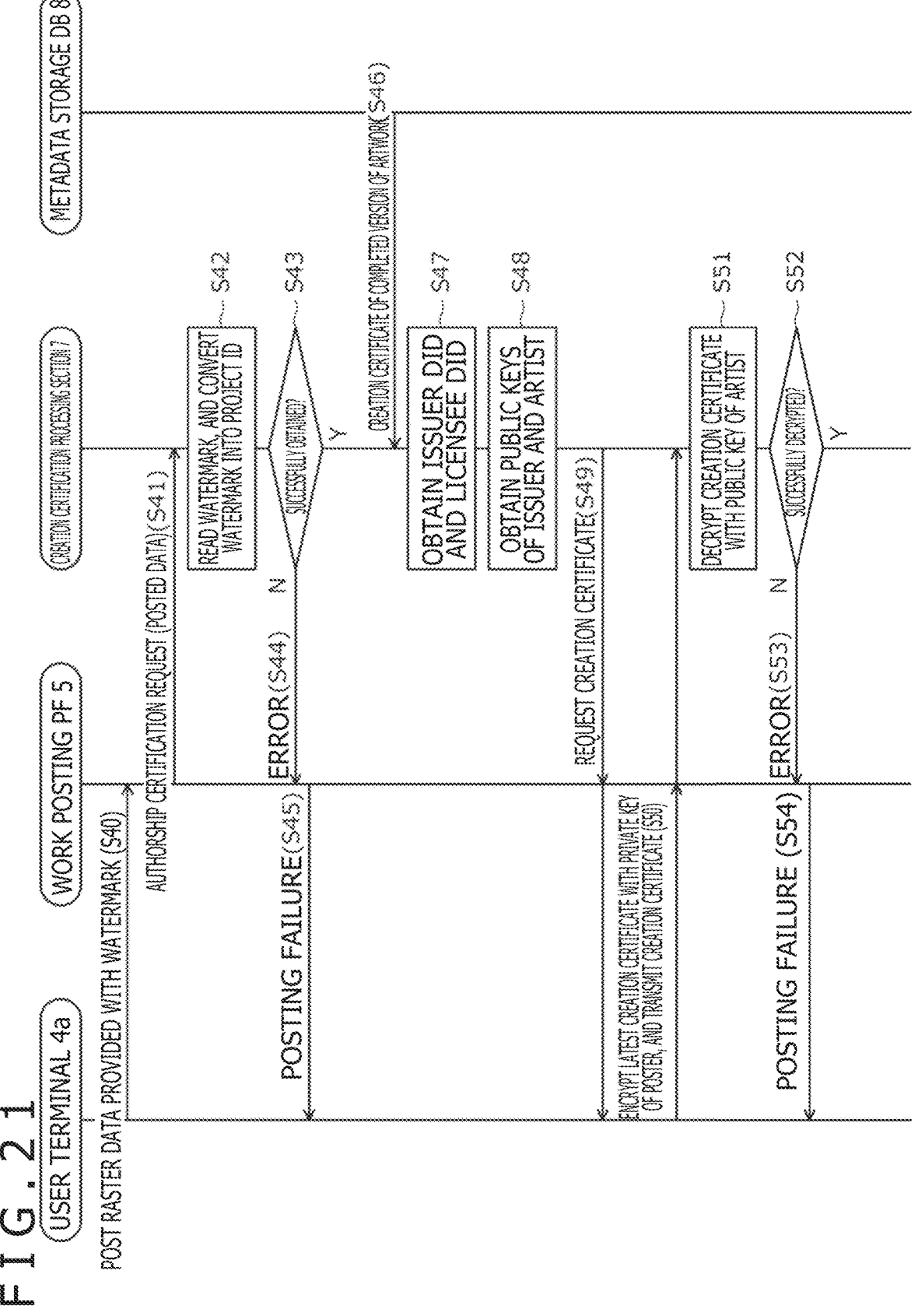
FIG. 21 is a flowchart illustrating processing performed to realize the posting of the artwork onto a release site by the artist.

FIG. 21 and FIG. 22 are a flowchart illustrating processing performed to realize the posting of the artwork onto the release site by the artist. Referring first to FIG. 21, this processing is started by the artist by posting the artwork from the user terminal 4a onto the work posting platform 5 (step S40). At this time, the artist uses the raster data provided with the watermark corresponding to the completed version of the artwork (which raster data is downloaded on the download screen of FIG. 14) as data for posting. In the following, the data posted onto the work posting platform 5 will be referred to as "posted data," and the artwork represented by the posted data will be referred to as the "posted artwork."

Receiving the posted data, the work posting platform 5 requests the creation certification system 3 to certify that the poster is the creator of the posted artwork (that is, the poster has the authorship of the posted artwork) (authorship certification) (step S41). This request includes the posted raster data provided with the watermark. The creation certification processing section 7 of the creation certification system 3 that has received the authorship certification request attempts processing of reading the watermark from the raster data provided with the watermark included in the authorship certification request and converting the watermark into the project ID (step S42). Then, a primary determination of whether or not the poster is the creator of the posted artwork is made by determining whether or not the project ID can be obtained as a result (step S43). Specifically, it suffices to determine that there is a possibility of the poster being the creator of the posted artwork in a case where the project ID can be obtained, and determine that the poster is not the creator of the posted artwork in a case where the project ID cannot be obtained.

When determining as a result of the determination in step S43 that the poster is not the creator of the posted artwork, the creation certification processing section 7 returns an error to the work posting platform 5 (step S44). Receiving this error, the work posting platform 5 notifies a posting failure to the user terminal 4a without uploading the posted data (step S45). This prohibits the posting of an artwork that is not an artwork created using the creation certification system 3 or an artwork that does not have the watermark.

When determining in step S43 that there is a possibility of the poster being the creator of the posted artwork, on the other hand, the creation certification processing section 7 reads a creation certificate corresponding to the completed version of the artwork among one or more creation certificates stored in association with the project ID from the metadata storage database 8 (step S46), and obtains the issuer DID and the artist DID from the creation certificate (step S47). Then, the public key of the issuer and the public key of the artist are obtained by accessing the distributed file system described above and referring to respective DID documents (step S48). Incidentally, public keys that can be obtained without referencing the creation certificate or the DID documents because the public keys are already retained in the creation certification system 3 or the like may be obtained without performing the whole or a part of steps S46 to S48. The same is true for steps S76 to S78 illustrated in FIG. 23 and steps S125 to S127 illustrated in FIG. 30 to be described later.

Next, the creation certification processing section 7 requests the transmission of a creation certificate from the user terminal 4a via the work posting platform 5 (step S49). Receiving this request, the user terminal 4a obtains the creation certificate corresponding to the completed version of the artwork (creation certificate downloaded on the creation certificate screen of FIG. 15), encrypts the creation certificate with the private key of the poster, and then transmits the creation certificate to the creation certification processing section 7 via the work posting platform 5 (step S50).

Receiving the creation certificate, the creation certification processing section 7 attempts to decrypt the received creation certificate by using the public key of the artist obtained in step S48 in advance (step S51). Then, a secondary determination of whether or not the poster is the creator of the posted artwork is made by determining whether or not the creation certificate can be decrypted (step S52). Specifically, when the creation certificate can be decrypted, it is determined that the poster is possibly the creator of the posted artwork, and when the creation certificate cannot be decrypted, it is determined that the poster is not the creator of the posted artwork.

When determining as a result of the determination in step S63 that the poster is not the creator of the posted artwork, the creation certification processing section 7 returns an error to the work posting platform 5 (step S53). Receiving this error, the work posting platform 5 notifies a posting failure to the user terminal 4a without uploading the posted data (step S54). This prohibits posting from a person other than the artist himself/herself who created the artwork.

When determining in step S52 that the poster is possibly the creator of the posted artwork, on the other hand, the creation certification processing section 7 attempts to decrypt creation certification information (see FIG. 9) included in the creation certificate decrypted in step S51 by using the public key of the issuer obtained in step S48 in advance (step S55), as illustrated in FIG. 22. Then, a tertiary determination of whether or not the poster is the creator of the posted artwork is made by determining whether or not the creation certification information can be decrypted (step S56). Specifically, it suffices to determine that there is a possibility of the poster being the creator of the posted artwork when the creation certification information can be decrypted, and determine that the poster is not the creator of the posted artwork when the creation certification information cannot be decrypted.

When determining as a result of the determination in step S56 that the poster is not the creator of the posted artwork, the creation certification processing section 7 returns an error to the work posting platform 5 (step S57). Receiving this error, the work posting platform 5 notifies a posting failure to the user terminal 4a without uploading the posted data (step S56). This prohibits posting using a false creation certificate (creation certificate issued by a party other than the authorized issuer).

When determining in step S56 that there is a possibility of the poster being the creator of the posted artwork, on the other hand, the creation certification processing section 7 obtains the hash value of pre-integration data from the decrypted creation certification information (step S59), and requests the transmission of the pre-integration data from the user terminal 4a via the work posting platform 5 (step S60). Receiving this request, the user terminal 4a obtains the pre-integration data corresponding to the completed version of the artwork (pre-integration data stored in step S21 in FIG. 18 in advance), and transmits the pre-integration data to the creation certification processing section 7 via the work posting platform 5 (step S61). At this time, the user terminal 4a may transmit the pre-integration data encrypted with the private key of the poster. In this case, it suffices for the creation certification processing section 7 to decrypt the received pre-integration data with the public key of the artist.

Receiving the pre-integration data, the creation certification processing section 7 calculates the hash value of the received pre-integration data, and makes a final determination of whether or not the poster is the creator of the posted artwork on the basis of the calculated hash value and the hash value obtained in step S59 (step S63). Specifically, it suffices to compare the two hash values with each other, and determine that the poster is the creator of the posted artwork when these hash values match each other or determine that the poster is not the creator of the posted artwork when these hash values do not match each other.

When determining as a result of the determination in step S63 that the poster is not the creator of the posted artwork, the creation certification processing section 7 returns an error to the work posting platform 5 (step S64). Receiving this error, the work posting platform 5 notifies a posting failure to the user terminal 4a without uploading the posted data (step S65). This prohibits posting by a person not having the pre-integration data (usually a person other than the artist).

When determining in step S63 that the poster is the creator of the posted artwork, on the other hand, the creation certification processing section 7 returns information indicating a certification success to the work posting platform 5 (step S66). Receiving this information, the work posting platform 5 uploads the posted data to the predetermined release site (step S67). Thus, the artwork of interest is widely released to the public, and becomes a target of transactions such as buying and selling, borrowing and lending, and the granting of a usage license. Incidentally, at a time of this release, the work posting platform 5 may read the metadata of the corresponding project from the metadata storage database 8, and release a part or the whole of the metadata together with the posted data.

The work posting platform 5 also performs processing of transmitting the name of the site on which the posted data is released and a posting date and time to the metadata storage database 8 via the creation certification processing section 7 (step S68). The metadata storage database 8 stores the thus received information as one piece of metadata of the project (step S69). As a result of the processing thus far, the posting of the artwork onto the release site by the artist is completed.

Here, in the processing described with reference to FIG. 21 and FIG. 22, the creation certification processing section 7 certifies that the poster is the creator of the posted artwork by using only the raster data provided with the watermark and the creation certificate related to the completed version of the artwork (for example, the artwork corresponding to the project file C illustrated in FIG. 16). However, the creation certification processing section 7 may certify that the poster is the creator of the posted artwork by using also the raster data provided with the watermark and the creation certificate(s) related to one or more artworks being produced (for example, the artwork corresponding to the project file A or the project file B illustrated in FIG. 16).

FIG. 23 and FIG. 24 are a flowchart illustrating additional processing used to perform authorship certification by also using the raster data provided with the watermark and the creation certificate related to the artwork, which is one generation prior to the completed version of the artwork (artwork corresponding to the project file B in the example of FIG. 16). Steps S70 to S93 illustrated in these figures are processing inserted between the positive determination of step S63 and step S66 in the processing flow illustrated in FIG. 22.

Steps S70 to S95 illustrated in FIG. 23 and FIG. 24 are similar to steps S40 to S65 illustrated in FIG. 21 and FIG. 22 except that steps S70 to S95 are different in that the creation certification processing section 7 requests, via the work posting platform 5, the user terminal 4a to transmit the raster data provided with the watermark, which is one generation prior (step S70), and in that both of the creation certificate that the creation certification processing section 7 obtains from the metadata storage database 8 and the creation certificate and the pre-integration data which the user terminal 4a is requested to transmit are one generation prior (steps S76, S79, and S90). By performing steps S70 to S93, the creation certification processing section 7 can more reliably certify that the poster is the creator of the posted artwork.

FIG. 25 is a flowchart illustrating processing related to a license for the artwork. The figure illustrates an example of a case where the user of the user terminal 4b finds the artwork released by the user of the user terminal 4a via the work posting platform 5, and makes a license application. This processing is started by transmitting an application for a license for the target artwork from the user terminal 4b to the license managing platform 6 (step S100). Receiving the application for the license, the license managing platform 6 transfers the received application to each of the creation certification processing section 7 and the user terminal 4a (steps S101 and S103).

Here, the work posting platform 5 preferably stores contact information of the artist in advance in association with the artwork released on the release site. This enables the license managing platform 6 to read the contact information of the artist corresponding to the artwork from the work posting platform 5 and determine a transmission destination in step S103 on the basis of the read contact information when the license application for the artwork is received from the user terminal 4b.

The creation certification processing section 7 that has received the license application from the license managing platform 6 performs predetermined login processing with the user terminal 4b (step S102). Meanwhile, the user terminal 4a that has received the license application from the license managing platform 6 returns a reply to this application to the license managing platform 6 (step S104). Basically, the reply returned here is preferably generated according to the license setting set as metadata of the project by the artist at the time of completion of the creation (see FIG. 16). However, the reply can have contents different from the license setting. In a case where the license setting set as metadata of the project and the license setting included in the reply are different from each other, the license managing platform 6 may perform processing of making the user of the user terminal 4b confirm the contents of the reply.

Receiving the reply from the user terminal 4a, the license managing platform 6 determines within a possible range whether or not usage is permitted on the basis of the reply (step S105). For example, in a case where a condition for which the license managing platform 6 can determine whether or not the usage is permitted (for example, a limitation of a usage period or the like) and a condition for which the license managing platform 6 cannot determine whether or not the usage is permitted (for example, the prohibition of commercial usage or the like) are mixed in the reply, it suffices for the license managing platform 6 to determine whether or not the usage is permitted based only on the condition for which whether or not the usage is permitted can be determined.

When determining in step S105 that the usage is not permitted, the license managing platform 6 transmits information indicating that the usage is not permitted to the user terminal 4b and the creation certification processing section 7 (step S106). In this case, the creation certification processing section 7 discontinues the processing related to the license application, so that the user of the user terminal 4b cannot use the artwork in question. When determining in step S105 that the usage is permitted, on the other hand, the license managing platform 6 transmits information indicating the license to the creation certification processing section 7 (step S107).

Receiving the information indicating the license from the license managing platform 6, the creation certification processing section 7 performs predetermined login processing with the user terminal 4a (step S108), and generates a license certificate indicating that the user of the user terminal 4b is licensed to use the target artwork (step S109).

FIG. 26 is a diagram illustrating an example of the license certificate generated by the creation certification processing section 7. As illustrated in the figure, the license certificate includes issuer information and license certification information (License Information). The issuer information is information indicating the issuer of this license certificate. Concrete contents of the issuer information are similar to those of the issuer information in the creation certificate described with reference to FIG. 9.

The license certification information is information indicating the contents of the license. The license certification information includes a project ID, an artist DID (licenser DID), a licensee DID, and license conditions. Of these, the project ID is the DID of the project including the licensed artwork, and has a role of identifying the licensed artwork. The artist DID is the DID of the artist (=licenser) who created the licensed artwork. The licensee DID is the DID of the user (=licensee) who applied for the license for the artwork. The license conditions are information identifying details of a licensed right, such as "COMMERCIAL USAGE IS PERMITTED" and "ALTERATION IS PERMITTED," as illustrated in FIG. 26. The license conditions are set in the license certificate on the basis of the contents of the reply transmitted by the artist in step S104 (or contents agreed upon with the user of the user terminal 4b by consultation based on the contents of the reply).

The creation certification processing section 7 encrypts the license certification information by using the private key of the issuer (that is, performs a digital signature of the issuer on the license certification information), and disposes the encrypted license certification information in the license certificate. Thus, a person who subsequently receives the license certificate can confirm that the source of the license certificate is the issuer by performing decryption using the public key of the issuer.

The description returns to FIG. 25. After generating the license certificate in step S109, the creation certification processing section 7 transmits a recording instruction including the license certificate to the metadata storage database 8 (step S110). Receiving this recording instruction, the metadata storage database 8 stores the received license certificate as one piece of metadata of the corresponding project in association with the project ID (step S111).

In addition, the creation certification processing section 7 transmits the generated license certificate also to the user terminals 4a and 4b via the license managing platform 6 (steps S112 and S113). The user terminals 4a and 4b each store the thus received license certificate within the recording device 1002 (see FIG. 2) or a storage in the cloud (steps S114 and S115). In addition, the user terminal 4a that has received the license certificate transmits the raster data provided with the watermark stored by the user terminal 4a itself to the user terminal 4b (step S116). In performing this transmission, the user terminal 4a may directly transmit the raster data provided with the watermark to the user terminal 4b, or may transmit the raster data provided with the watermark to the user terminal 4b via the license managing platform 6.

The user terminal 4b also stores the raster data provided with the watermark received in step S116 within the recording device 1002 (see FIG. 2) or a storage in the cloud in advance (step S116). This enables the user of the user terminal 4b to use the raster data provided with the watermark stored in advance at a time of subsequent creation of a new artwork or the like.

Figure 29:
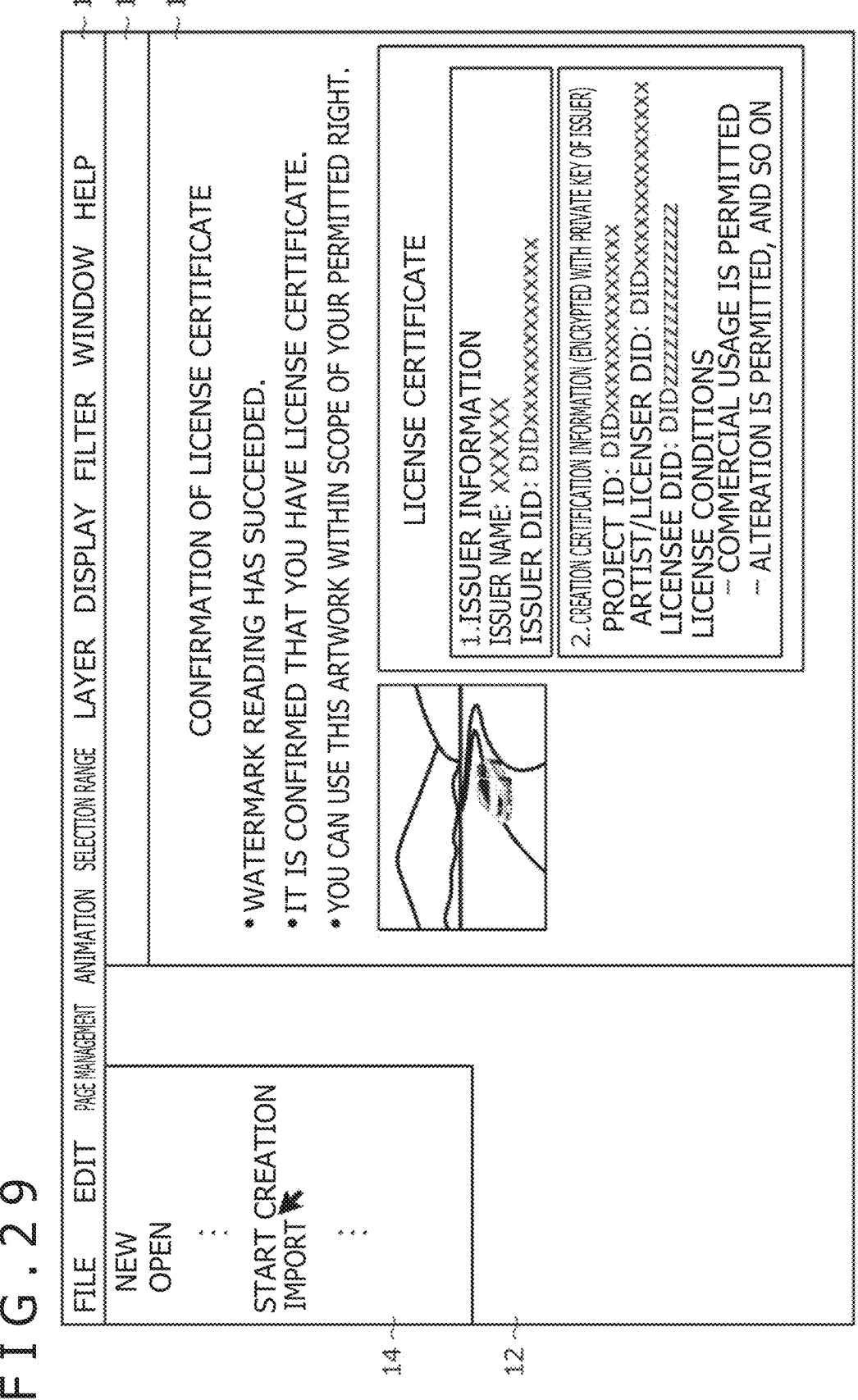
FIG. 29 is a diagram illustrating a confirmation screen displayed by the drawing application when it is confirmed that the user has a license.

FIGS. 27 to 29 are diagrams illustrating a screen of the drawing application displayed on the user terminal 4b. In the following, referring to these drawings, description will be made of processing up to a start of creation of a new artwork by the user of the user terminal 4b by using the licensed artwork. In the following, the user of the user terminal 4b will be referred to as the "ARTWORK USER," and the artwork to be used will be referred to as the "ARTWORK OF INTEREST."

FIG. 27 illustrates a project issuance completion screen displayed after entry into the creation certification mode and a new project issuance instruction as described with reference to FIG. 3 and FIG. 4 and after completion of the issuance of a new project. In the present example, a menu item "IMPORT" is displayed within the menu window 14.

FIG. 28 illustrates a screen state after the artwork user presses the menu item "IMPORT" illustrated in FIG. 27. As illustrated in the figure, detecting that "IMPORT" is depressed, the drawing application displays a file selection screen 30 for making the artwork user select a file. When the artwork user selects the raster data provided with the watermark (raster data stored in step S117 in FIG. 25) on this file selection screen 30, a license certification request including the selected raster data is transmitted from the drawing application to the creation certification processing section 7.

Receiving the license certification request, the creation certification processing section 7 confirms whether or not the artwork user has a license for the artwork of interest represented by the raster data included in the license certification request. Details of this processing will be described later in detail with reference to FIG. 30 and FIG. 31.

FIG. 29 illustrates a confirmation screen displayed by the drawing application when it is confirmed that the artwork user has the license. This confirmation screen includes descriptive sentences for the artwork user as well as the contents of the license certificate, a thumbnail of the imported raster data, and the like. When the artwork user depresses "START CREATION" after the confirmation screen is displayed, the drawing application displays the canvas 15 within the canvas window 13 as in the case of FIG. 6. The artwork user creates an artwork by drawing a picture within the canvas 15 by using the pen P or the like. At a time of the creation, the artwork user can paste the imported raster data to the inside of the canvas 15. The artwork user can thus create the new artwork while using the imported raster data.

Figure 30:
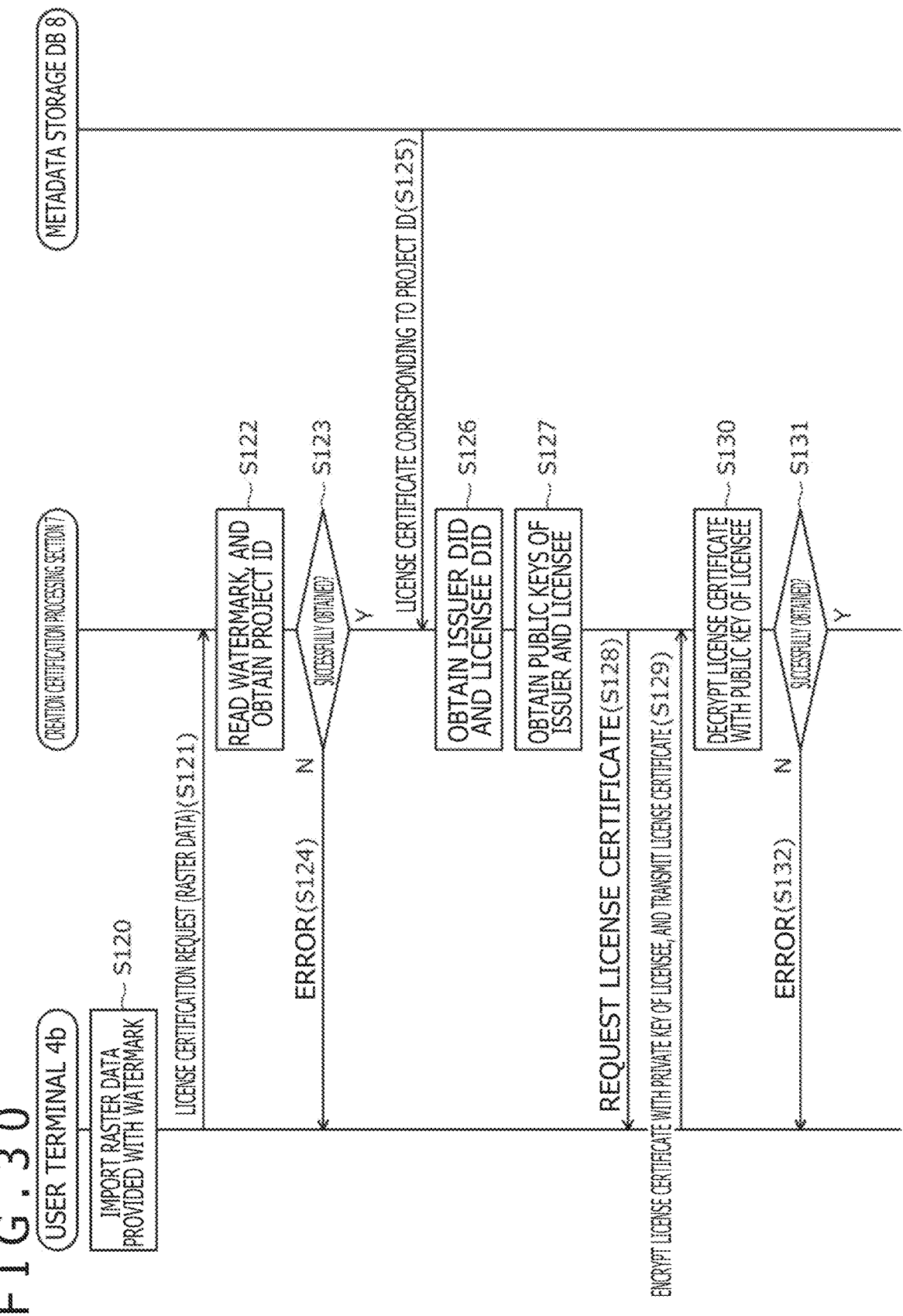
FIG. 30 is a flowchart illustrating processing for confirming whether or not the artwork user has a license to use the artwork of interest.

FIG. 30 and FIG. 31 are a flowchart illustrating processing for confirming whether or not the artwork user has a license to use the artwork of interest. This processing is started by the artwork user by importing the raster data provided with the watermark in the drawing application which is executed on the user terminal 4b (step S120; see FIG. 27 and FIG. 28). Receiving the import, the drawing application transmits a license certification request including the imported raster data to the creation certification system 3 (step S121).

The creation certification processing section 7 of the creation certification system 3 that has received the license certification request attempts processing of reading the watermark from the raster data provided with the watermark included in the license certification request and converting the watermark into the project ID (step S122). Then, a primary determination of whether or not the artwork user has the license to use the artwork of interest is made by determining whether or not the project ID can be obtained as a result of the processing (step S123). Specifically, it suffices to determine that the artwork user possibly has the license to use the artwork of interest when the project ID can be obtained, and determine that the artwork user does not have the license to use the artwork of interest when the project ID cannot be obtained.

When determining as a result of the determination in step S123 that the artwork user does not have the license to use the artwork of interest, the creation certification processing section 7 returns an error to the user terminal 4b (step S124). Receiving this error, the user terminal 4b causes the import of the raster data to fail. This prohibits the usage of an artwork that is not an artwork created using the creation certification system 3 or an artwork that does not have the watermark.

When determining in step S123 that the artwork user possibly has the license to use the artwork of interest, on the other hand, the creation certification processing section 7 reads one or more license certificates stored in association with the project ID from the metadata storage database 11

(step S125), and obtains an issuer DID and a licensee DID from each of the obtained license certificate(s) (step S126). Then, the public key of the issuer and the public key of the licensee are obtained for each of the obtained license certificate(s) by accessing the distributed file system described above and referring to respective DID documents (step S127).

Next, the creation certification processing section 7 requests the user terminal 4b to transmit a license certificate (step S128). Receiving this request, the user terminal 4b obtains the license certificate stored in step S114 in FIG. 25, encrypts the license certificate with the private key of the artwork user, and then transmits the license certificate to the creation certification processing section 7 (step S129).

Receiving the license certificate, the creation certification processing section 7 attempts to decrypt the received license certificate by using each of the public key(s) of one or more licensees obtained in step S127 in advance (step S130). Then, a secondary determination of whether or not the artwork user has the license to use the artwork of interest is made by determining whether or not the license certificate can be decrypted (step S131). Specifically, it suffices to determine that the artwork user possibly has the license to use the artwork of interest when the license certificate can be decrypted, and determine that the artwork user does not have the license to use the artwork of interest when the license certificate cannot be decrypted.

When determining as a result of the determination in step S131 that the artwork user does not have the license to use the artwork of interest, the creation certification processing section 7 returns an error to the user terminal 4b (step S132). Receiving this error, the user terminal 4b causes the import of the raster data to fail. This prohibits the usage of the artwork of interest by a person other than the licensed licensee himself/herself.

When determining in step S131 that the artwork user possibly has the license to use the artwork of interest, on the other hand, the creation certification processing section 7 first identifies the public key of the issuer used for the digital signature of the received license certificate, as illustrated in FIG. 31 (step S133). Specifically, it suffices to identify, as the public key of the issuer used for the digital signature of the received license certificate, the public key of the issuer indicated by the issuer information in the license certificate decrypted in step S130 among the public key(s) of one or more issuers obtained in step S127.

Next, the creation certification processing section 7 attempts to decrypt the license certification information (see FIG. 26) included in the license certificate decrypted in step S130 by using the identified public key of the issuer (step S134). Then, a tertiary determination of whether or not the artwork user has the license to use the artwork of interest is made by determining whether or not the license certification information can be decrypted (step S135). Specifically, it suffices to determine that the artwork user possibly has the license to use the artwork of interest when the license certification information can be decrypted, and determine that the artwork user does not have the license to use the artwork of interest when the license certification information cannot be decrypted.

When determining as a result of the determination in step S135 that the artwork user does not have the license to use the artwork of interest, the creation certification processing section 7 returns an error to the user terminal 4b (step S136). Receiving this error, the user terminal 4b causes the import of the raster data to fail. This prohibits the usage of the artwork of interest under a false license certificate (a license certificate issued by a party other than the authorized issuer).

When determining in step S135 that the artwork user possibly has the license to use the artwork of interest, on the other hand, the creation certification processing section 7 refers to the decrypted license certification information, and makes a final determination of whether or not the artwork user has the license to use the artwork of interest by determining whether or not the artwork user has a legitimate right with regard to the usage of the artwork of interest (step S137). Specifically, it suffices to determine that the artwork user has the license to use the artwork of interest when the decrypted license certification information indicates that the artwork user has the legitimate right with regard to the usage of the artwork of interest, and determine that the artwork user does not have the license to use the artwork of interest when the decrypted license certification information indicates that the artwork user does not have the legitimate right with regard to the usage of the artwork of interest.

When determining as a result of the determination in step S137 that the artwork user does not have the license to use the artwork of interest, the creation certification processing section 7 returns an error to the user terminal 4b (step S138). Receiving this error, the user terminal 4b causes the import of the raster data to fail. This prohibits even the licensee having the formal license certificate from usage deviating from the license conditions described in the license certificate.

When determining in step S137 that the artwork user has the license to use the artwork of interest, on the other hand, the creation certification processing section 7 transmits a recording instruction including the project ID of the artwork of interest to the metadata storage database 8 (step S139). Receiving this recording instruction, the metadata storage database 8 stores the received project ID as one piece of metadata of the project issued by the user of the user terminal 4b (project illustrated in FIG. 27) in association with the project ID of the project (step S140). This makes it possible to grasp the other artwork used to create the artwork by referring to the metadata of the project.

The creation certification processing section 7 also permits the user terminal 4b to perform the import (step S141). The drawing application of the user terminal 4b that has received this permission completes the import (step S142). The artwork user can thereafter use the imported raster data for the creation by the artwork user himself/herself.

As described above, according to the authorship certification system 1 in accordance with the present disclosure, the authorship of the artwork can be certified by using the pre-integration data of the artwork which is expected to be retained only by artist himself/herself. It is thus possible to certify the authorship of the artwork. Moreover, this certification is set as one requirement at a time of the posting of the artwork. It is therefore possible to prohibit the posting of the artwork by a person not having the pre-integration data (usually a person other than the artist).

In addition, the raster data provided with the watermark indicating the project ID is used as release data. It is therefore possible to distinguish the creation certificate and the license certificate of the released artwork, and certify the authorship and the license of the artwork. In addition, it is possible to prohibit the posting or usage of the artwork by a person not having the raster data provided with the watermark.

In addition, when the creation certificate and the license certificate are transmitted, the creation certificate and the license certificate are encrypted with the private keys of the senders. It is therefore possible to prohibit posting from a person other than the artist himself/herself who created the artwork and the usage of the artwork by a person other than the licensed licensee himself/herself.

In addition, the creation certification information in the creation certificate and the license certification information in the license certificate are encrypted with the private key of the issuer. It is therefore possible to prohibit the usage of a false creation certificate or a false license certificate.

Incidentally, the pre-integration data is generally a large volume of data. Thus, storing the pre-integration data over generations imposes a heavy burden on the artist. Accordingly, in place of the pre-integration data, raster data including a reduced image of each component (a layer, a texture, or the like) included in the pre-integration data (pre-integration data component list) may be used.

Figure 32:
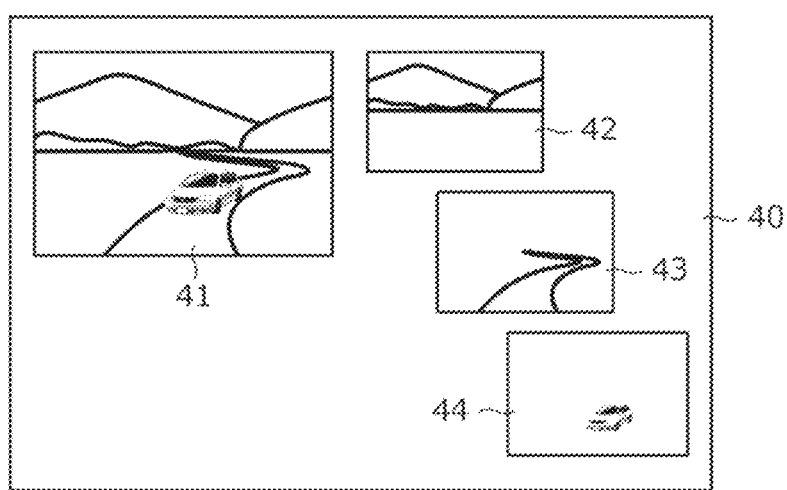
FIG. 32 is a diagram illustrating an example of a pre-integration data component list.

FIG. 32 is a diagram illustrating an example of the pre-integration data component list. The pre-integration data component list 40 according to the present example corresponds to the artwork illustrated in FIG. 13, and overall raster data 41 and raster data 42 to 43 of respective layers constitute one piece of raster data. When the creation certification processing section 7 is configured to compare the hash value of the pre-integration data component list 40 in place of the hash value of the pre-integration data in step S63 illustrated in FIG. 22, it suffices for the artist to store the pre-integration data component list 40 in place of the pre-integration data. It is therefore possible to reduce the burden on the artist.

Incidentally, the watermark indicating the project ID may be embedded also in each piece of raster data constituting the pre-integration data component list. In addition, a creation certification including the project ID, the number of each component, the name of the application used for the creation of the artwork, a time stamp indicating a date and time of generation of the pre-integration data component list, and the like may be encrypted with the private key of an issuer of the pre-integration data component list (that is, provided with a digital signature by the issuer of the pre-integration data component list), and thereafter embedded in the pre-integration data component list. This enables a person who intends to verify the ownership of the artwork to intuitively recognize a link between the released raster data and each component resulting from the creation of the artist even if the creation certification system 3 cannot be used.

Description will next be made of an authorship certification system 1 according to a second embodiment of the present disclosure. The authorship certification system 1 according to the present embodiment is different from the authorship certification system 1 according to the first embodiment in that the authorship certification system 1 according to the present embodiment checks whether or not there is an identical or similar image online when the raster data provided with the watermark is generated in response to a request from the user. The authorship certification system 1 according to the present embodiment is otherwise similar to the authorship certification system 1 according to the first embodiment. In the following, detailed description of the authorship certification system 1 according to the present embodiment will be made centering on differences from the authorship certification system 1 according to the first embodiment.

FIG. 33 is a flowchart illustrating processing from a start, continuation, and completion of creation to the issuance of a creation certificate, which processing is performed in the authorship certification system 1 according to the present embodiment. This processing is different from the processing related to the start or continuation of the creation as illustrated in FIG. 18 and FIG. 19 and the processing related to the completion of the creation as illustrated in FIG. 20 and FIG. 21 in that steps S150 to S152 are performed after step S15.

The creation certification processing section 7 according to the present embodiment transmits the recording instruction including the project file and the present date and time information to the metadata storage database 8 in step S15, and then checks online for an image identical or similar to an image represented by the raster data received in step S13 (see FIG. 18) or step S32 (see FIG. 20) (step S150). Specifically, it suffices to input the raster data received in step S13 or step S32 to any online image search engine, derive a degree of similarity of each retrieved image to the input raster data, and determine an image whose derived degree of similarity is equal to or more than a predetermined value as the "IDENTICAL OR SIMILAR IMAGE."

The creation certification processing section 7 after completing the check transmits a recording instruction including a check result and present date and time information to the metadata storage database 8 (step S151). Receiving this recording instruction, the metadata storage database 8 stores the received check result and the received present date and time information as one piece of metadata of the project in association with the project ID (step S152). Incidentally, the check result included in the recording instruction preferably includes the presence or absence of the image determined as the "IDENTICAL OR SIMILAR IMAGE" and information indicating the image determined as the "IDENTICAL OR SIMILAR IMAGE" (image data, the URL of the image, and the like).

As described above, the authorship certification system 1 according to the present embodiment checks whether or not there is an identical or similar image online and records a result of the check as metadata of the project when the raster data provided with the watermark is generated in response to a request from the user. Thus, a fact that there was an identical or similar image online or there was no identical or similar image online at a time point of a request for creation certification by the user can be checked afterward through the metadata of the project.

Incidentally, in the present embodiment, description has been made of an example of checking for an image identical or similar to the raster data exported in step S12 or step S31 (raster data formed by integrating layers). However, a check may be similarly made for an identical or similar image also for each piece of raster data (raster data of each layer) constituting the pre-integration data component list illustrated in FIG. 32, and a result of the check may be recorded as metadata of the project.

Description will next be made of an authorship certification system 1 according to a third embodiment of the present disclosure. The authorship certification system 1 according to the present embodiment is different from the authorship certification system 1 according to the first embodiment in that the authorship certification system 1 according to the present embodiment configures the drawing application to be able to import raster data without a watermark. The authorship certification system 1 according to the present embodiment is otherwise similar to the authorship certification system 1 according to the first embodiment. In the following, detailed description of the authorship certification system 1 according to the present embodiment will be made centering on differences from the authorship certification system 1 according to the first embodiment.

Figure 34:
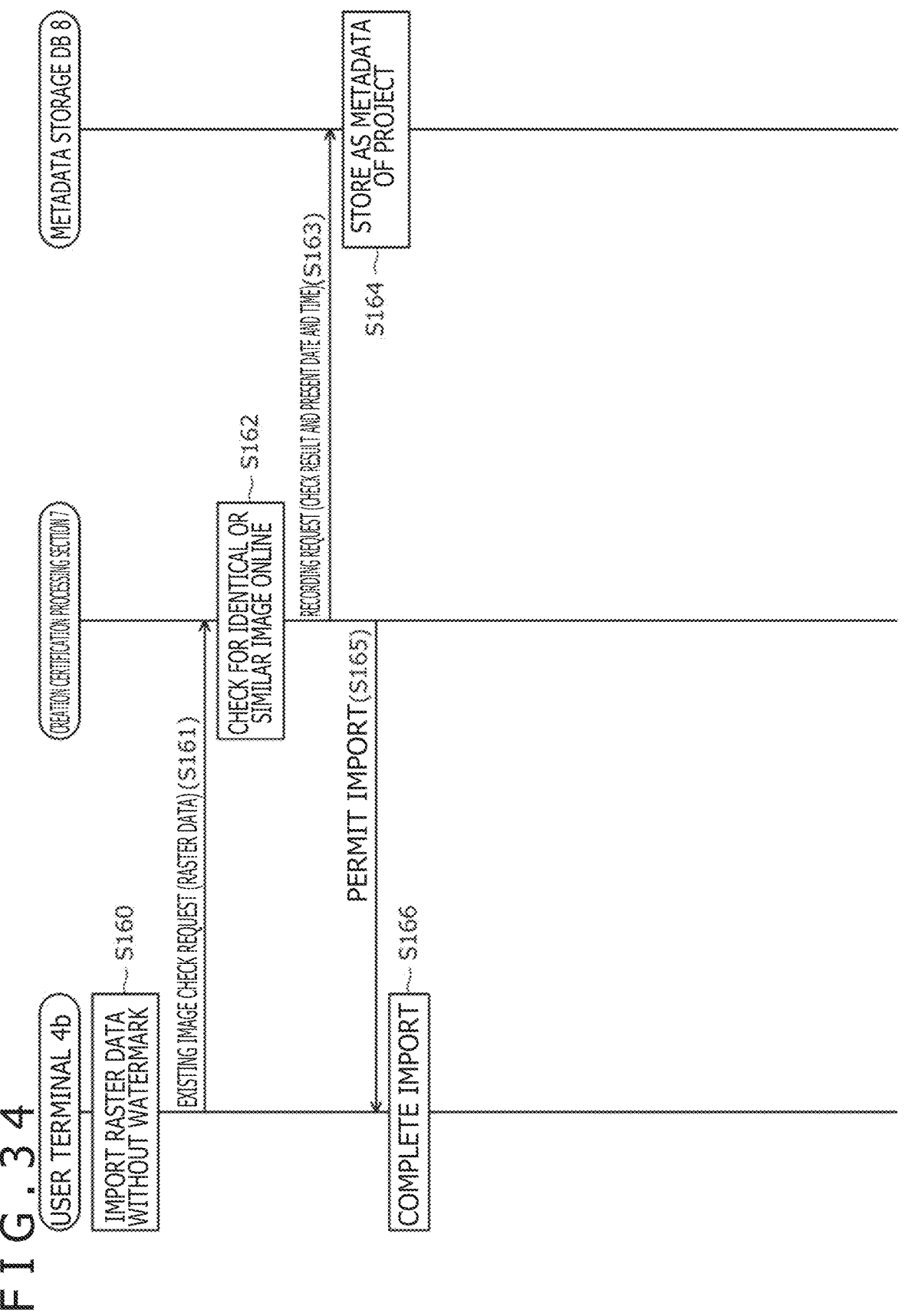
FIG. 34 is a flowchart illustrating processing performed in an authorship certification system 1 according to a third embodiment of the present disclosure when the artwork user selects raster data without a watermark on a file selection screen 30 illustrated in FIG. 28.

FIG. 34 is a flowchart illustrating processing performed in the authorship certification system 1 according to the present embodiment when the artwork user selects raster data without a watermark on the file selection screen 30 illustrated in FIG. 28. As illustrated in the figure, when the artwork user imports the raster data without a watermark (step S160), an existing image check request including the imported raster data is transmitted from the drawing application receiving the import to the creation certification system 3 (step S161).

The creation certification processing section 7 of the creation certification system 3 that has received the existing image check request checks online for an image identical or similar to an image represented by the raster data included in the existing image check request (step S162). A specific checking method may be similar to step S150 in FIG. 33. The creation certification processing section 7 after completing the check transmits a recording instruction including a check result and present date and time information to the metadata storage database 8 (step S163). Receiving this recording instruction, the metadata storage database 8 stores the received check result and the received present date and time information as one piece of metadata of the project in association with the present project ID (step S164). Concrete contents of the check result included in the recording instruction may be similar to those of the check result included in the recording instruction transmitted in step S151 in FIG. 33.

Next, the creation certification processing section 7 permits the user terminal 4*b* to perform the import (step S165). The drawing application of the user terminal 4*b* that has received this permission completes the import (step S166). The artwork user can thereafter use the imported raster data for the creation by the artwork user himself/herself.

FIG. 35 is a diagram illustrating an example of a creation certificate generated by the creation certification processing section 7 according to the present embodiment. As illustrated in the figure, the creation certificate generated by the creation certification processing section 7 according to the present embodiment includes information indicating a result of an online image search. This information is information indicating the result of the check in step S162 described above. In a case where the creation certification processing section 7 generates the creation certificate of an artwork produced after the raster data for which it is confirmed that there is an "IDENTICAL OR SIMILAR IMAGE" online in step S162 is imported, the creation certification processing section 7 sets, in this information, information indicating that the imported image matches an existing image (character string "IMPORTED IMAGE MATCHES FOLLOWING EXISTING IMAGE") and information indicating the address of the matching image (http:// . . . ). In a case where the creation certification processing section 7 generates the creation certificate of an artwork produced without such import being performed, the creation certification processing section 7 sets nothing in this information (in other words, sets null in this information). Thus, by checking the creation certificate, it is possible to know whether or not the corresponding artwork is one produced using existing image data, and if so to know the address of the existing image data used to produce the corresponding artwork.

Figure 36:
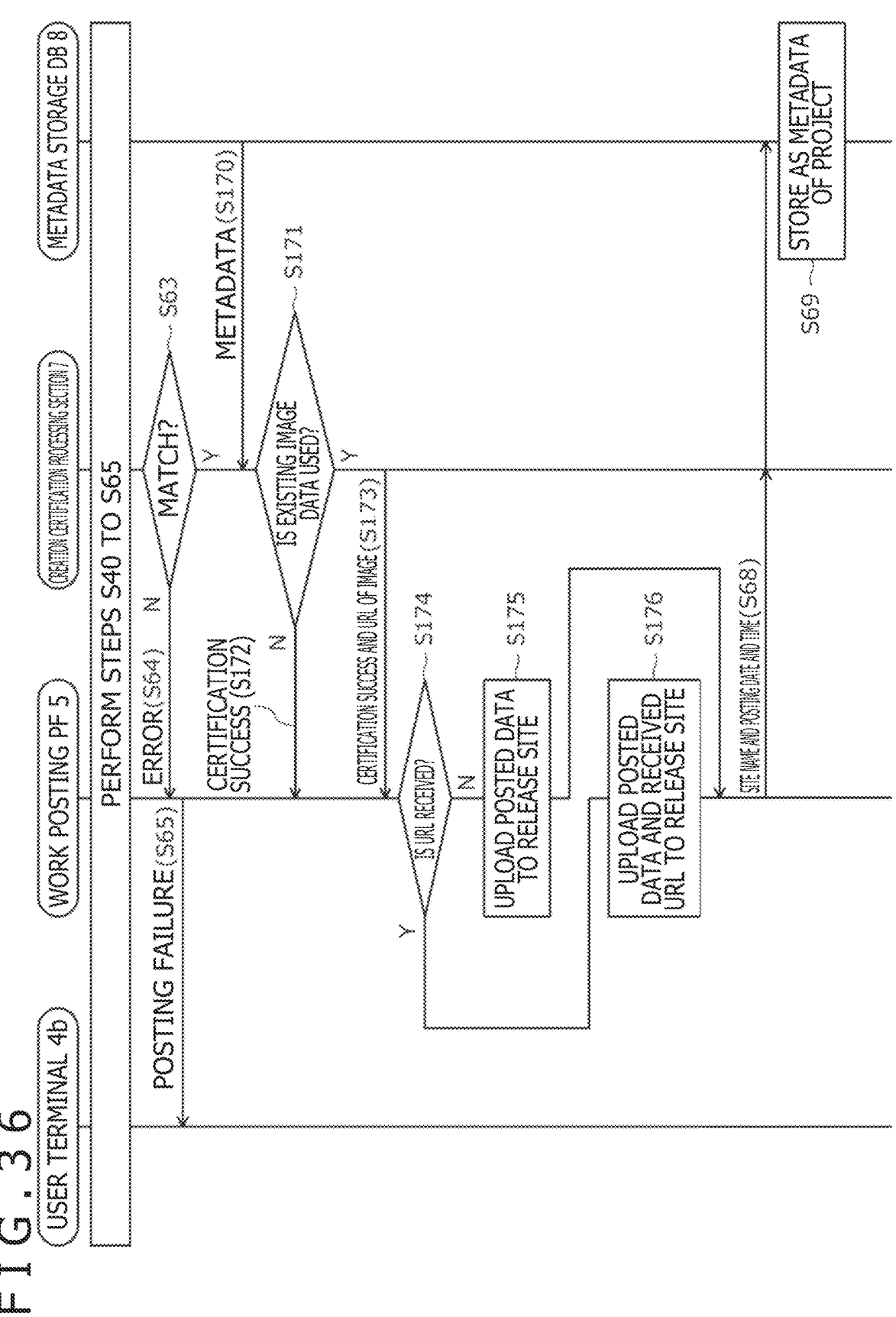
FIG. 36 is a flowchart illustrating processing performed in the authorship certification system 1 according to the third embodiment of the present disclosure in order to realize the posting of the artwork onto the release site by the artist.

FIG. 36 is a flowchart illustrating processing performed in the authorship certification system 1 according to the present embodiment for the artist to post the artwork onto the release site. In this processing, steps S66 and S67 of the processing illustrated in FIG. 21 and FIG. 22 are replaced with steps S170 to S175.

Determining a match in step S63 (that is, determining that the poster is the creator of the posted artwork), the creation certification processing section 7 obtains the metadata corresponding to the project ID obtained in step S42 from the metadata storage database 8 (step S170). Then, whether or not the posted artwork is one produced using existing image data is determined by referring to the obtained metadata (step S171). Specifically, it suffices for the creation certification processing section 7 to determine that the posted artwork is one produced using the existing image data when information that there is an image determined as an "IDENTICAL OR SIMILAR IMAGE" in step S162 in FIG. 34 is included in the metadata, and determine that the posted artwork is not one produced using the existing image data when the information is not included in the metadata. Incidentally, the creation certification processing section 7 may determine whether or not the posted artwork is one produced using the existing image data by referring to the creation certification information decrypted in step S56.

As in step S66 in FIG. 22, the creation certification processing section 7 after completing the determination in step S171 returns information indicating a certification success to the work posting platform 5 (steps S172 and S173). At this time, in a case where the creation certification processing section 7 determines in step S171 that the posted artwork is one produced using the existing image data, the creation certification processing section 7 obtains the URL of the image determined as the "IDENTICAL OR SIMILAR IMAGE" in step S162 in FIG. 34 from the metadata, and transmits the URL together with the information indicating the certification success (step S173).

Receiving the information indicating the certification success from the creation certification processing section 7, the work posting platform 5 determines whether or not the URL of the image is received together with the information (step S174). Then, when determining that the URL of the image is not received, the work posting platform 5 uploads the posted data to the predetermined release site by processing similar to that of step S67 in FIG. 22 (step S175). When determining that the URL of the image is received, on the other hand, the work posting platform 5 uploads the received URL to the predetermined release site together with the posted data (step S176). Thus, a user of the release site can check whether or not the posted artwork is one using the existing image data, and further check the URL of the image identical or similar to the existing image data when the posted artwork is one using the existing image data. Thereafter, the posting of the artwork onto the release site by the artist is completed after steps S68 and S69 illustrated also in FIG. 22 are performed.

As described above, according to the authorship certification system 1 in accordance with the present embodiment, the artwork user can produce the artwork of the artwork user himself/herself while using raster data without a watermark. In addition, a user of the release site can identify on the release site whether or not the posted artwork is one produced using the raster data without a watermark, and can also identify the URL of the image identical or similar to the raster data used when the posted artwork is one produced using the raster data without a watermark. As a result, it is possible to suppress the issuance of a false creation certificate or a copyright infringement such as a secondary production without a right by a malicious person after importing the existing image data without a watermark to the drawing application.

Description will next be made of an authorship certification system 1 according to a fourth embodiment of the present disclosure. The authorship certification system 1 according to the present embodiment is different from the authorship certification system 1 according to the first embodiment in that when the project ID cannot be obtained from the posted raster data provided with the watermark, the authorship certification system 1 according to the present embodiment attempts to obtain the project ID by another method. The authorship certification system 1 according to the present embodiment is otherwise similar to the authorship certification system 1 according to the first embodiment. In the following, detailed description of the authorship certification system 1 according to the present embodiment will be made centering on differences from the authorship certification system 1 according to the first embodiment.

FIG. 37 is a flowchart illustrating processing from a start, continuation, and completion of creation to the issuance of a creation certificate, which processing is performed in the authorship certification system 1 according to the present embodiment. This processing is different from the processing related to the start or continuation of the creation as illustrated in FIG. 18 and FIG. 19 and the processing related to the completion of the creation as illustrated in FIG. 20 and FIG. 21 in that step S180 is performed after step S17.

The creation certification processing section 7 according to the present embodiment generates the raster data provided with the watermark in step S17, and thereafter stores the generated raster data provided with the watermark (step S180). Thus, the raster data provided with the watermark is accumulated within the creation certification system 3.

Figure 38:
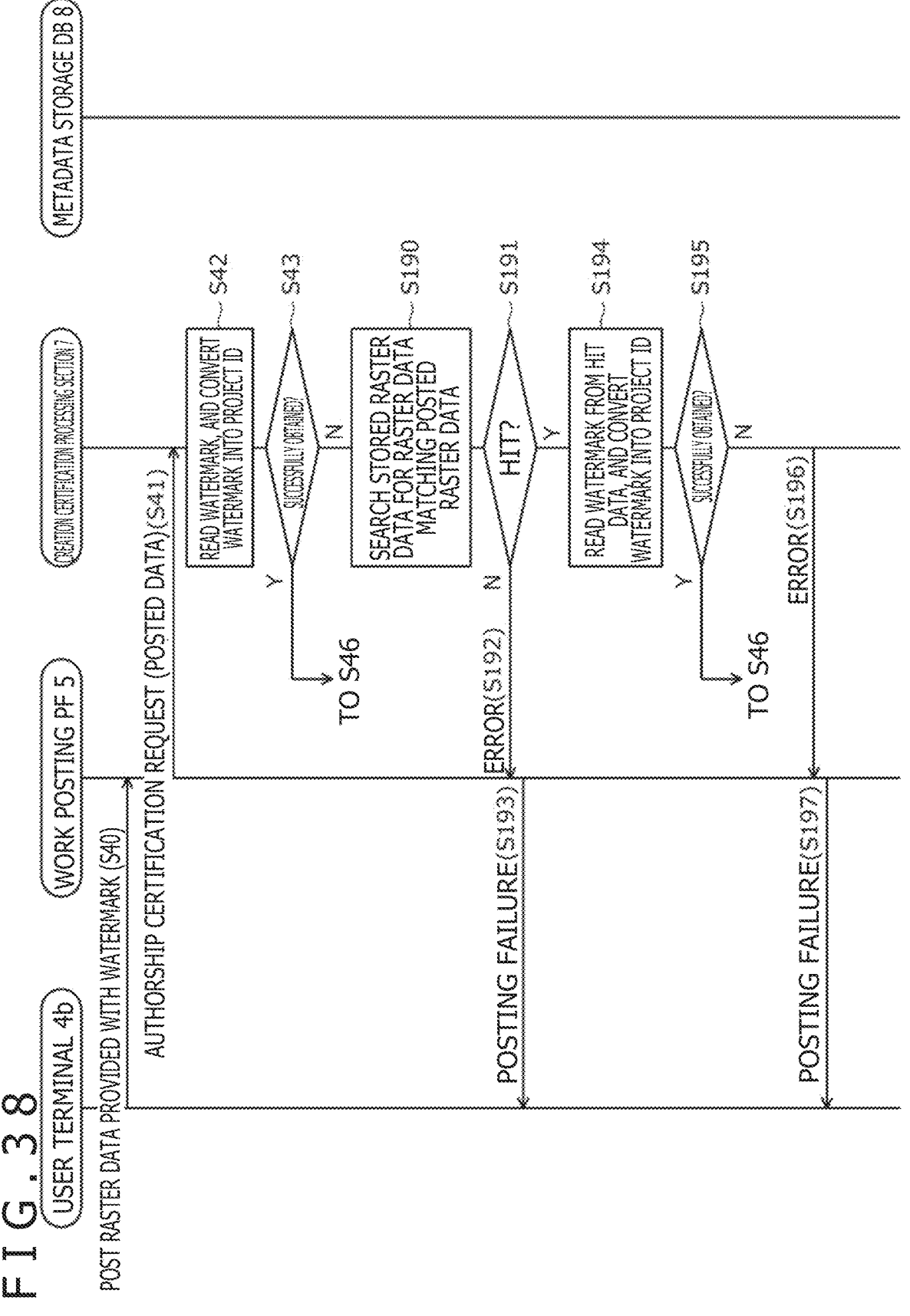
FIG. 38 is a flowchart illustrating processing performed in the authorship certification system 1 according to the fourth embodiment of the present disclosure in order to realize the posting of the artwork onto the release site by the artist.

FIG. 38 is a flowchart illustrating processing performed in the authorship certification system 1 according to the present embodiment in order to realize the posting of the artwork onto the release site by the artist. This processing is different from the processing illustrated in FIG. 21 and FIG. 22 in that steps S190 to S197 are performed after the negative determination in step S43. Incidentally, in FIG. 38, description of the processing from step S46 on down is omitted.

As illustrated in FIG. 38, when determining in step S43 that the project ID cannot be obtained, the creation certification processing section 7 searches the stored raster data (stored in step S180 in FIG. 37) for raster data matching the posted raster data (step S190). The match in this case does not mean a perfect match on a binary level, but it suffices for the match to be a match in external appearance to a degree that the match is considered to be present as viewed by the human eye. That is, conceivable cases of a failure in reading the watermark in step S42 are, for example, a case where the resolution of the raster data is changed, a case where the format of the raster data is changed from BMP to JPEG, and the like. Hence, when a perfect match on a binary level is required in step S190, the raster data corresponding to the posted raster data is not counted as a hit. When the creation certification processing section 7 is configured to search for a match in external appearance to a degree that the match is considered to be present as viewed by the human eye, as described above, the raster data corresponding to the posted raster data can be reliably counted as a hit.

After performing step S190, the creation certification processing section 7 determines whether or not raster data matching the posted raster data is a hit (step S191). When it is determined as a result that there is no hit, the creation certification processing section 7 returns an error to the work posting platform 5 (step S192). Receiving this error, the work posting platform 5 notifies a posting failure to the user terminal 4a without uploading the posted data (step S193).

When determining in step S191 that there is a hit, on the other hand, the creation certification processing section 7 attempts processing of reading the watermark from the hit raster data and converting the watermark into the project ID (step S194). The creation certification processing section 7 then determines whether or not the project ID can be obtained as a result of the attempt (step S195). When determining that the project ID can be obtained, the creation certification processing section 7 moves the processing to step S46. When determining that the project ID cannot be obtained, on the other hand, the creation certification processing section 7 returns an error to the work posting platform 5 (step S196). Receiving this error, the work posting platform 5 notifies a posting failure to the user terminal 4a without uploading the posted data (step S197).

As described above, according to the authorship certification system 1 in accordance with the present embodiment, even when the project ID cannot be obtained from the posted raster data provided with the watermark due to a change in the resolution or the format, the project ID can be obtained by another method. Hence, it is possible to prevent the user from feeling dissatisfied in that a posting failure occurs even though the raster data provided with the watermark is posted.

Description will next be made of an authorship certification system 1 according to a fifth embodiment of the present disclosure. The authorship certification system 1 according to the present embodiment is different from the authorship certification system 1 according to the first embodiment in that the authorship certification system 1 according to the present embodiment enters the project ID within a chunk of the raster data instead of embedding the watermark indicating the project ID into the raster data. The authorship certification system 1 according to the present embodiment is otherwise similar to the authorship certification system 1 according to the first embodiment. In the following, detailed description of the authorship certification system 1 according to the present embodiment will be made centering on differences from the authorship certification system 1 according to the first embodiment.

Figure 39:
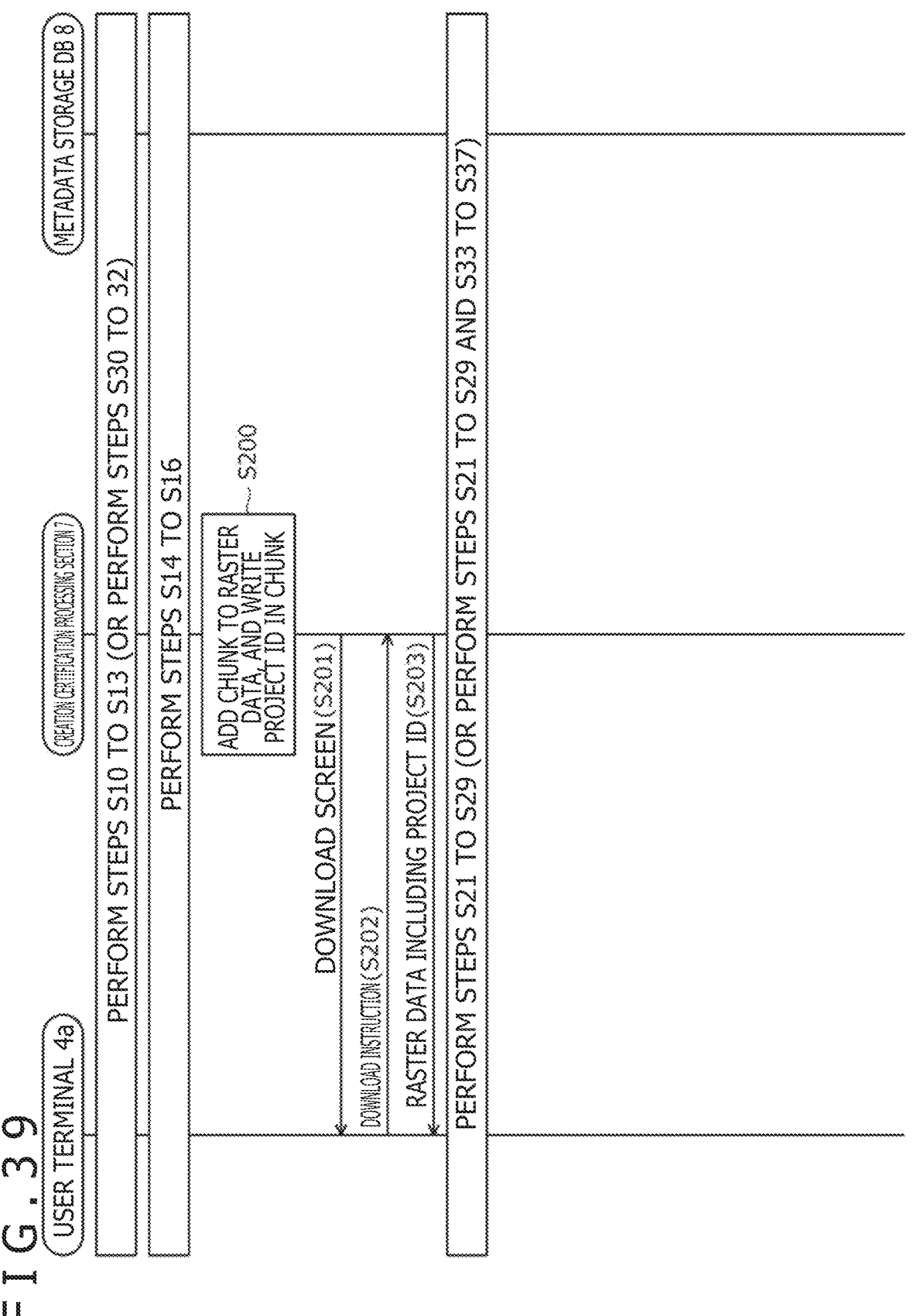
FIG. 39 is a flowchart illustrating processing from a start, continuation, and completion of creation to the issuance of a creation certificate, which processing is performed in an authorship certification system 1 according to a fifth embodiment of the present disclosure.

FIG. 39 is a flowchart illustrating processing from a start, continuation, and completion of creation to the issuance of a creation certificate, which processing is performed in the authorship certification system 1 according to the present embodiment. This processing is different from the processing related to the start or continuation of the creation as illustrated in FIG. 18 and FIG. 19 and the processing related to the completion of the creation as illustrated in FIG. 20 and FIG. 21 in that steps S200 to 203 are performed in place of steps S17 to S20.

The creation certification processing section 7 according to the present embodiment performs processing of adding a chunk to the received raster data and writing the project ID in the chunk (step S200) after generating the project file in step S14. In the following, the raster data obtained by thus writing the project ID within the chunk will be referred to as the "RASTER DATA INCLUDING THE PROJECT ID." Next, the creation certification processing section 7 transmits a download screen for downloading the raster data including the project ID to the drawing application (step S201). When the user viewing this download screen depresses a download button disposed within the screen, a download instruction is transmitted from the drawing application to the creation certification processing section 7 (step S202). Next, the raster data including the project ID is transmitted from the creation certification processing section 7 to the user terminal 4a (step S20). The user terminal 4a stores the thus downloaded raster data including the project ID within the recording device 1002 (see FIG. 2) or a storage in the cloud together with the pre-integration data (step S21; see FIG. 18).

FIG. 40 is a flowchart illustrating processing performed in the authorship certification system 1 according to the present embodiment in order to realize the posting of the artwork onto the release site by the artist. This processing is obtained by replacing steps S40 to S45 with steps S210 to S215 and further replacing steps S70 to S75 with steps S220 to S225 in the processing generated by adding the processing illustrated in FIG. 23 and FIG. 24 to the processing of FIG. 21 and FIG. 22 (processing in a case where the certification of authorship is performed by using also the raster data provided with the watermark and the creation certificate related to the artwork, which is one generation prior to the completed version of the artwork).

First, the artist posts the raster data including the project ID corresponding to the completed version of the artwork from the user terminal 4a to the work posting platform 5 (step S210). Receiving this posting, the work posting platform 5 transmits an authorship certification request including the posted raster data including the project ID to the creation certification system 3 (step S211).

The creation certification processing section 7 of the creation certification system 3 that has received the authorship certification request obtains the project ID from the chunk of the raster data including the project ID included in the authorship certification request (step S212). Then, a primary determination of whether or not the poster is the creator of the posted artwork is made by determining whether or not the project ID can be obtained as a result (step S213). Specifically, it suffices to determine that the poster is possibly the creator of the posted artwork when the project ID can be obtained, and determine that the poster is not the creator of the posted artwork when the project ID cannot be obtained.

When determining as a result of the determination in step S213 that the poster is not the creator of the posted artwork, the creation certification processing section 7 returns an error to the work posting platform 5 (step S214). Receiving this error, the work posting platform 5 notifies a posting failure to the user terminal 4a without uploading the posted data (step S215). When determining in step S213 that the poster is possibly the creator of the posted artwork, on the other hand, the creation certification processing section 7 performs the processing of steps S46 to S63 illustrated in FIG. 21 and FIG. 22.

When determining in step S63 that the poster is the creator of the posted artwork, the creation certification processing section 7 next requests, via the work posting platform 5, the user terminal 4a to transmit the raster data including the project ID which is one generation prior (step S220). When the user terminal 4a, in response to this request, transmits the raster data including the project ID which is one generation prior (step S221), the creation certification processing section 7 obtains the project ID from the chunk of the received raster data including the project ID (step S222). Then, a primary determination of whether or not the poster is the creator of the posted artwork is made again by determining whether or not the project ID can be obtained as a result (step S223). Specifically, it suffices to determine that the poster is possibly the creator of the posted artwork in a case where the project ID can be obtained, and determine that the poster is not the creator of the posted artwork in a case where the project ID cannot be obtained.

When determining as a result of the determination in step S223 that the poster is not the creator of the posted artwork, the creation certification processing section 7 returns an error to the work posting platform 5 (step S224). Receiving this error, the work posting platform 5 notifies a posting failure to the user terminal 4*a* without uploading the posted data (step S225). When determining in step S223 that the poster is possibly the creator of the posted artwork, on the other hand, the creation certification processing section 7 performs the processing of steps S76 to S95 illustrated in FIG. 23 and FIG. 24. When determining in step S93 that the poster is the creator of the posted artwork, the processing of steps S64 to S67 in FIG. 22 is further performed. Thus, the posting of the artwork can be performed by using the raster data including the project ID.

As described above, according to the authorship certification system 1 in accordance with the present embodiment, as in the authorship certification system 1 according to the first embodiment, the authorship of the artwork can be certified by entering the project ID within the chunk of the raster data instead of embedding the watermark indicating the project ID into the raster data. In addition, the posting of the artwork by using the raster data including the project ID is made possible, and the posting or usage of the artwork by a person not having the raster data including the project ID can be prohibited.

Preferred embodiments of the present disclosure have been described above. However, the present disclosure is not limited to such embodiments, and can be carried out in various modes without departing from the principles of the present disclosure.

DESCRIPTION OF REFERENCE SYMBOLS

1: Authorship certification system
2: Network
3: User terminal
3: Creation certification system
4*a*, 4*b*: User terminal
5: Work posting platform
6: License managing platform
7: Creation certification processing section
8: Metadata storage database
10: Tab bar
11: Command bar
12: Palette region
13: Canvas window
14: Menu window
15: Canvas
20, 21: Text box
22: Login button
23: Sign-up button
25, 26: Download button
27: Save button
30: File selection screen
40 Pre-integration data component list
41: Overall raster data
42 to 43: Raster data of each layer
1000: Computer
1001: CPU
1002: Storage device
1002: Recording device
1003: Input device
1004: Output device
1005: Communicating device
1006: Bus
P: Pen

The invention claimed is:

1. An authorship determining method for determining authorship of an artwork by using a computer, comprising:
receiving first pre-integration data including a plurality of partial artworks, wherein the first pre-integration data is pre-rasterization data different from the artwork which is post-rasterization data;
calculating a first hash value as a hash value of the first pre-integration data;
generating a first creation certificate including the first hash value;
receiving second pre-integration data;
determining the authorship of the artwork based on whether the first hash value obtained from the first creation certificate matches a second hash value calculated from the second pre-integration data.

2. The authorship determining method according to claim 1, comprising:
receiving the first creation certificate possessed by a creator of the artwork, and obtaining the first hash value from the received first creation certificate, and
obtaining the first pre-integration data possessed by the creator as the second pre-integration data, and calculating the second hash value of the obtained first pre-integration data.

3. The authorship determining method according to claim 1, wherein
the artwork is an artwork embedded with a predetermined watermark, and
the authorship determining method comprises:
determining the authorship of the artwork by determining whether or not the predetermined watermark can be obtained from the artwork.

4. The authorship determining method according to claim 3, wherein
the predetermined watermark is a watermark indicating a project identifier identifying a project generated according to an instruction of a creator and related to creation of the artwork, and
the authorship determining method comprises:
associating the project identifier and the first creation certificate with each other.

5. The authorship determining method according to claim 2, comprising:
receiving the first creation certificate encrypted by a private key of the creator,
obtaining a public key of the creator on a basis of information indicating the creator obtained on a basis of the project identifier indicated by the predetermined watermark obtained from the artwork, and
determining the authorship of the artwork by determining whether or not the first creation certificate can be decrypted by using the obtained public key of the creator.

6. The authorship determining method according to claim 1, wherein
the artwork includes a project identifier that identifies a project generated according to an instruction of a creator and related to creation of the artwork, and
the authorship determining method comprises:
attempting to obtain the project identifier from the artwork, and
determining the authorship of the artwork by determining whether or not the project identifier can be obtained from the artwork.

7. The authorship determining method according to claim 1, comprising:

generating creation certification information by encrypting the first hash value by using a first private key, wherein the first creation certificate includes the creation certification information.

8. The authorship determining method according to claim 7, comprising:

determining the authorship of the artwork by determining whether or not the creation certification information included in the first creation certificate can be decrypted by using a first public key corresponding to the first private key.

9. The authorship determining method according to claim 1, comprising:

searching for an image online by using the artwork, wherein the first creation certificate includes information indicating a result of the search for the image.

10. The authorship determining method according to claim 1, comprising:

receiving a license application from a user other than a creator of the artwork, and issuing, to the user, a license certificate including license certification information including information indicating a licensee in response to the license application, wherein license information in the license certification information is encrypted by using a first private key.

11. The authorship determining method according to claim 10, comprising:

receiving the license certificate possessed by the user, obtaining the license certification information from the received license certificate by decrypting the license certification information included in the received license certificate by using a first public key corresponding to the first private key, and determining that the user is a licensee of the artwork when the license certification information can be decrypted by using the first public key.

12. The authorship determining method according to claim 11, wherein the artwork is an artwork embedded with a predetermined watermark, and the authorship determining method comprises:

attempting to obtain the predetermined watermark embedded in the artwork possessed by the user, and determining that the user is a licensee of the artwork when the predetermined watermark can be obtained from the artwork.

13. The authorship determining method according to claim 12, wherein the predetermined watermark is a watermark indicating a project identifier that identifies a project generated according to an instruction of the creator of the artwork and related to creation of the artwork, and the authorship determining method comprises:

associating the project identifier and the license certificate with each other.

14. The authorship determining method according to claim 13, comprising:

receiving the license certificate encrypted by a private key of the user, obtaining the license certificate on a basis of the project identifier indicated by the predetermined watermark obtained from the artwork, obtaining the license certification information from the obtained license certificate, and obtaining a public key of the user indicated by the license certification information, attempting to decrypt the received license certificate by using the obtained public key of the user, and determining that the user is a licensee of the artwork when the license certificate can be decrypted by the public key of the user.

15. The authorship determining method according to claim 1, comprising:

searching for an image online by using an artwork not embedded with a predetermined watermark, wherein the first creation certificate includes a result of the search for the image.

16. A computer used to determine authorship of an artwork, the computer comprising:

memory including computer-executable instructions; and a processor configured to:

receive first pre-integration data including a plurality of partial artworks, wherein the first pre-integration data is pre-rasterization data different from the artwork which is post-rasterization data;

calculate a first hash value as a hash value of the first pre-integration data;

generate a first creation certificate including the first hash value;

receive second pre-integration data; and determine the authorship of the artwork based on whether the first hash value obtained from the first creation certificate matches a second hash value calculated from the second pre-integration data.

17. A non-transitory computer-readable medium including a program for causing a computer to execute processing of certifying authorship of an artwork, wherein the processing comprises:

receiving first pre-integration data including a plurality of partial artworks, wherein the first pre-integration data is pre-rasterization data different from the artwork which is post-rasterization data;

calculating a first hash value as a hash value of the first pre-integration data;

generating a first creation certificate including the first hash value;

receive second pre-integration data; and determining the authorship of the artwork based on whether the first hash value obtained from the first creation certificate matches a second hash value calculated from the second pre-integration data.

* * * * *